United States Patent
Lee et al.

(10) Patent No.: US 11,520,159 B2
(45) Date of Patent: Dec. 6, 2022

(54) DUAL LENS DRIVE DEVICE, DUAL CAMERA MODULE, AND OPTICAL DEVICE

(71) Applicant: LG INNOTEK CO., LTD., Seoul (KR)

(72) Inventors: Kap Jin Lee, Seoul (KR); Yong Nam Choi, Seoul (KR); Do Yoon Kim, Seoul (KR); Min Soo Kim, Seoul (KR); Jung Hwan Kim, Seoul (KR); Tae Young Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 591 days.

(21) Appl. No.: 16/466,958

(22) PCT Filed: Jan. 8, 2018

(86) PCT No.: PCT/KR2018/000320
§ 371 (c)(1),
(2) Date: Jun. 5, 2019

(87) PCT Pub. No.: WO2018/128489
PCT Pub. Date: Jul. 12, 2018

(65) Prior Publication Data
US 2020/0089020 A1      Mar. 19, 2020

(30) Foreign Application Priority Data

Jan. 9, 2017   (KR) .................. 10-2017-0002963
Jan. 9, 2017   (KR) .................. 10-2017-0002965
Feb. 13, 2017  (KR) .................. 10-2017-0019609

(51) Int. Cl.
*G02B 27/64*    (2006.01)
*G03B 5/02*     (2021.01)
(Continued)

(52) U.S. Cl.
CPC ............ *G02B 27/646* (2013.01); *G03B 11/04* (2013.01); *H01F 7/16* (2013.01); *H04N 5/23248* (2013.01); *H01F 7/08* (2013.01)

(58) Field of Classification Search
CPC ............................ G02B 27/646; H01F 7/16
See application file for complete search history.

(56) References Cited

U.S. PATENT DOCUMENTS

2014/0177056 A1   6/2014  Hayashi et al.
2015/0201128 A1*  7/2015  Dong .................. H04N 5/2253
                                              348/208.11
(Continued)

FOREIGN PATENT DOCUMENTS

CN      102292673 A    12/2011
EP       3070504 A1     9/2016
(Continued)

OTHER PUBLICATIONS

International Search Report in International Application No. PCT/KR2018/000320, filed Jan. 8, 2018.
(Continued)

*Primary Examiner* — Minh Q Phan
(74) *Attorney, Agent, or Firm* — Saliwanchik, Lloyd & Eisenschenk

(57) ABSTRACT

The present embodiment relates to a dual lens drive device that comprises: a housing; a first bobbin which is disposed to move in a first direction inside the housing; a second bobbin which is disposed to move in the first direction inside housing and is spaced apart from the first bobbin; a first coil which is disposed on the first bobbin; a second coil which is disposed on the second bobbin; a magnet which is disposed in the housing and faces the first coil and the second coil; a base which is disposed below the housing; a substrate which comprises a circuit member having a third coil disposed to face the magnet between the housing and the base; and a (Continued)

support member which movably supports the housing with respect to the substrate, wherein the housing is integrally formed.

19 Claims, 35 Drawing Sheets

(51) Int. Cl.
  *H04N 5/232* (2006.01)
  *G03B 11/04* (2021.01)
  *H01F 7/16* (2006.01)
  *H01F 7/08* (2006.01)

(56) References Cited

U.S. PATENT DOCUMENTS

| 2015/0212291 A1 | 7/2015 | Lee |
| 2016/0018720 A1 | 1/2016 | Bachar et al. |

FOREIGN PATENT DOCUMENTS

| KR | 10-2011-0135502 A | 12/2011 |
| KR | 10-2015-0113675 A | 10/2015 |
| KR | 10-2016-0004543 A | 1/2016 |
| WO | WO-2015/124966 A1 | 8/2015 |
| WO | WO-2016-156996 A1 | 10/2016 |

OTHER PUBLICATIONS

Supplementary European Search Report dated Nov. 19, 2019 in European Application No. 18736600.0.

* cited by examiner

DUAL LENS DRIVE DEVICE, DUAL CAMERA MODULE, AND OPTICAL DEVICE

CROSS-REFERENCE TO RELATED APPLICATIONS

This application is the U.S. national stage application of International Patent Application No. PCT/KR2018/000320, filed Jan. 8, 2018; which claims the benefit under 35 U.S.C. § 119 of Korean Application Nos. 10-2017-0002963, filed Jan. 9, 2017; 10-2017-0002965, filed Jan. 9, 2017; and 10-2017-0019609, filed Feb. 13, 2017; the disclosures of each of which are incorporated herein by reference in their entirety.

TECHNICAL FIELD

This invention relates to a dual lens drive device, a dual camera module and an optical device.

BACKGROUND ART

This section provides background information related to the present invention, which is not necessarily prior art.

Concomitant with generalization of wide use of various mobile terminals, and commercialization of wireless internet services, demands by consumers related to mobile terminals are also diversified to allow various types of peripheral devices to be mounted on the mobile terminals.

Among the representative items thereof, there is mentioned a camera module capturing a subject in a picture or a video. Meantime, recently, researches are briskly waged on dual camera modules in which two individual camera modules are adjacently arranged. However, when two individual camera modules are adjacently arranged, it suffers from disadvantages in that a mutual magnetic interference is generated on the two individual camera modules.

Moreover, unnecessary light is conventionally incident on an image sensor by being reflected from inside of the camera module to disadvantageously generate a flare phenomenon.

DETAILED DESCRIPTION OF THE INVENTION

Technical Subject

The exemplary embodiment of the present invention is to provide a dual lens drive device having a structure configured to inhibit a mutual interference between magnets in a VCM (Voice Coil Motor) structure for dual OIS purpose.

A lens driving device according to an exemplary embodiment has an object of reducing the power consumption and simplifying the tuning by eliminating the fear of magnetic interference between activators through formation of one integrated actuator and through reduction of the number of driver ICs for control to one driver IC.

Furthermore, an exemplary embodiment of the present invention is to provide a dual camera module including the dual lens drive device and an optical device.

Moreover, an exemplary embodiment of the present invention is to provide a camera module and a dual camera module configured to inhibit the flare phenomenon, and to further provide an optical device including the camera module and the dual camera module.

Technical Solution

The dual camera module according to an exemplary embodiment may wrap each lens and a plurality of magnets for driving a lens to X, Y and Z axes to one housing, through which an AF (Auto Focus) operation to a Z axis direction may be independently implemented for each lens, and an OIS (Optical Image Stabilization) operation to X axis or to Y axis may be equally operated to two lenses.

A dual lens drive device according to an exemplary embodiment comprises: a housing; a first bobbin which is disposed to move in a first direction inside the housing; a second bobbin which is disposed to move in the first direction inside housing and is spaced apart from the first bobbin; a first coil which is disposed on the first bobbin; a second coil which is disposed on the second bobbin; a magnet which is disposed in the housing and faces the first coil and the second coil; a base which is disposed below the housing; a substrate which comprises a circuit member having a third coil disposed to face the magnet between the housing and the base; and a support member which movably supports the housing with respect to the substrate, wherein the housing is integrally formed.

The dual lens drive device according to an exemplary embodiment may further comprise: a first upper elastic member disposed at an upper side of the first bobbin to be coupled to the first bobbin and the housing; and a second upper elastic member disposed at an upper side of the second bobbin to be coupled to the second bobbin and the housing, wherein the support member may be connected to first upper elastic member and the substrate, and to the second upper elastic member and the substrate.

The support member may be formed with first to fourth support parts, each mutually spaced apart.

Each of the first to fourth support parts may be formed with a wire, and the first to fourth support parts may be respectively disposed at four corner portions of the housing.

The magnet may be formed with a plurality of corner magnets respectively disposed at corner portions of the housing.

The plurality of corner magnets may include first to eighth corner magnets, each mutually spaced apart.

The magnet may be formed with a plurality of flat magnets respectively disposed at a lateral surface of the housing.

The dual lens drive device according to an exemplary embodiment may further comprise a cover member including an upper plate and a lateral plate extensively bent from the upper plate, wherein a lower end of the lateral plate may be coupled to the base, an inner space formed by the cover member and the base may be disposed with the housing, the cover member may be integrally formed, and the cover member may include a first opening on the upper plate at a position corresponding to that of the first bobbin, and a second opening on the upper plate at a position corresponding to the second bobbin.

The dual lens drive device according to an exemplary embodiment may further comprise: a lower elastic member disposed at a lower side of the first bobbin to be coupled to the first bobbin and the housing; and a second lower elastic member disposed at a lower side of second bobbin to be coupled to the second bobbin and the housing.

The first upper elastic member may include a first outer part coupled to the housing, a first inner part coupled to the first bobbin, and a first connection part connecting the first outer part and the inner part, the first lower elastic member may include a second outer part coupled to the housing, a second inner part coupled to the first bobbin, and a second connection part connecting the second outer part and the second inner part, wherein a first coupling hole of the first outer part may be coupled to a lug of the housing by being fused to the lug of the housing, and the first inner part, the second outer part and the second inner part may be coupled to the housing and the first bobbin by an adhesive.

An upper surface of the first bobbin may be formed with a first reception groove corresponding to a second coupling hole of the first inner part to accommodate an adhesive, and a lower surface of the first bobbin may be formed with a second reception groove corresponding to a third coupling hole of the second inner part to accommodate an adhesive, and a lower surface of the housing may be formed with a third reception groove corresponding to a fourth coupling hole of the second outer part to accommodate an adhesive.

The base may include a first through hole disposed at a position corresponding to that of the first bobbin, a second through hole disposed at a position corresponding to that of the second bobbin, a recessed part formed by allowing a portion of a lower surface of the base to be recessed, and a partition protruding from a lower surface of base to a recessed surface of the recessed part between the first through hole and the second through hole and extended from one lateral surface of the base to the other lateral surface of the base.

The partition may be formed in two pieces each spaced apart and a space may be formed between two partitions.

The base may be integrally formed and the substrate may be integrally formed.

The dual lens drive device according to an exemplary embodiment may further comprise: a housing including a first hole and a second hole spaced apart from the first hole; a first bobbin disposed on the first hole of the housing to allowing moving to a first direction; a second bobbin disposed at the second hole to allow moving to the first direction; a first coil disposed on the first bobbin; a second coil disposed on the second bobbin; a magnet disposed on the housing to face the first coil and the second coil; a base disposed underneath the housing; a substrate including a circuit member having a third coil to face the magnet between the housing and the base; and a support member movably supporting the housing relative to the substrate.

A dual camera module according to an exemplary embodiment of the present invention may comprise: a PCB (Printed Circuit Board); a first image sensor disposed on the PCB; a second image sensor disposed on the PCB to be spaced apart from the first image sensor; a housing disposed at an upper side of the PCB; a first bobbin disposed at an inside position of the housing corresponding to that of the first image sensor to allowing moving to a first direction; a second bobbin disposed at an inside position of the housing corresponding to that of the second image sensor to allow moving to the first direction and being spaced apart from the first bobbin; a first coil disposed on the first bobbin; a second coil disposed on the second bobbin; a magnet disposed on the housing to face the first coil and the second coil; a base interposed between the housing and the PCB; a substrate including a circuit member having a third coil to be disposed between the housing and the base and to face the magnet; and a support member movably support the housing relative to the substrate, wherein the housing may be integrally formed.

An optical device according to an exemplary embodiment of the present invention may comprise: a body; a dual camera module disposed on the body to capture a subject; and a display part outputting an image captured by the dual camera module, wherein the dual camera module may comprise: a PCB (Printed Circuit Board); a first image sensor disposed on the PCB; a second image sensor disposed on the PCB to be spaced apart from the first image sensor; a housing disposed at an upper side of the PCB; a first bobbin disposed at an inside position of the housing corresponding to that of the first image sensor to allowing moving to a first direction; a second bobbin disposed at an inside position of the housing corresponding to that of the second image sensor to allow moving to the first direction and being spaced apart from the first bobbin; a first coil disposed on the first bobbin; a second coil disposed on the second bobbin; a magnet disposed on the housing to face the first coil and the second coil; a base interposed between the housing and the PCB; a substrate including a circuit member having a third coil to be disposed between the housing and the base and to face the magnet; and a support member movably support the housing relative to the substrate, wherein the housing may be integrally formed.

A dual camera module according to an exemplary embodiment of the present invention may comprise a structure using a single actuator regardless of the number of image sensors.

A dual camera module according to an exemplary embodiment of the present invention may comprise a structure using a single OIS carrier relative to a plurality of image sensors.

A lens drive device according to an exemplary embodiment of the present invention may comprise: a housing including a first hole and a second hole spaced apart from the first hole; a first bobbin disposed on the first hole of the housing to allow moving to a first direction; a second bobbin disposed on the second hole of the housing to allow moving to the first direction; a first coil disposed on the first bobbin; a second coil disposed on the second bobbin; a driving magnet disposed on the housing to face the first coil and the second coil; a base disposed underneath the housing; a substrate including a circuit member having a third coil interposed between the housing and the base to face the magnet; and a support member movably supporting the housing relative to the substrate, wherein the driving magnet may include a plurality of magnets, and at least one of the plurality of magnets is disposed at a lateral surface formed between corner portions of the housing.

The housing may include a first lateral part facing a lateral surface of the first bobbin and a lateral surface of the second bobbin, a second lateral part disposed at an opposite side of the first lateral part, a third lateral part disposed between the first lateral part and the second lateral part to face a lateral surface of the first bobbin and a fourth lateral part disposed between the first lateral part and the second lateral part to face a lateral surface of the second bobbin, wherein the driving magnet may include a first magnet disposed on the first lateral part, a second magnet disposed on the second lateral part, a third magnet disposed on the third lateral part, a fourth magnet disposed on the fourth lateral part and a fifth magnet disposed between the first bobbin and the second bobbin.

The lens drive device may further comprise: a first upper elastic member disposed at an upper side of first bobbin to be coupled to the first bobbin and the housing; and a second upper elastic member disposed at an upper side of second bobbin to be coupled to the second bobbin and the housing.

The support member may be formed with first to fourth wires each mutually spaced apart from the other.

A length of an inner surface of the first magnet to a horizontal direction may be longer than a length of an inner surface of the third magnet to a horizontal direction.

A length of an inner surface of the first magnet to a horizontal direction may be longer by 1.7~2.3 times than a length of an inner surface of the third magnet to a horizontal direction.

An inner surface of the first magnet may be such that polarity of an area facing the first coil is different from polarity of an area facing the second coil, and an inner surface of the second magnet may be such that polarity of an area facing the first coil is different from polarity of an area facing the second coil.

A portion of an inner surface of the first magnet facing the first coil, a portion of an inner surface of the second magnet, an inner surface of the third magnet and a lateral surface of the fifth magnet may have a first polarity, and the other portion of an inner surface of the first magnet, the other portion of an inner surface of the second magnet, an inner surface of the fourth magnet and the other lateral surface of the fifth magnet may have a second polarity different from the first polarity.

The housing may be integrally formed.

The base may be integrally formed, and the base may include a first through hole formed at a position corresponding to that of the first bobbin, and a second through hole formed at a position corresponding to that of the second bobbin.

The lens drive device may further comprise: an upper plate; and a cover member including a lateral plate extended by being bent from the upper plate, wherein a lower end of the lateral plate may be coupled to the base, an inner space formed between the cover member and the base may be disposed with the housing, the cover member may be integrally formed, the cover member may include a first opening formed on the upper plate at a position corresponding to that of the first bobbin, and a second opening formed at the upper plate corresponding to that of the second bobbin.

The housing may include a magnet reception part accommodating the magnet and the magnet reception part may be opened to a lower side.

A dual lens drive device according to an exemplary embodiment of the present invention may comprise: a housing including a first hole and a second hole spaced apart from the first hole; a first bobbin disposed at the first hole of the housing to allowing moving to a first direction; a second bobbin disposed at the second hole of the housing to allow moving to the first direction; a first coil disposed on the first bobbin; a second coil disposed on the second bobbin; a driving magnet disposed on the housing to face the first coil and the second coil; a based disposed underneath the housing; a substrate including a circuit member having a third coil disposed to face the magnet between the housing and the base; and a support member movably supporting the housing relative to the substrate, wherein the driving magnet may include a first magnet facing the first coil and the second coil, a second magnet, a third magnet facing the first magnet and a fourth magnet facing the second coil.

A camera module according to an exemplary embodiment of the present invention may comprise: a PCB; a first image sensor disposed on the PCB; a second image sensor disposed on the PCB; a housing including a first hole formed on a position corresponding to that of the first image sensor and a second hole formed at a position corresponding to that of the second image sensor; a first bobbin disposed on the first hole to allowing moving to a first direction; a second bobbin disposed on the second hole of the housing to allow moving to the first direction; a first coil disposed on the first bobbin; a second coil disposed on the second bobbin; a driving magnet disposed on the housing to face the first coil and the second coil; a base disposed underneath the housing; a substrate including a circuit member having a third coil to face the magnet between the housing and the base; and a support member movably supporting the housing relative to the substrate, wherein the driving magnet may include a plurality of magnets, and at least one of the plurality of magnets may be disposed at a lateral part formed between the corner portions of the housing.

An optical device according to an exemplary embodiment of the present invention may comprise: a body; a dual camera module disposed on the body to capture an image of a subject; and a display part disposed on the body to output the image captured by the dual camera module, wherein the dual camera module may include a PCB; a first image sensor disposed on the PCB; a second image sensor disposed on the PCB; a housing including a first hole formed on a position corresponding to that of the first image sensor and a second hole formed at a position corresponding to that of the second image sensor; a first bobbin disposed on the first hole to allowing moving to a first direction; a second bobbin disposed on the second hole of the housing to allow moving to the first direction; a first coil disposed on the first bobbin; a second coil disposed on the second bobbin; a driving magnet disposed on the housing to face the first coil and the second coil; a base disposed underneath the housing; a substrate including a circuit member having a third coil to face the magnet between the housing and the base; and a support member movably supporting the housing relative to the substrate, wherein the driving magnet may include a plurality of magnets, and at least one of the plurality of magnets may be disposed at a lateral part formed between the corner portions of the housing.

A camera module according to an exemplary embodiment of the present invention may comprise: a PCB; an image sensor disposed on the PCB; a sensor base disposed on an upper surface of the PCB; a lens drive device disposed on an upper surface of the sensor base; a lens coupled to the lens drive device and a light shielding member disposed at a lower surface of the lens.

The lens may be formed in a plural number, the camera module may further include a barrel accommodating the plurality of lenses to be coupled to the lens drive device, wherein the barrel may include a body part having a plurality of lenses coupled to an inner surface, a support part coupled to an inner circumferential surface of the body part to support a lowermost lens of the plurality of lenses from a lower side, and the light shielding member may be disposed at a lower surface of the lowermost lens.

The light shielding member may be disposed at a surrounding part of the lowermost lens.

The light shielding member may be connected to the support part when viewed from under.

The light shielding member may be overlapped with the support part to a direction perpendicular to an optical axis.

The light shielding member may take a ring shape symmetrical about an optical axis.

The light shielding member may be attached to a lower surface of the lens by being formed with a film.

The light shielding member may be formed by allowing an impermeable material to be coated on a lower surface of the lens.

The lens drive device may comprise: a housing; a bobbin disposed at an inside of the housing; a coil disposed on the bobbin; a magnet disposed on the housing to face the coil; and an elastic member coupled to the bobbin and the housing.

The lens drive device may comprise: a housing; a bobbin disposed at an inside of the housing to allow moving to a first direction; a first coil disposed on the bobbin; a magnet disposed on the housing to face the first coil; a based disposed underneath the housing; a substrate including a circuit member having a second coil so disposed as to face the magnet between the housing and the base; an upper elastic member disposed at an upper side of the bobbin to be coupled to the bobbin and the housing; and a support member coupled to the upper elastic member and the substrate.

The lens drive device may further comprise a filter interposed between the image sensor and the lens, the light shielding member may be additionally disposed at an upper surface of the filter.

A dual camera module according to an exemplary embodiment of the present invention may comprise: a PCB; an image sensor disposed on the PCB; a sensor base disposed at an upper surface of the PCB and including a first through hole and a second through hole; first and second lens drive devices disposed at an upper surface of the sensor base; a first lens coupled to the first lens drive device and so disposed as to correspond to the first through hole; a second lens coupled to the second lens drive device and so disposed as to correspond to the second through hole; and a light shielding member disposed underneath the first and second lenses.

An optical device according to an exemplary embodiment of the present invention may comprise: a body; a camera module disposed on the body to capture an image of a subject; and a display part disposed on the body to output the image captured by the camera module, wherein the camera module may include a PCB; an image sensor disposed on the PCB; a sensor base disposed on an upper surface of the PCB; a lens drive device disposed at an upper surface of the sensor base; a lens coupled to the lens drive device; and a light shielding member disposed at a lower surface of the lens.

A dual lens drive device according to an exemplary embodiment comprises: a housing; a first bobbin which is disposed to move in a first direction inside the housing; a second bobbin which is disposed to move in the first direction inside the housing and is spaced apart from the first bobbin; a first coil which is disposed on the first bobbin; a second coil which is disposed on the second bobbin; a magnet which is disposed in the housing and faces the first coil and the second coil; a base which is disposed below the housing; a substrate which comprises a circuit member having a third coil disposed to face the magnet between the housing and the base; and a support member which movably supports the housing with respect to the substrate, wherein the housing is integrally formed.

The dual lens drive device according to an exemplary embodiment may further comprise: a first upper elastic member disposed at an upper side of the first bobbin and coupled to the first bobbin and the housing; and a second upper elastic member disposed at an upper side of the second bobbin and coupled to the second bobbin and the housing, wherein the support member may be connected to the first upper elastic member and the substrate, and to the second upper elastic member and the substrate.

The support member may be formed with first to fourth support parts each spaced apart from the other.

Each of the first to fourth support parts may be formed with a wire, and the first to fourth support parts may be respectively disposed on four corner portions of the housing.

The magnet may be formed with a plurality of corner magnets disposed on corners of the housing.

The plurality of corner magnets may include first to eighth corner magnets each spaced apart from the other.

The dual lens drive device may further comprise: an upper plate; and a cover member extended by being bent from the upper plate, and a lower end of the upper plate may be coupled to the base, an inner space formed by the cover member and the base may be disposed with the housing, the cover member may be integrally formed, and the cover member may include a first opening formed on the upper plate at a position corresponding to that of the first bobbin and a second opening formed on the upper plate at a position corresponding to that of the second bobbin.

The dual lens drive device may further comprise: a first lower elastic member disposed at a lower side of the first bobbin to be coupled to the first bobbin and the housing; and a second lower elastic member disposed at a lower side of the second bobbin to be coupled to the second bobbin and the housing.

The first upper elastic member may include a first outer part coupled to the housing, a first inner part coupled to the first bobbin, and a first connection part connecting the first outer part and the first inner part, the first lower elastic member may include a second outer part coupled to the housing, a second inner part coupled to the first bobbin, and a second connection part connecting the second outer part and the second inner part, wherein a first coupling hole of the first outer part may be coupled to a lug of the housing by being fused and the first inner part, the second outer part and the second inner part may be coupled to the housing and the first bobbin by an adhesive.

An upper surface of the first bobbin may be formed with a first reception groove corresponding to a second coupling hole of the first internal part to accommodate an adhesive, and a lower surface of the first bobbin may be formed with a second reception groove corresponding to a third coupling hole of the second inner part to accommodate an adhesive, and a lower surface of the housing may be formed with a third reception groove corresponding to a fourth coupling hole of the second outer part to accommodate an adhesive.

The base may include a first through hole formed at a position corresponding to that of the first bobbin, a second through hole formed at a position corresponding to that of the second bobbin, a recessed part formed by allowing a portion of a lower surface of the base to be recessed, a partition protruded from a recessed surface of the recessed part to a lower surface of the base between the first though hole and the second through hole and extended from a lateral surface of one side of the base to the other surface of one side of the base.

Two partitions may be spaced apart to form a space therebetween.

The base may be integrally formed and the substrate may be integrally formed.

The magnet may include a plurality of magnets, and at least one magnet of the plurality of magnets may be disposed on a lateral part formed between corner portions of the housing.

The housing may include a first lateral part facing a lateral surface of the first bobbin and a lateral surface of the second bobbin, a second lateral part disposed opposite to the first lateral part, a third lateral part disposed between the first lateral part and the second lateral part to face a lateral surface of the first bobbin, and a fourth lateral part disposed between the first lateral part and the second lateral part to face a lateral surface of the second bobbin, and the driving magnet may include a first magnet disposed on the first lateral part, a second magnet disposed on the second lateral part, a third magnet disposed on the third lateral part, a fourth magnet disposed on the fourth lateral part, and a fifth magnet disposed between the first bobbin and the second bobbin.

An inner surface of the first magnet may be such that polarity of an area facing the first coil is different from polarity of an area facing the second coil, and an inner surface of the second magnet may be such that polarity of an area facing the first coil is different from polarity of an area facing the second coil.

A portion of an inner surface of the first magnet facing the first coil, a portion of an inner surface of the second magnet, an inner surface of the third magnet and a lateral surface of the fifth magnet may have a first polarity, and the other portion of an inner surface of the first magnet facing the second coil, the other portion of an inner surface of the second magnet, an inner surface of the fourth magnet and the other lateral surface of the fifth magnet may have a second polarity different from the first polarity.

The housing may include a magnet reception part accommodating the magnet, and the magnet reception part may be opened to a lower side.

A dual camera module according to an exemplary embodiment of the present invention may comprise: a PCB; a first image sensor dispose on the PCB; a second image sensor disposed on the PCB to be spaced apart from the first image sensor; a housing disposed on an upper side of the PCB; a first bobbin disposed at an inside of the housing to allow being moved from a position corresponding to the first image sensor to a first direction; a second bobbin disposed at an inside of the housing to allow being moved from a position corresponding to the second image sensor to a first direction and spaced apart from the first bobbin; a first coil disposed on the first bobbin; a second coil disposed on the second bobbin; a magnet disposed on the housing to face the first coil and the second coil; a base interposed between the housing and the PCB; a substrate including a circuit member having a third coil so disposed as to face the magnet between the housing and the base; and a support member movably supporting the housing relative to the substrate, wherein the housing may be integrally formed, the magnet may include a plurality of magnets, and at least one of the plurality of magnets may be disposed on a lateral part formed between corner portions of the housing.

An optical device according to an exemplary embodiment of the present invention may comprise a body, a dual camera module disposed on the body to capture a subject, and a display part outputting an image captured by the dual camera module, wherein the dual camera module may comprise: a PCB; a first image sensor dispose on the PCB; a second image sensor disposed on the PCB to be spaced apart from the first image sensor; a housing disposed on an upper side of the PCB; a first bobbin disposed at an inside of the housing to allow being moved from a position corresponding to the first image sensor to a first direction; a second bobbin disposed at an inside of the housing to allow being moved from a position corresponding to the second image sensor to a first direction and spaced apart from the first bobbin; a first coil disposed on the first bobbin; a second coil disposed on the second bobbin; a magnet disposed on the housing to face the first coil and the second coil; a base interposed between the housing and the PCB; a substrate including a circuit member having a third coil so disposed as to face the magnet between the housing and the base; and a support member movably supporting the housing relative to the substrate, wherein the housing may be integrally formed, the magnet may include a plurality of magnets, and at least one of the plurality of magnets may be disposed on a lateral part formed between corner portions of the housing.

Advantageous Effects

A mutual interference among magnets can be overcome in a VCM structure for dual OIS through the present exemplary embodiments.

A fear of magnetic interference among actuators can be removed through the present exemplary embodiments.

A power consumption resultant from actuator use can be reduced through the present exemplary embodiments.

Effects of securement of convenience and reduced process defect rate can be expected by simplifying tuning and process using one single actuator through the present exemplary embodiments.

BEST MODE

Figure 1:
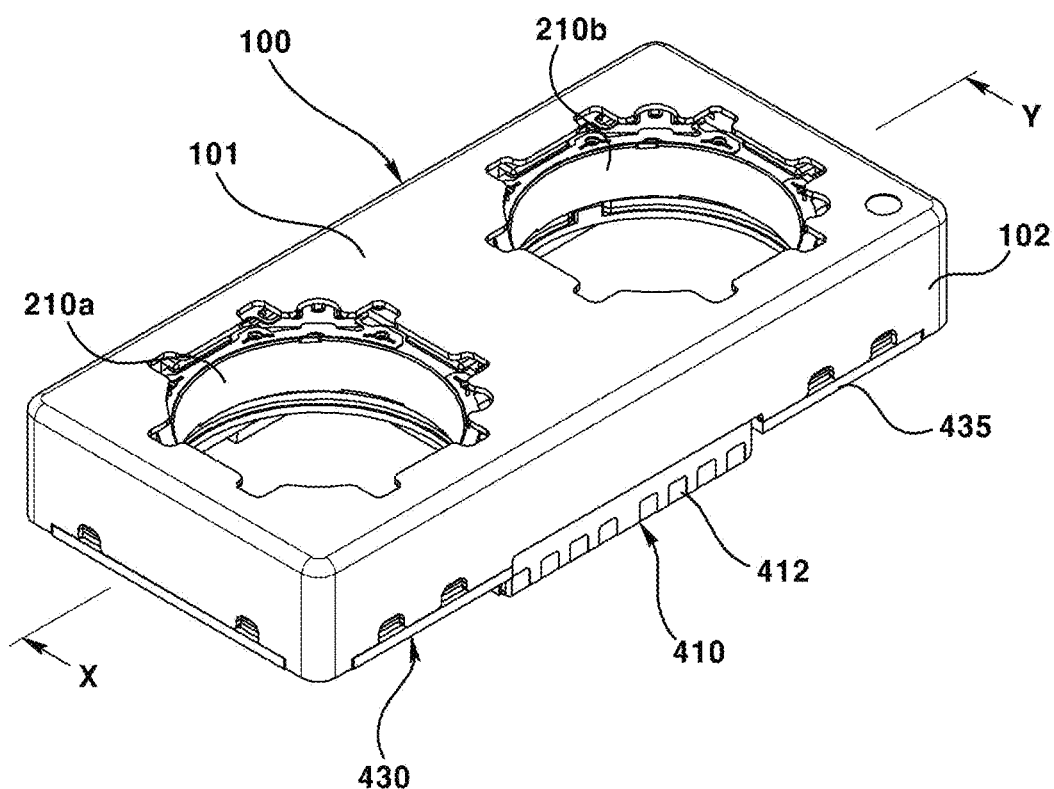
FIG. 1 is a perspective view of a dual lens drive device according to a first exemplary embodiment of the present invention.

Some exemplary embodiments of present invention will be described in detail with reference to the accompanying drawings. In describing a reference numeral for each element, a same reference numeral will be designated, if possible, for the same element, albeit being differently indicated on other drawings.

In describing elements in the exemplary embodiments of the present invention, the terms, first, second, A, B (a), (b), etc., may be used. These terms may be used only to distinguish one element from another element, and the nature, order or sequence is not restricted by these terms. When an element is referred to as being "accessed to", "coupled to," or "connected to," another element, it should be appreciated that the element may be directly accessed, connected or coupled to the other element, or intervening elements may be present therebetween.

The hereinafter-used term of "optical axis direction" may be defined as an optical axis direction of a lens module coupled to a lens drive device. Meantime, the "optical axis direction" may be interchangeably used with a vertical direction, a z axis direction and other directions.

The term of 'auto focus function' used hereinafter may be defined as a function of automatically matching a focus of a subject by adjusting a distance to an image sensor by moving a lens module to an optical axis direction according to a distance to the subject in order to obtain a clear image of the subject from an image sensor. Meantime, the "auto focus" may be interchangeably used with an "AF (Auto Focus)".

The term of 'handshake correction function' used hereinafter may be defined as a function of moving or tilting a lens module to a direction perpendicular to an optical axis in order to offset a vibration (movement) generated by an external force on an image sensor. Meantime, the 'handshake correction' may be interchangeably used with the 'OIS (Optical Image Stabilization)'.

Hereinafter, a configuration of an optical device according to a first exemplary embodiment of the present invention will be described.

The optical device may be any one of a hand phone, a mobile phone, a smart phone, a portable smart device, a digital camera, a notebook computer (laptop computer), a digital broadcasting terminal, a PDA (Personal Digital Assistant), a PMP (Portable Multimedia Player) and a navigation device. However, the present invention is not limited thereto, and may include any device capable of capturing an image or a photograph.

The optical device may include a main body (not shown), a dual camera module and a display part (not shown). However, any one or more of the main body, the dual camera module and the display part may be omitted or changed.

The main body may form an external shape of an optical device. The main body may include a cubic shape, for example. In another example, the main body may be at least partially rounded. The main body may accommodate a dual camera module. One surface of a main body may be disposed with a display part. One surface of main body may be disposed with a display part and a camera module, and the other surface of the main body (surface opposite to the said one surface) may be additionally disposed with a dual camera module.

The dual camera module may be disposed on the main body. The dual camera module may be disposed on one surface of main body. The dual camera module may capture an image of a subject. The dual camera module may be partially accommodated into the main body. The camera module may be formed in a plural number. At least one of the plurality of camera modules may be a dual camera module. A portion of the plurality of camera modules may be a single camera module (may be called a camera module). The plurality of camera modules may be respectively disposed on one surface and the other surface of the main body.

The display part may be disposed on the main body. The display part may be disposed on one surface of main body. That is, the display part may be disposed on a same surface as that of dual camera module. Alternatively, the display part may be disposed at the other surface of main body. The display part may be disposed on a surface disposed at an opposite surface of a surface disposed with the dual camera module. The display part may output an image captured by the dual camera module.

Hereinafter, configuration of a dual camera module according to a first exemplary embodiment of the present invention will be described with reference to the accompanying drawings.

Figure 14:
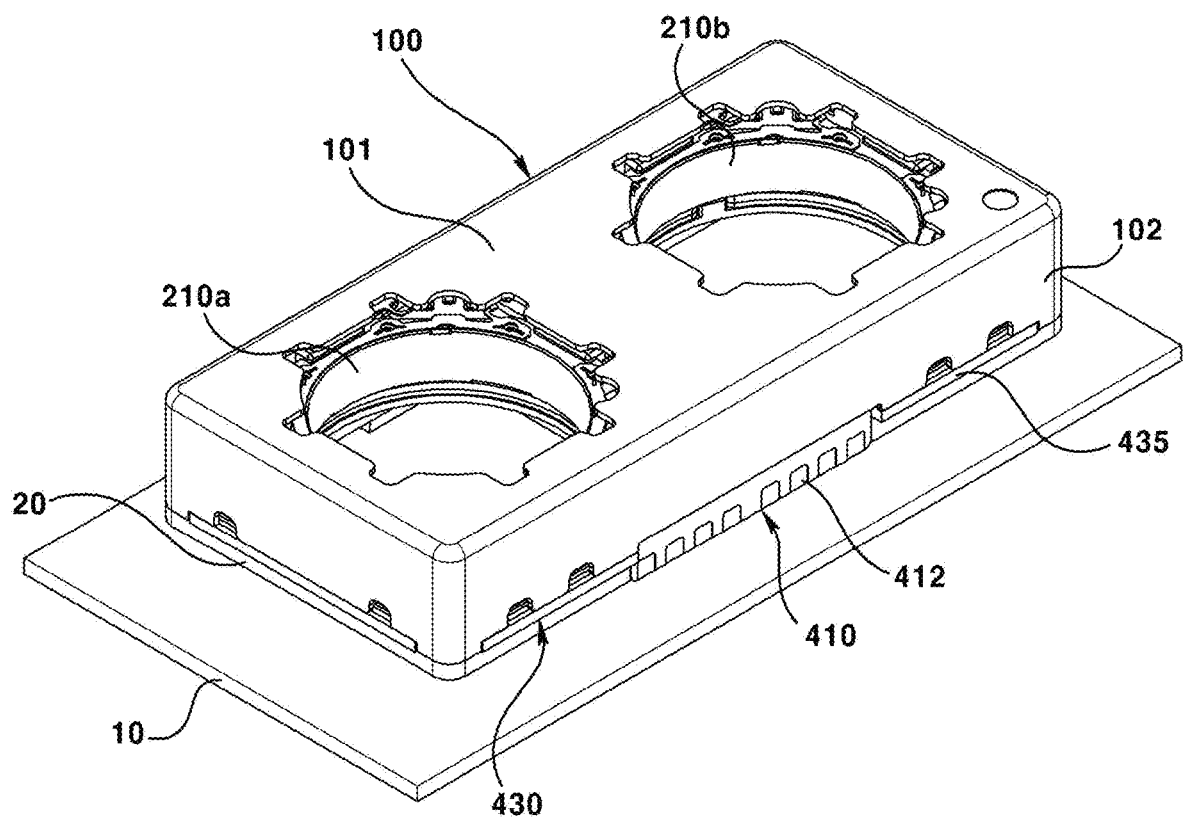
FIG. 14 is a perspective view of a dual camera module according to a first exemplary embodiment of the present invention.

FIG. 14 is a perspective view of a dual camera module according to a first exemplary embodiment of the present invention.

The dual camera module may further comprise a lens module (not shown), an infrared filter (not shown), a PCB (10), an image sensor (not shown), a controller (not shown) and a dual lens drive device. However, any one or more of the lens module, the UV cutting filter, the PCB (10), the image sensor, the controller and the dual lens drive device may be omitted or changed from the dual camera module.

The lens module may include at least one lens. The lens module may include a lens and a lens barrel. The lens module may include one or more lenses (not shown) and a lens barrel accommodating the lens. However, one element of the lens module is not limited to the lens barrel, and any holder structure capable of supporting one or more lenses may suffice for a lens module. The lens module may include a first lens module and a second lens module. The first lens module may be coupled to a first bobbin (210a). The second lens module may be coupled to a second bobbin (210b). The lens module may integrally move with the first and second bobbins (210a, 210b). The lens module may be coupled to the first and second bobbins (210a, 210b) by way of an adhesive (not shown). For example, the lens module may be screw-connected to the first and second bobbins (210a, 210b). Meantime, a light having passed the lens module may be irradiated on an image sensor. Furthermore, the flare phenomenon may be effectively removed by applying a black mask to a lens according to a first exemplary embodiment of the present invention.

The infrared filter may shield a light of infrared region from being incident on an image sensor. The infrared filter may be interposed between the lens module and the image sensor. For example, the infrared filter may be disposed on a holder member (20) separately disposed from a base (430). In another example, the infrared filter may be mounted on a through hole (431a, 431b) of the base (430). The infrared filter may include a first infrared filter and a second infrared filter. The first infrared filter may be mounted on the first through hole (431a) of base (430). The second infrared filter may be mounted on the second through hole (431b) of the base (430). The infrared filter may be formed with a film material or a glass material. The infrared filter may be formed by allowing an infrared cut-off coating material to be coated on a plate-shaped optical filter such as an imaging plane protection cover glass or a cover glass. For example, the infrared filter may be an infrared absorption filter absorbing the infrared. In another example, the infrared filter may be an infrared reflection filter reflecting the infrared.

The abovementioned black mask is to inhibit miscellaneous lights from being incident on an image sensor by flare phenomenon, and may be formed about an infrared filter. However, when a black mask is formed on an infrared filter, there may be a fear of positions of masks being alternately disposed due to accumulation of assembly tolerance in the process of applying two infrared filters when a dual lens is formed. Thus, in the present exemplary embodiment, when a dual lens is formed, a black mark may be formed on a lens module that passes through a separate alignment process.

The PCB (10) may be disposed at an upper surface with a base (430). The PCB (10) may be disposed at a lower surface of base (430). However, a separate holder member (20) may be interposed between the PCB (10) and the base (430). The PCB (10) may be disposed with an image sensor. The PCB (10) may be electrically connected to an image sensor. A light having passed the lens module of a dual camera module may be irradiated on an image sensor disposed on the PCB (10). The PCB (10) may supply a power (current) to first to third coils (220a, 220b, 422). Meantime, the PCB (10) may be disposed with a controller for controlling the dual lens drive device.

The image sensor may be disposed on the PCB (10). The image sensor may be electrically connected to the PCB (10). For example, the image sensor may be coupled to the PCB (10) by way of SMT (Surface Mounting Technology) method. In another example, the image sensor may be coupled to the PCB (10) by way of flip chip technology. The image sensor may include a first image sensor and a second image sensor. The first image sensor may be so disposed as to match a first lens module by way of optical axis. The second image sensor may be so disposed as to match a second lens module by way of optical axis. In other words, an optical axis of the image sensor and an optical axis of the lens module may be aligned, through which the image sensor can obtain a light having passed the lens module. The image sensor may convert a light irradiated on an effective image region to an electric signal. The image sensor may be a CCD (Charge Coupled Device), a MOS (Metal Oxide Semi-Conductor), a CPD and a CID. However, the types of image sensor (160) are not limited thereto, and any structure capable of converting an incident light to an electric signal may be included.

The controller may be mounted on the PCB (10). In another example, the controller may be disposed on an outside element aside from the PCB (10). The controller may individually control a direction, intensity and an amplitude of a current supplied to the first to third coils (220a, 220b, 422). The controller may perform any one or more of an AF function and an OIS function of the dual camera module by controlling the current supplied to the first to third coils (220a, 220b, 422). That is, the controller may move or tilt the lens module to an optical axis direction or to a direction perpendicular to the optical axis direction. Furthermore the controller may perform any one or more of the feedback control of the AF function and a feedback control of the OIS function. To be more specific, the controller may receive a position of a housing (310) detected by a sensor (800) to perform an OIS feedback control by controlling a current applied to the third coil (422). The feedback control by the controller thus mentioned may be generated in real time to allow performing a more accurate AF function and an OIS function.

Hereinafter, configuration of the dual lens drive device according to a first exemplary embodiment of the present invention will be described with reference to the accompanying drawings.

Figure 2:
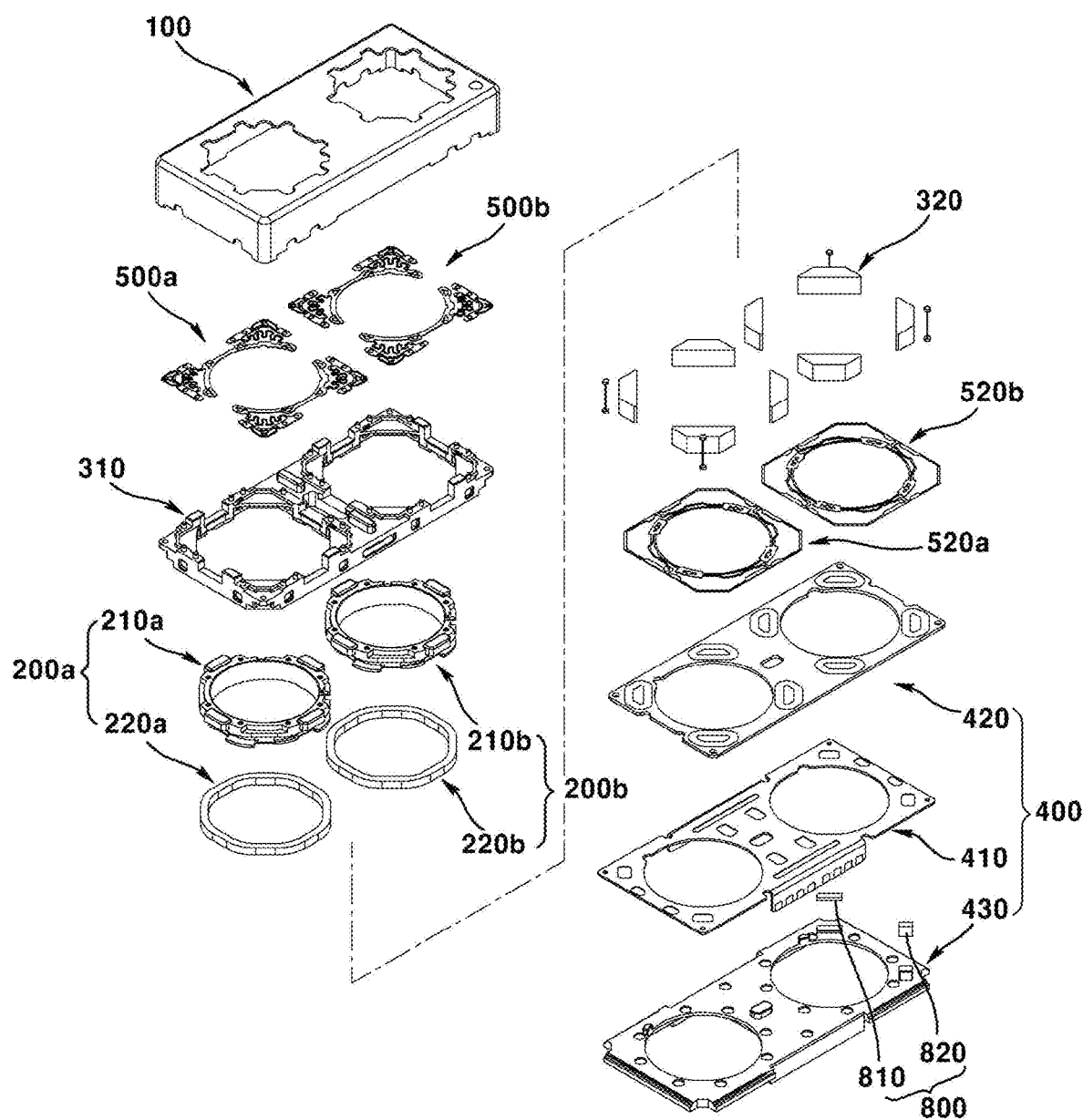
FIG. 2 is an exploded perspective view of a dual lens drive device according to a first exemplary embodiment of the present invention.
Figure 3:
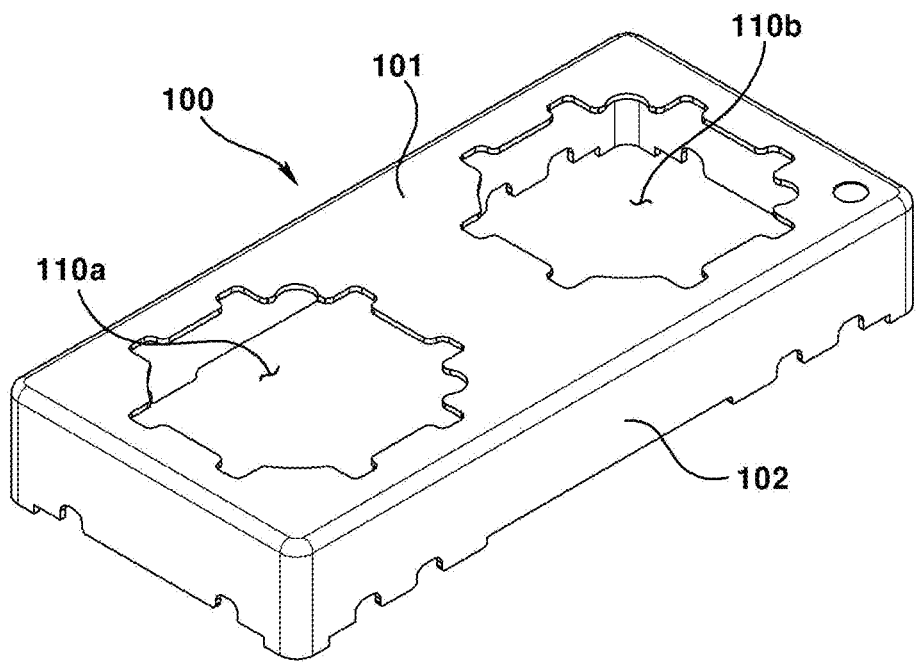
FIG. 3 is a perspective view of a cover member according to a first exemplary embodiment of the present invention.
Figure 4:
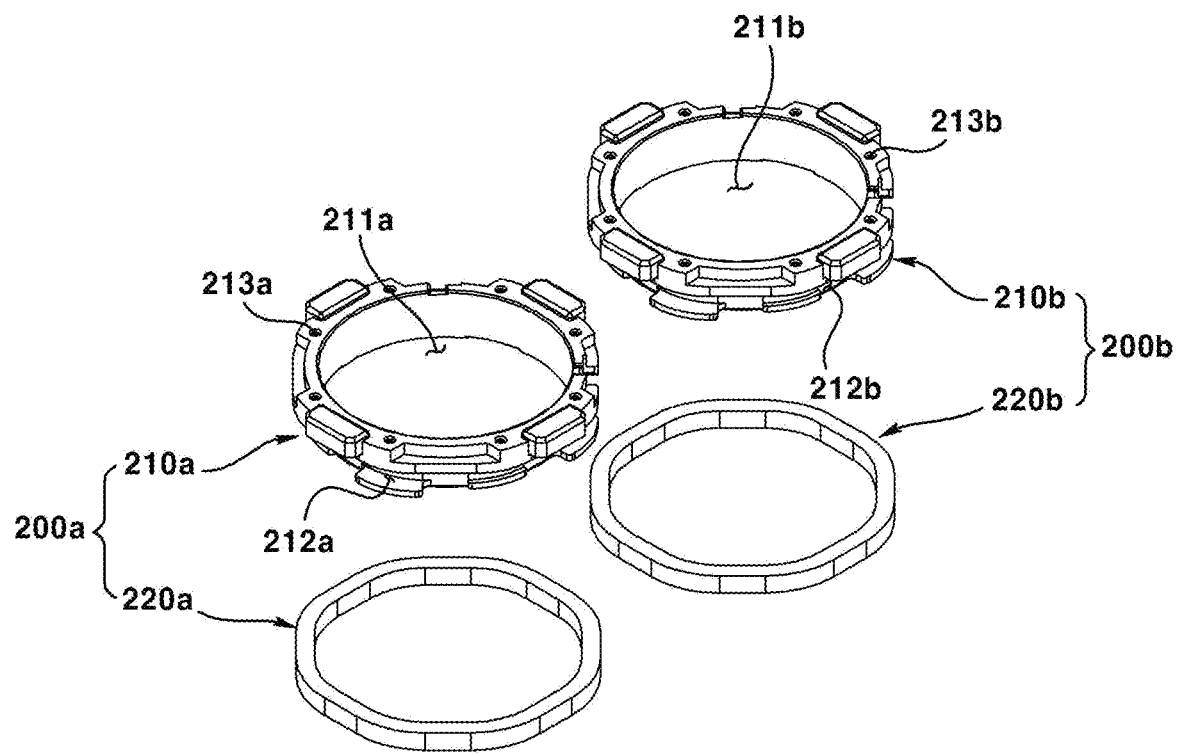
FIG. 4 is an exploded perspective view of a first AF mover and a second AF mover according to a first exemplary embodiment of the present invention.
Figure 5:
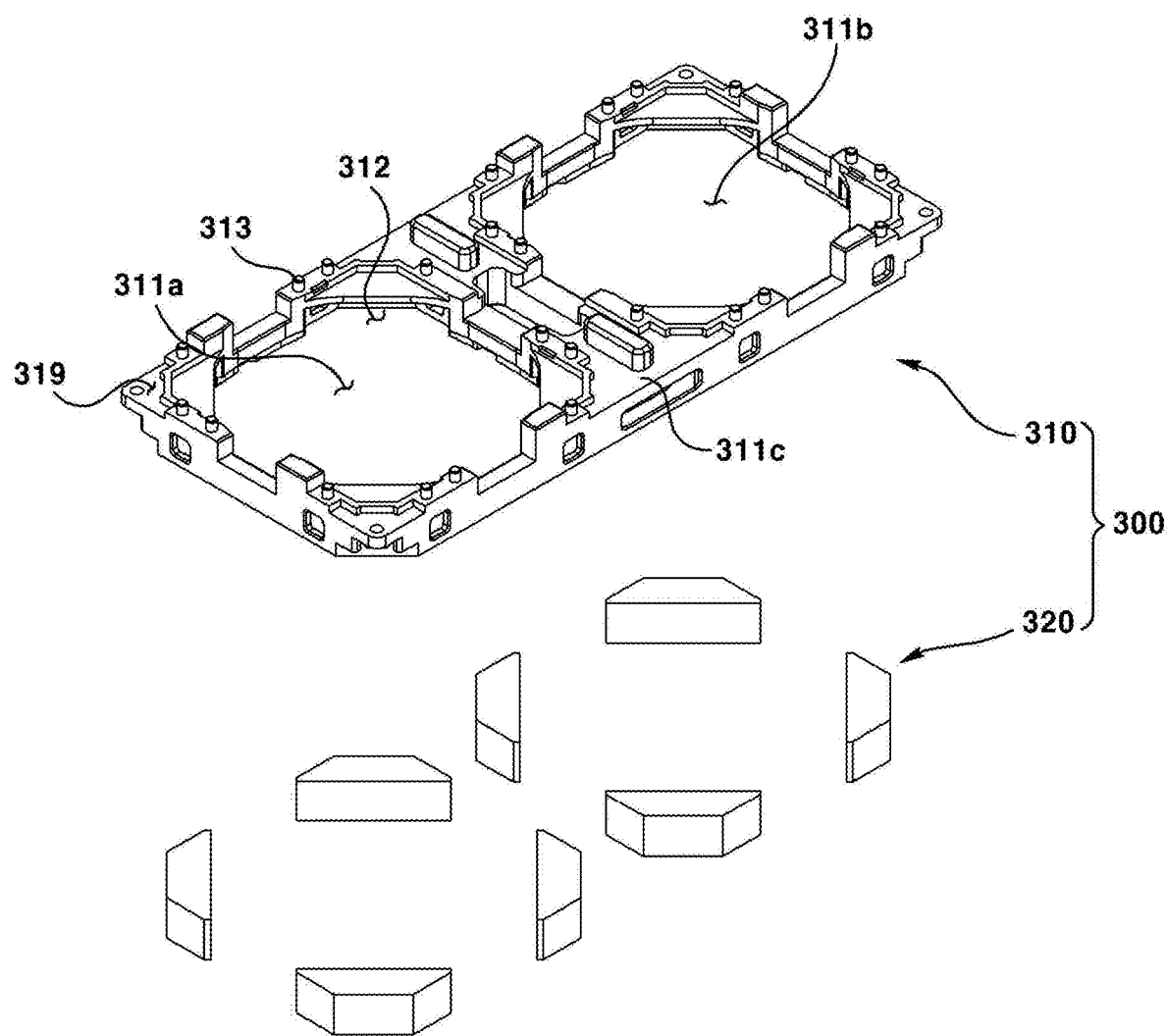
FIG. 5 is an exploded perspective view of an OIS mover according to a first exemplary embodiment of the present invention.
Figure 6:
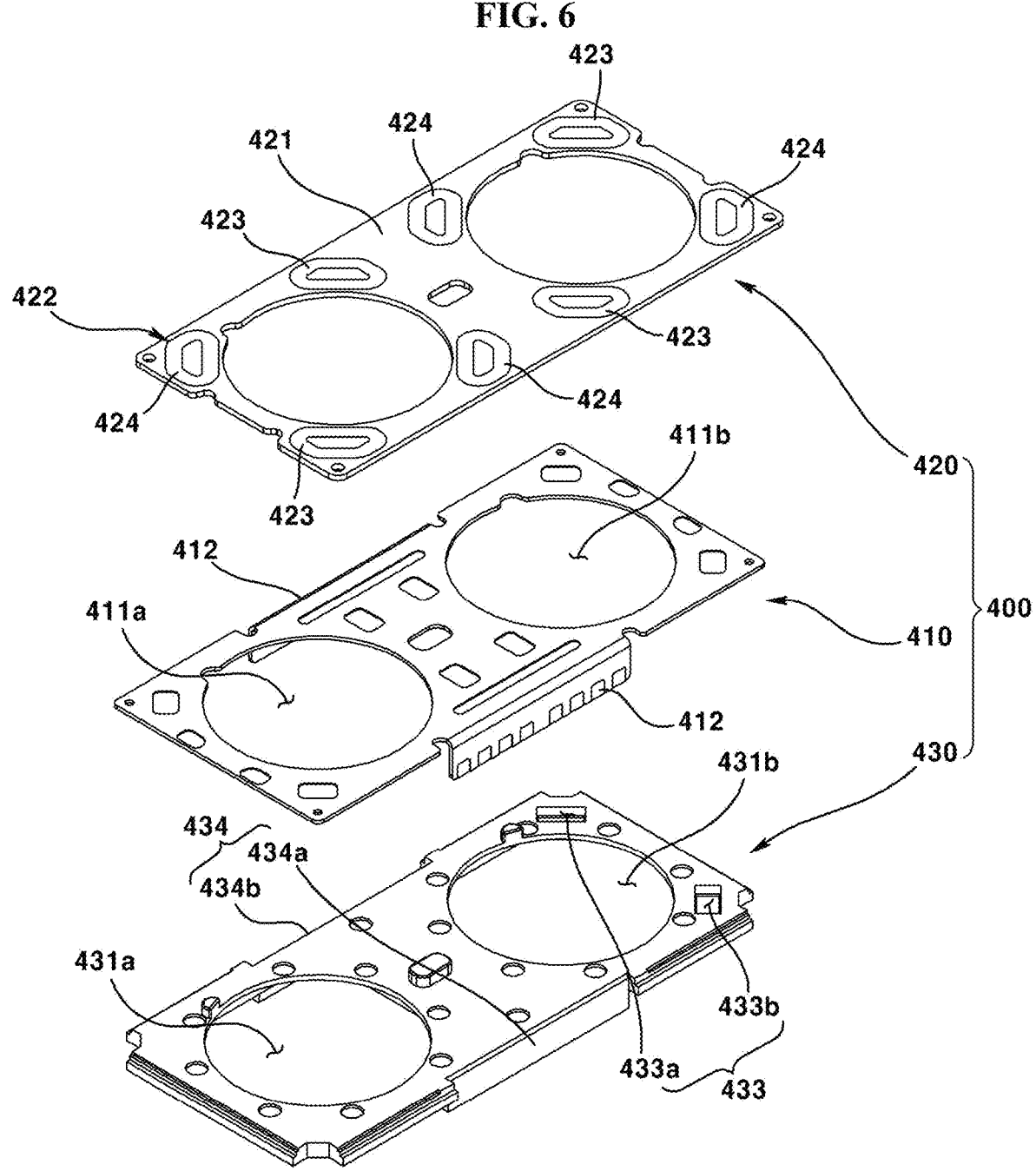
FIG. 6 is an exploded perspective view of a stator according to a first exemplary embodiment of the present invention.
Figure 7:
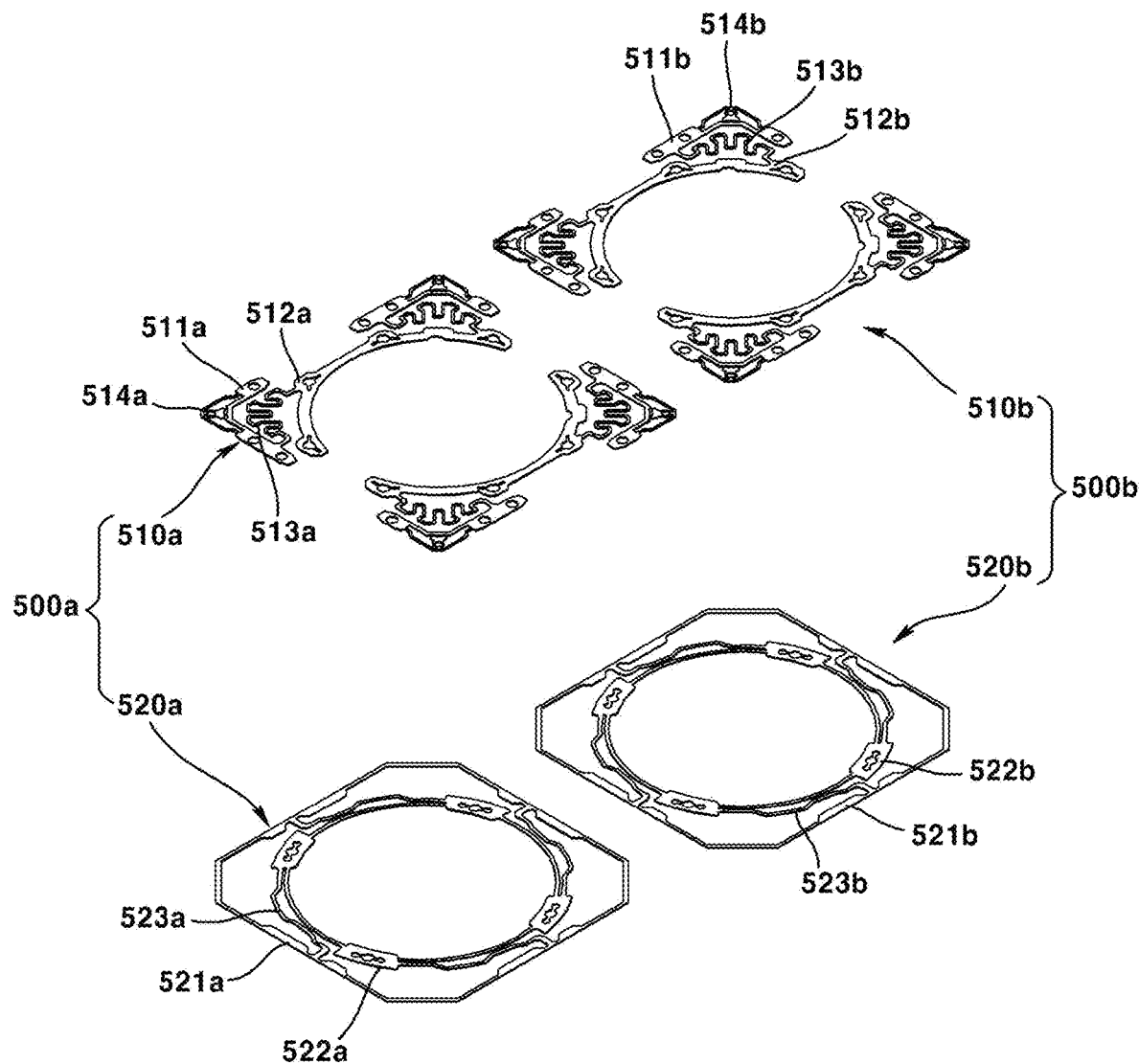
FIG. 7 is an exploded perspective view of a first elastic member and a second elastic member according to a first exemplary embodiment of the present invention.
Figure 8:
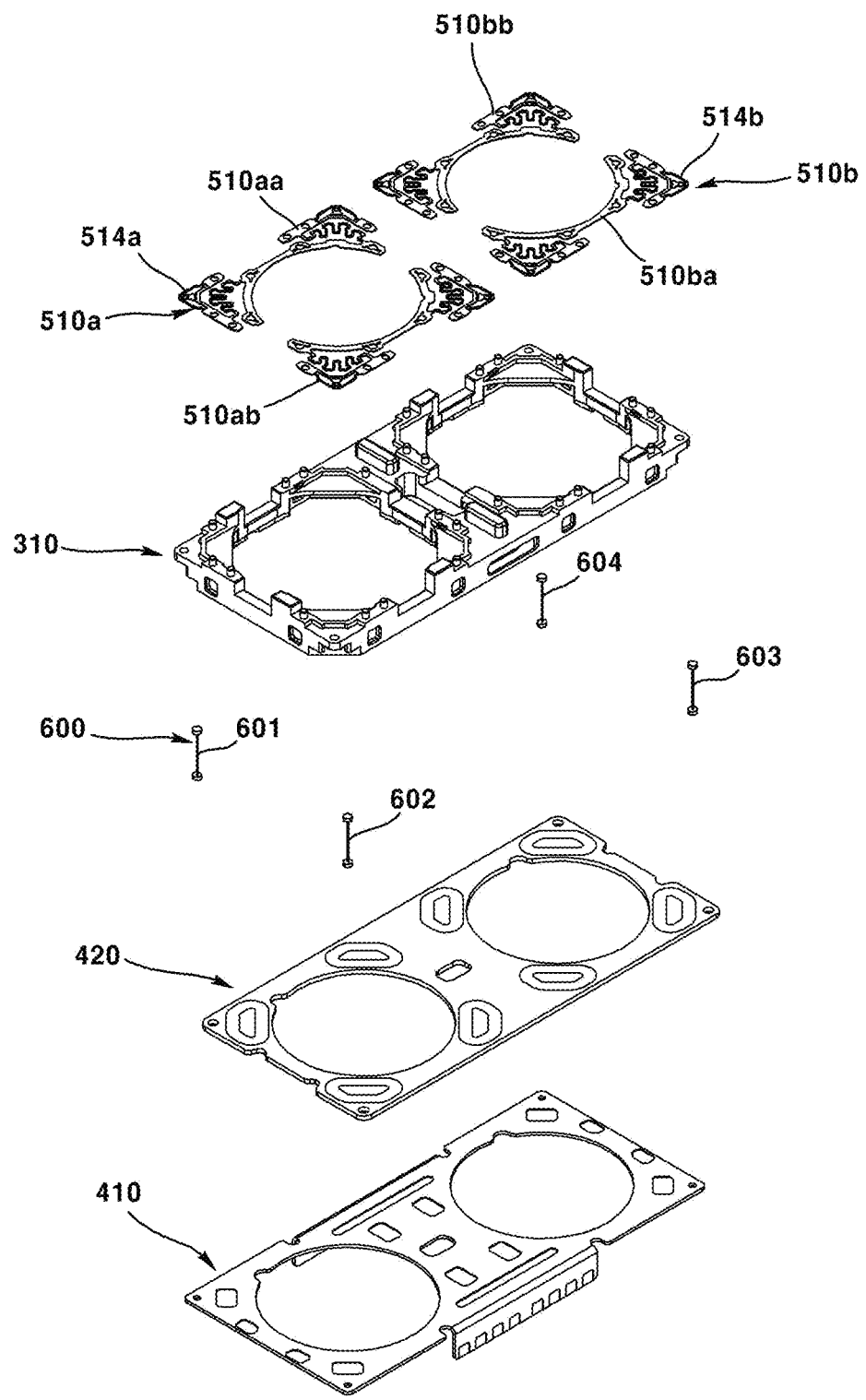
FIG. 8 is an exploded perspective view of a support member and related configuration according to a first exemplary embodiment of the present invention.
Figure 9:
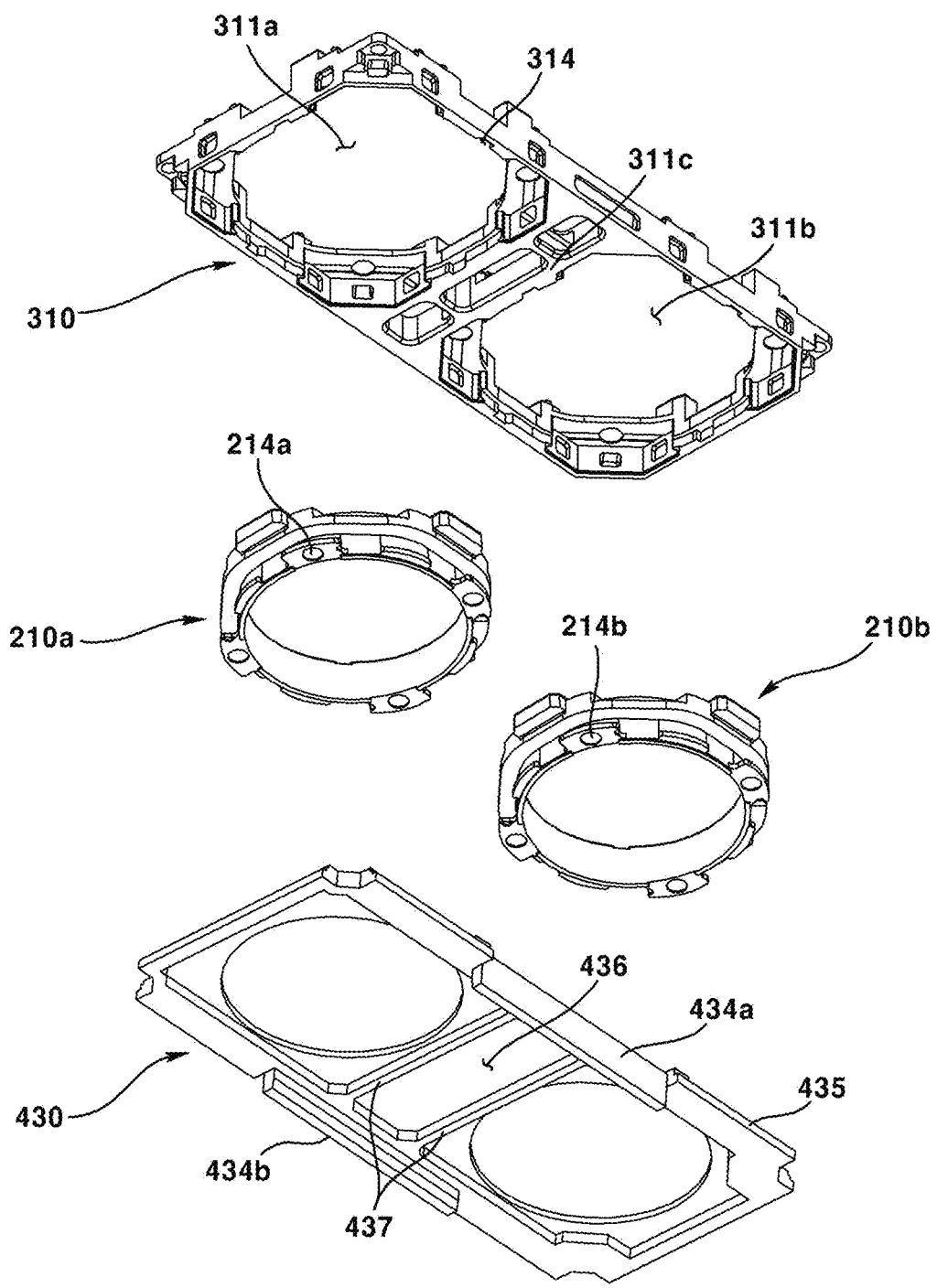
FIG. 9 is a bottom perspective view of a housing, a first bobbin, a second bobbin and a base according to a first exemplary embodiment of the present invention.
Figure 10:
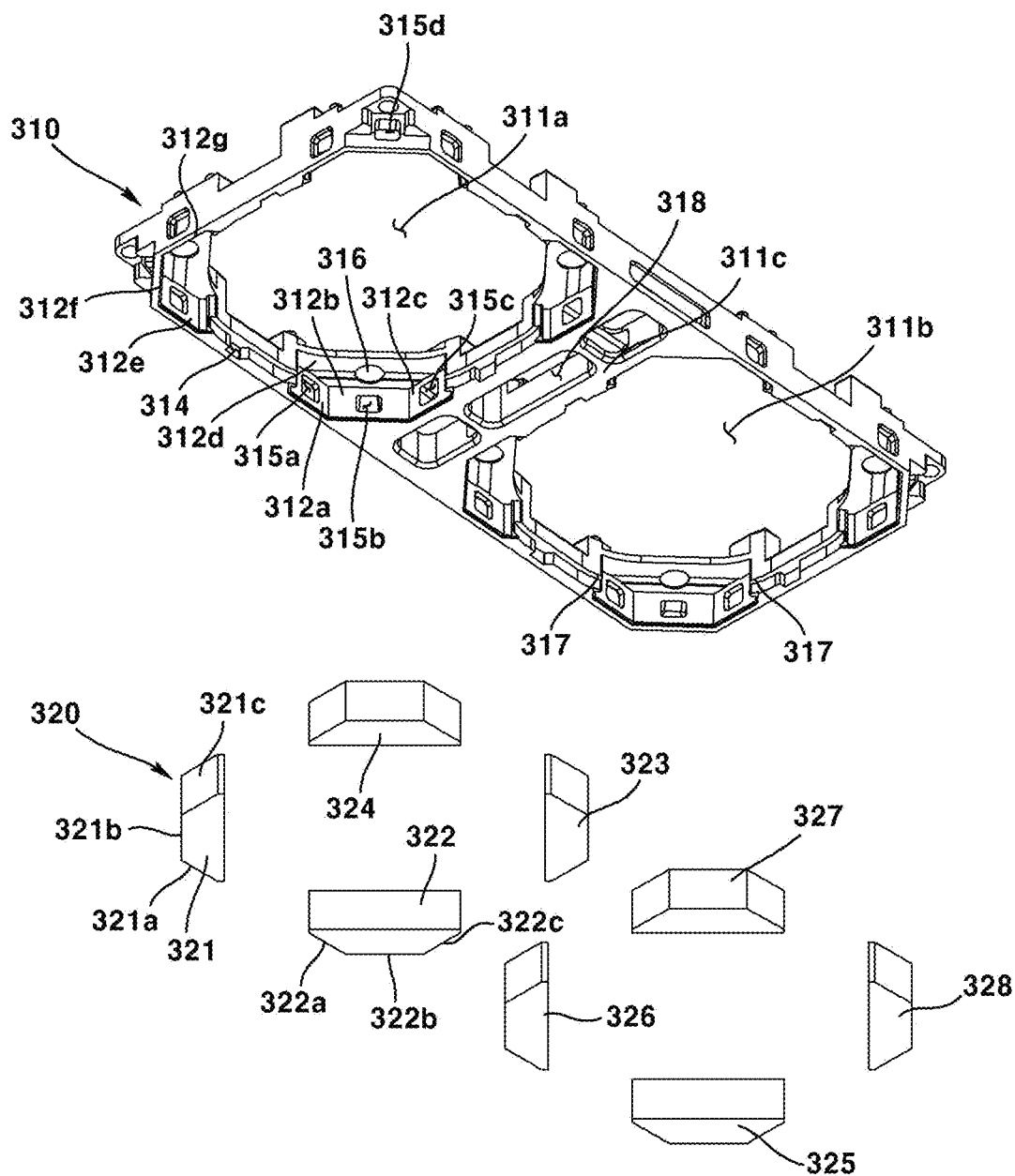
FIG. 10 is a bottom perspective view of a coupled structure between a housing and a magnet according to a first exemplary embodiment of the present invention.
Figure 11:
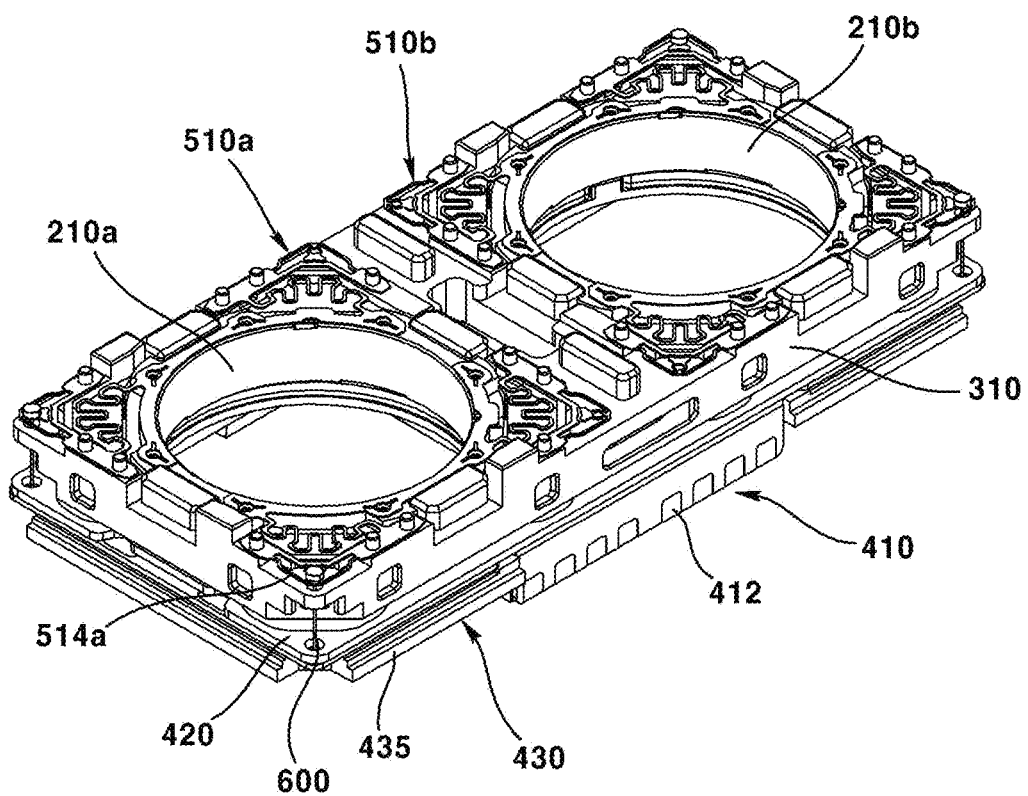
FIG. 11 is a perspective view illustrating a state where a cover member is omitted from FIG. 1.
Figure 12:
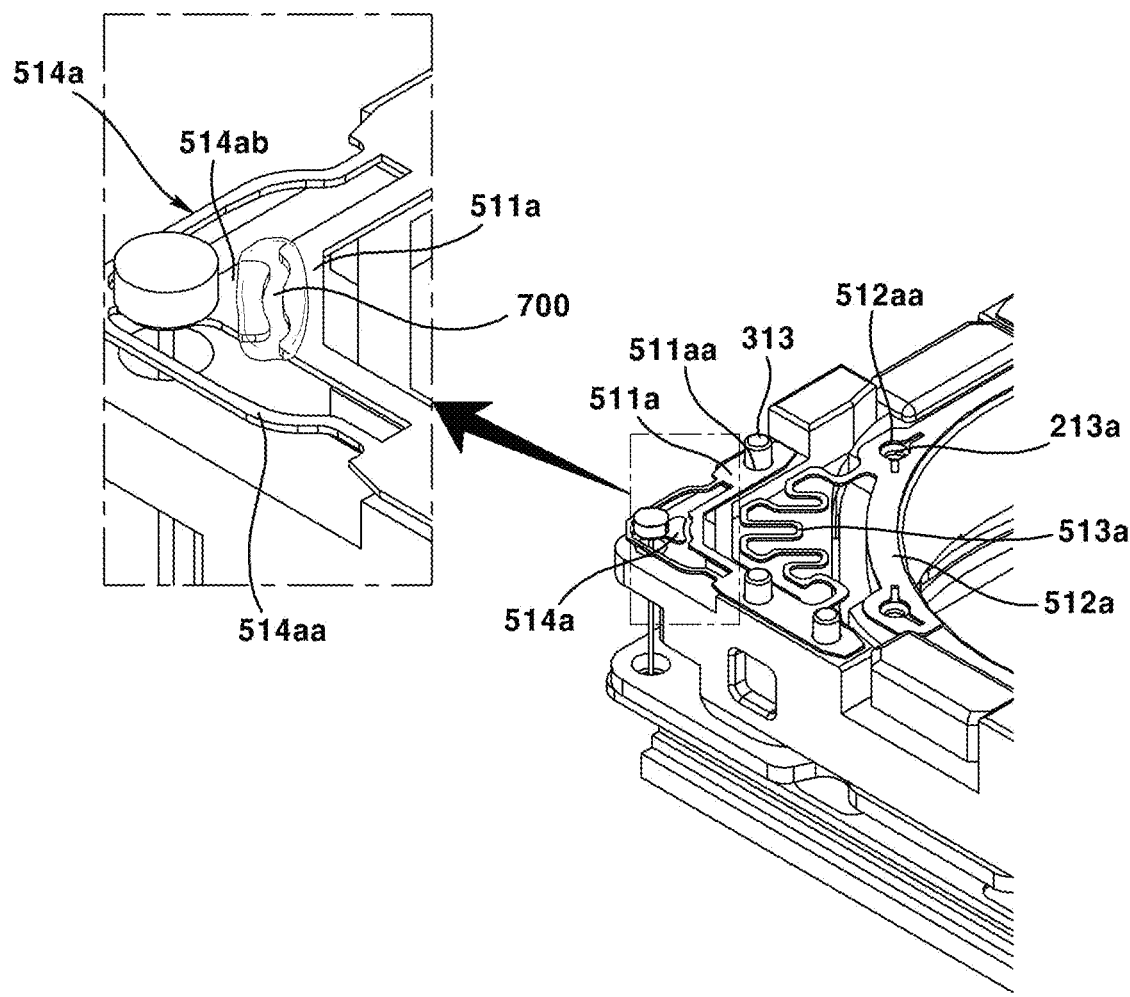
FIG. 12 is a perspective view illustrating by enlarging a portion of FIG. 11.
Figure 13:
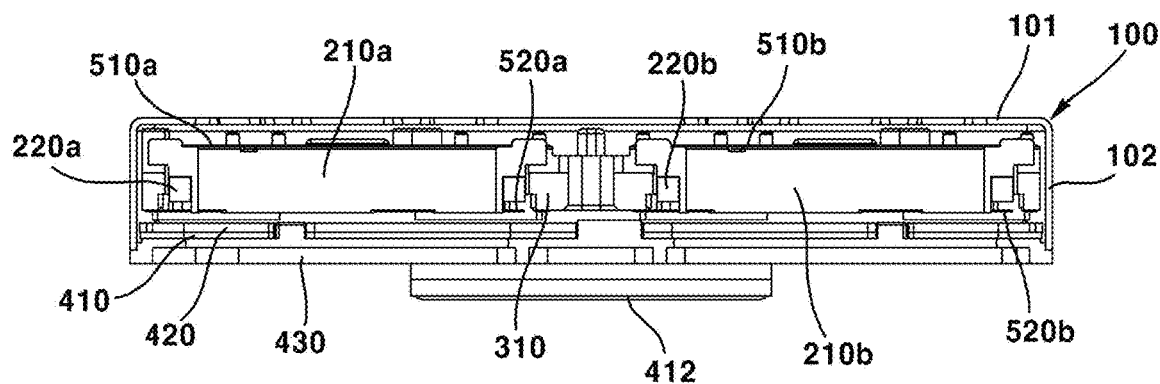
FIG. 13 is a cross-sectional view taken along line X-Y of FIG. 1.
Figure 15:
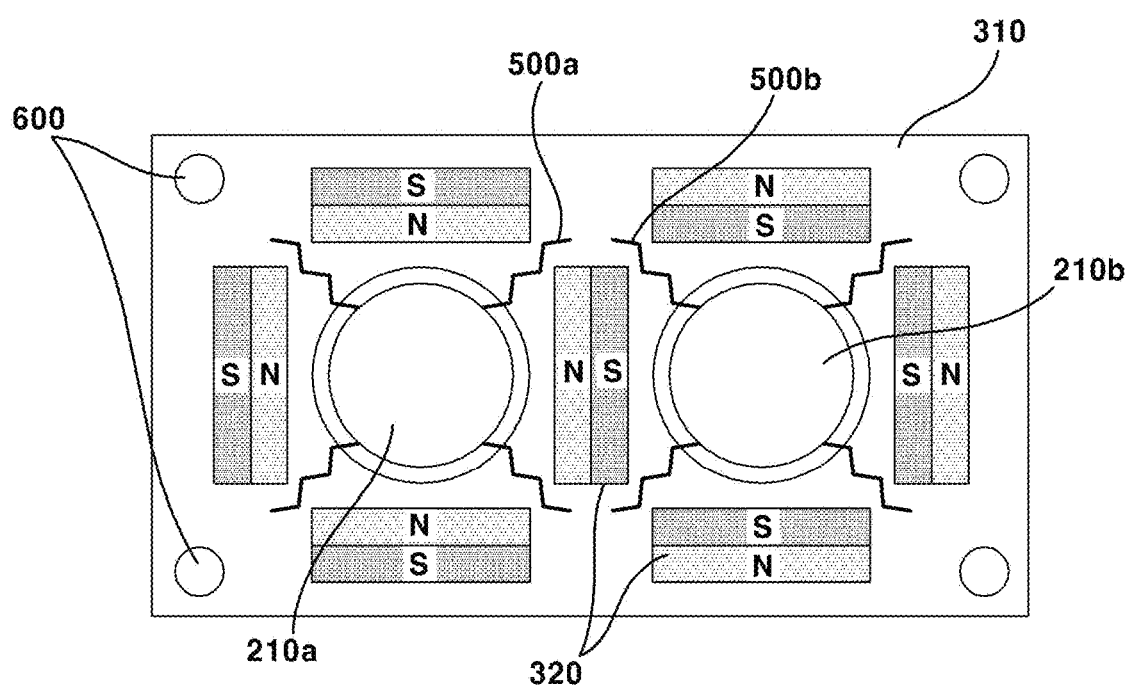
FIG. 15 is a conceptual view illustrating a dual lens drive device according to a modification.

FIG. 1 is a perspective view of a dual lens drive device according to a first exemplary embodiment of the present invention, FIG. 2 is an exploded perspective view of a dual lens drive device according to a first exemplary embodiment of the present invention, FIG. 3 is a perspective view of a cover member according to a first exemplary embodiment of the present invention, FIG. 4 is an exploded perspective view of a first AF mover and a second AF mover according to a first exemplary embodiment of the present invention, FIG. 5 is an exploded perspective view of an OIS mover according to a first exemplary embodiment of the present invention, FIG. 6 is an exploded perspective view of a stator according to a first exemplary embodiment of the present invention, FIG. 7 is an exploded perspective view of a first elastic member and a second elastic member according to a first exemplary embodiment of the present invention, FIG. 8 is an exploded perspective view of a support member and related configuration according to a first exemplary embodiment of the present invention, FIG. 9 is a bottom perspective view of a housing, a first bobbin, a second bobbin and a base according to a first exemplary embodiment of the present invention, FIG. 10 is a bottom perspective view of a coupled structure between a housing and a magnet according to a first exemplary embodiment of the present invention, FIG. 11 is a perspective view illustrating a state where a cover member is omitted from FIG. 1, FIG. 12 is a perspective view illustrating by enlarging a portion of FIG. 11, FIG. 13 is a cross-sectional view taken along line X-Y of FIG. 1, FIG. 14 is a perspective view of a dual camera module according to a first exemplary embodiment of the present invention, and FIG. 15 is a conceptual view illustrating a dual lens drive device according to a modification.

The dual lens drive device may comprise a cover member (100), a first AF mover (200a), a second AF mover (200b), an OIS mover (300), a stator (400), a first elastic member (500a), a second elastic member (500b), a support member (600), a damper (700) and a sensor (800). However, any one or more of the cover member (100), the first AF mover (200a), the second AF mover (200b), the OIS mover (300), the stator (400), the first elastic member (500a), the second elastic member (500b), the support member (600), the damper (700) and the sensor (800) may be omitted or changed from the dual lens drive device. Particularly, the sensor (800) may be omitted because of an element for OIS feedback control.

The cover member (100) may form an external shape of the dual lens drive device. The cover member (100) may take a bottom-opened cubic shape. However, the present invention is not limited thereto. The cover member (100) may be of a non-magnetic substance. If the cover member (100) is formed with a magnetic substance, the magnetic force of the cover member (100) may affect a magnet (320). The cover member (100) may be formed with a metal material. To be more specific, the cover member (100) may be formed with a metal plate. In this case, the cover member (100) may shield an EMI (Electro Magnetic Interference). Because of the said characteristic of the cover member (100), the cover member (100) may be called an "EMI shield can". The cover member (100) can shield radio waves generated from outside of the lens drive device from being introduced into the cover member (100). Furthermore, the cover member (100) may shield radio waves generated from inside of the cover member (100) from being discharged to outside of the cover member (100).

The cover member (100) may include an upper plate (101) and a side plate (102). The cover member (100) may include an upper plate (101) and a side plate (102) extended by being bent from the upper plate (101). The cover member (100) may include an upper plate (101) and a side plate (102) extended downwardly from an outer periphery of the upper plate (101). For example, the cover member (100) may be coupled to the base (430). A portion of the side plate (102) at the cover member (100) may be coupled to the base (430). A lower end of the side plate (102) of the cover member (100) may be coupled to a step (staircase, 430) of the base (430). The lower end of the side plate (102) may be coupled to the base (430). An inner lateral surface of the side plate (102) of the cover member (100) may be directly contacted to an outside lateral surface of the base (430). An inner lateral surface of the side plate (102) at the cover member (100) may be coupled to the base (430) by an adhesive (not shown). In another example, the cover member (100) may be directly coupled to an upper surface of the PCB (10). An inner space formed by the cover member (100) and the base (430) may be disposed with any one or more of a first AF mover (200a), a second AF mover (200b), an OIS mover (300), a stator (400), a first elastic member (500a), a second elastic member (500b) and a support member (600). Through this structure, the cover member (100) can protect inner elements from an outside shock and simultaneously inhibit an outside foreign object from being inwardly introduced. The cover member (100) may be integrally formed.

The cover member (100) may include a first opening (110a) and a second opening (110b). The cover member (100) may include a first opening (110a) on the upper plate (101) formed at a position corresponding to that of the first bobbin (210a). The cover member (100) may include a second opening (110b) on the upper plate (101) formed at a position corresponding to that of the second bobbin (210b).

The openings (110a, 110b) may be formed on the upper plate (101) of cover member (100). The openings (110a, 110b) may upwardly expose a lens module. The openings (110a, 110b) may take a shape corresponding to that of the lens module. Each of the openings (110a, 110b) may be greater in size than a diameter of lens module to allow the lens module to be assembled through the openings (110a, 110b). A light having been introduced into and through the openings (110a, 110b) may pass through the lens module. At this time, the light having passed the lens module may be converted to an electric signal by an image sensor and may be obtained as an image.

The first AF mover (200a) may be coupled with the first lens module. The first AF mover (200a) may be accommodated into an inside of the first lens module. An inner periphery surface of first AF mover (200a) may be coupled to an outer periphery surface of the first lens module. The first AF mover (200a) may be moved through interaction with the OIS mover (300) and/or the mover (400). At this time, the first AF mover (200a) may move integrally with the first lens module. The first AF mover (200a) may move for AF focus function.

The first AF mover (200a) may include a first bobbin (210a) and a second bobbin (220a). However, any one or more of the first bobbin (210a) and the second bobbin (220a) may be omitted or changed from the first AF mover (200a).

The first bobbin (210a) may be disposed at an inside of the housing (310). The first bobbin (210a) may be so disposed at an inside of the housing (310) as to move to a first direction. The first bobbin (210a) may be disposed at a first bobbin reception part (311a) of the housing (310). The first bobbin (210a) may move to an optical axis direction about the housing (310). The first bobbin (210a) may be so disposed at the first bobbin reception part (311a) of housing (310) as to move along an optical axis. The first bobbin (210a) may be coupled with the first lens module. An inner periphery surface of first bobbin (210a) may be coupled to an outer periphery surface of the first lens module. The first bobbin (210a) may be coupled with the first coil (220a). An outer periphery surface of first bobbin (210a) may be coupled by the first coil (220a). An upper surface of first bobbin (210a) may be coupled with a first upper elastic member (510a). A lower surface of first bobbin (210a) may be coupled with a first lower elastic member (520a).

The first bobbin (210a) may include a first through hole (211a), a first driving part coupling part (212a), a first reception groove (213a) and a second reception groove (214a). However, any one or more of the first through hole (211a), the first driving part coupling part (212a), the first reception groove (213a) and the second reception groove (214a) may be omitted from the first bobbin (210a).

The first through hole (211a) may be disposed at an inside of the first bobbin (210a). The first through hole (211a) may be so formed as to be opened at an upper side and a bottom side. The first through hole (211a) may be coupled by the first lens module. An inner periphery surface of the first through hole (211a) may be formed with a screw thread corresponding to that formed on an outer periphery surface of the first lens module. That is, the first through hole (211a) may be screw-connected with the first lens module. An adhesive may be interposed between the first lens module and the first bobbin (210a). At this time, the adhesive may be an epoxy hardened by any one or more of UV, heat and laser.

The first driving part coupling part (212a) may be coupled by a first coil (220a). The first driving part coupling part (212a) may be formed on an outer periphery surface of first bobbin (210a). The first driving part coupling part (212a) may be formed by a groove formed by allowing a portion of the outer periphery surface of first bobbin (210a) to be inwardly recessed. At this time, the first driving part coupling part (212a) may be accommodated by at least a portion of the first coil (220a). The first driving part coupling part (212a) may be integrally formed with the outer periphery surface of first bobbin (210a). For example, the first driving part coupling part (212a) may be continuously formed along the outer periphery surface of first bobbin (210a). At this time, the first driving part coupling part (212a) may be wound with the first coil (220a). In another example, the first driving part coupling part (212a) may be formed in a plural number, each being mutually spaced apart. At this time the first coil (220a) may be also formed in a plural number to be respectively coupled to the first driving part coupling part (212a). In still another example, the first driving part coupling part (212a) may be formed with an upper side opened or a bottom side opened. At this time, the first coil (220a) may be inserted into and coupled with the first driving part coupling part (212a) through the opening in a pre-wound state.

An upper surface of first bobbin (210a) may be formed with a first reception groove (213a) corresponding to a second coupling hole (512aa) of an inner part (512a) of the first upper elastic member (510a) and accommodating an adhesive. The first reception groove may be formed by allowing a portion of the upper surface of the first bobbin (213a) to be recessed. The first reception groove (213a) can accommodate an adhesive. The first reception groove (213a) may correspond to a second coupling hole (512aa) of the inner part (512a) of the first upper elastic member (510a). The first reception groove (213a) may be formed at a position corresponding to that of the second coupling hole (512aa) of the inner part (512a). The first reception groove (213a) may be formed with a shape corresponding to that of the second coupling hole (512aa) of the inner part (512a). The first reception groove (213a) may be coupled to the first upper elastic member (510a). The first reception groove (213a) may be coupled with the inner part (512a) of the first upper elastic member (510a).

A lower surface of first bobbin (210a) may be disposed with a second reception groove (214a) corresponding to a third coupling hole of the inner part (522a) of the first lower elastic member (520a) and accommodating an adhesive. The second reception groove (214a) may be formed by allowing a portion of a lower surface of the first bobbin (210a) to be recessed. The second reception groove (214a) can accommodate an adhesive. The second reception groove (214a) may correspond to a third coupling hole of the inner part (522a) of the first lower elastic member (520a). The second reception groove (214a) may be formed at a position corresponding to that of the third coupling hole of the inner part (522a). The second reception groove (214a) may be formed with a shape corresponding to that of the third coupling hole of the inner part (522a). The second reception groove (214a) may be coupled with the first lower elastic member (520a). The second reception groove (214a) may be coupled to the inner part (522a) of the first lower elastic member (520a).

The first coil (220a) may be disposed on the first bobbin (210a). The first coil (220a) may be disposed at an outer periphery surface of first bobbin (210a). The first coil (220a) may be directly wound on the first bobbin (210a). The first coil (220a) may face a magnet (320). In this case, when a current is supplied to the first coil (220a) to form a magnet field about the first coil (220a), the first coil (220a) may move relative to the magnet (320) in response to an electromagnetic interaction between the first coil (220a) and the magnet (320). The first coil (220a) may electromagnetically interact with the magnet (320). The first coil (220a) may move the first bobbin (210a) relative to the housing (310) to an optical axis through the electromagnetic interaction with the magnet (320). For example, the first coil (220a) may be an integrally formed coil. In another example, the first coil (220a) may include a plurality of coils each spaced apart from the other. The first coil (220a) may include four (4) coils each spaced apart. At this time, the said four coils may be disposed at an outer periphery surface of the first bobbin (210a) in order to allow two adjacent coils to mutually form a 90°.

The first coil (220a) may include a pair of lead cables for power supply. At this time, the pair of lead cables of the first coil (220a) may be electrically connected to a first upper elastic unit (510aa) and a second upper elastic unit (510ab) of the first upper elastic member (510a). That is, the first coil (220a) may receive a power through the first upper elastic member (510a). To be more specific, the first coil (220a) may receive a power sequentially through the PCB (10), the substrate (410), the support member (600) and the first upper elastic member (510a).

The second AF mover (200b) may be coupled with the second lens module. The second AF mover (200b) may be accommodated into an inside of the second lens module. An inner periphery of the second AF mover (200b) may be coupled to an outer periphery surface of the second lens module. The second AF mover (200b) may be moved through the interaction with the OIS mover (300) and/or the stator (400). At this time, the second AF mover (200*b*) may integrally move with the second lens module. The second AF mover (200*b*) may be moved for autofocus function. The second AF mover (200*b*) may move independently from the first AF mover (200*a*). A moving direction of the second AF mover (200*b*) and a moving direction of the first AF mover (200*a*) may be parallel.

The second AF mover (200*b*) may include a second bobbin (210*b*) and a second coil (220*b*). However, any one or more of the second bobbin (210*b*) and the second coil (220*b*) may be omitted or changed from the second AF mover (200*b*).

The second bobbin (210*b*) may be disposed at an inside of the housing (310). The second bobbin (210*b*) may be so disposed at an inside of the housing (310) as to move to a first direction. The second bobbin (210*b*) may be spaced apart from the first bobbin (210*a*). The second bobbin (210*b*) may be so disposed at an inside of the housing (310) as to move to the first direction. The second bobbin (210*b*) may be disposed on a second bobbin reception part (311*b*) of the housing (310). The second bobbin (210*b*) may be moved to an optical axis direction about the housing (310). The second bobbin (210*b*) may be disposed at the second bobbin reception part (311*b*) of the housing (310) as to be moved to an optical axis. The second bobbin (210*b*) may be coupled with the second lens module. An inner periphery surface of the second bobbin (210*b*) may be coupled by an outer periphery surface of the second lens module. The second bobbin (210*b*) may be coupled by the second coil (220*b*). An outer periphery surface of second bobbin (210*b*) may be coupled by the second coil (220*b*). An upper surface of second bobbin (210*b*) may be coupled by the second upper elastic member (510*b*). A lower surface of second bobbin (210*b*) may be coupled with the second lower elastic member (520*b*).

The second bobbin (210*b*) may include a second through hole (211*b*), a second driving part coupling part (212*b*), an upper reception groove (214*b*) and a lower reception groove (214*b*). However, any one or more of the second through hole (211*b*), the second driving part coupling part (212*b*), the upper reception groove (214*b*) and the lower reception groove (214*b*) may be omitted or changed from the second bobbin (210*b*).

The second through hole (211*b*) may be disposed at an inside of the second bobbin (210*b*). The second through hole (211*b*) may be so formed as to be opened at an upper side and a bottom side. The second through hole (211*b*) may be coupled by the second lens module. An inner periphery surface of the second through hole (211*b*) may be formed with a screw thread corresponding to that formed on an outer periphery surface of the second lens module. That is, the second through hole (211*b*) may be screw-connected with the second lens module. An adhesive may be interposed between the second lens module and the second bobbin (210*b*). At this time, the adhesive may be an epoxy hardened by any one or more of UV, heat and laser.

The second driving part coupling part (212*b*) may be coupled by a second coil (220*b*). The second driving part coupling part (212*b*) may be formed on an outer periphery surface of second bobbin (210*b*). The second driving part coupling part (212*b*) may be formed by a groove formed by allowing a portion of the outer periphery surface of second bobbin (210*b*) to be inwardly recessed. At this time, the second driving part coupling part (212*b*) may be accommodated by at least a portion of the second coil (220*b*). The second driving part coupling part (212*b*) may be integrally formed with the outer periphery surface of second bobbin (210*b*). For example, the second driving part coupling part (212*b*) may be continuously formed along the outer periphery surface of second bobbin (210*b*). At this time, the second driving part coupling part (212*b*) may be wound with the second coil (220*b*). In another example, the second driving part coupling part (212*b*) may be formed in a plural number, each being mutually spaced apart. At this time the second coil (220*b*) may be also formed in a plural number to be respectively coupled to the second driving part coupling part (212*b*). In still another example, the second driving part coupling part (212*b*) may be formed with an upper side opened or a bottom side opened. At this time, the second coil (220*b*) may be inserted into and coupled with the second driving part coupling part (212*b*) through the opening in a pre-wound state.

An upper surface of second bobbin (210*b*) may be formed with an upper reception groove (214*b*) corresponding to a second coupling hole of an inner part (512*b*) of the second upper elastic member (510*b*) and accommodating an adhesive. The upper reception groove (214*b*) may be formed by allowing a portion of the upper surface of the second bobbin (210*b*) to be recessed. The upper reception groove (214*b*) can accommodate an adhesive. The upper reception groove (214*b*) may correspond to a second coupling hole of the inner part (512*b*) of the second upper elastic member (510*b*). The upper reception groove (214*b*) may be formed at a position corresponding to that of the second coupling hole of the inner part (512*b*). The upper reception groove (214*b*) may be formed with a shape corresponding to that of the second coupling hole of the inner part (512*b*). The upper reception groove (214*b*) may be coupled to the second upper elastic member (510*b*). The upper reception groove (213*b*) may be coupled with the inner part (512*b*) of the second upper elastic member (510*b*).

A lower surface of second bobbin (210*b*) may be disposed with a lower reception groove (214*b*) corresponding to a third coupling hole of the inner part (522*b*) of the second lower elastic member (520*b*) and accommodating an adhesive. The lower reception groove (214*b*) may be formed by allowing a portion of a lower surface of the second bobbin (210*b*) to be recessed. The lower reception groove (214*b*) can accommodate an adhesive. The lower reception groove (214*b*) may correspond to a third coupling hole of the inner part (522*b*) of the second lower elastic member (520*b*). The lower reception groove (214*b*) may be formed at a position corresponding to that of the third coupling hole of the inner part (522*b*). The lower reception groove (214*b*) may be formed with a shape corresponding to that of the third coupling hole of the inner part (522*b*). The lower reception groove (214*b*) may be coupled with the second lower elastic member (520*b*). The lower reception groove (214*b*) may be coupled to the inner part (522*b*) of the second lower elastic member (520*b*).

The second coil (220*b*) may be disposed on the second bobbin (210*b*). The second coil (220*b*) may be disposed at an outer periphery surface of the second bobbin (210*b*). The second coil (220*b*) may be directly wound on the second bobbin (210*b*). The second coil (220*b*) may face a magnet (320). In this case, when a current is supplied to the second coil (220*b*) to form a magnet field about the second coil (220*b*), the second coil (220*b*) may move relative to the magnet (320) in response to an electromagnetic interaction between the second coil (220*b*) and the magnet (320). The second coil (220*b*) may electromagnetically interact with the magnet (320). The second coil (220*b*) may move the second bobbin (210*b*) relative to the housing (310) to an optical axis through the electromagnetic interaction with the magnet (320). For example, the second coil (220b) may be an integrally formed coil. In another example, the second coil (220b) may include a plurality of coils each spaced apart from the other. The second coil (220b) may include four (4) coils each spaced apart. At this time, the said four coils may be disposed at an outer periphery surface of the second bobbin (210b) in order to allow two adjacent coils to mutually form a 90°.

The second coil (220b) may include a pair of lead cables for power supply. At this time, the pair of lead cables of the second coil (220b) may be electrically connected to a third upper elastic unit (510ba) of the second upper elastic member (510b) and a fourth upper elastic unit (510bb). That is, the second coil (220b) may receive a power through the second upper elastic member (510b). To be more specific, the second coil (220b) may receive a power sequentially through the PCB (10), the substrate (410), the support member (600) and the first upper elastic member (510b).

The OIS mover (300) may accommodate, at an inside, at least a portion of a first AF mover (200a) and a second AF mover (200b). The OIS mover (300) may move the first AF mover (200a) and the second AF mover (200b) or may move along with the first AF mover (200a) and the second AF mover (200b). The OIS mover (300) may be moved through the interaction with the stator (400). The OIS mover (300) may be moved for OIS function. The OIS mover (300) may be integrally moved with the AF movers (200a, 200b) for the OIS function.

The OIS mover (300) may include a housing (310) and a magnet (320). However, any one or more of the housing (310) and the magnet (320) may be omitted or changed from the OIS mover (300).

The housing (310) may be disposed at an outside of the bobbin (210a, 210b). The housing (310) may accommodate, at an inside thereof, at least a portion of the bobbin (210a, 210b). For example, the housing (310) may take a cubic shape. The housing (310) may include four side surfaces, and four corner portions disposed among the four side surfaces. The housing (310) may be disposed with a magnet (320). Each of the four corner portions of housing (310) may be disposed with the magnet (320). In a modification, each of the four side surfaces of the housing (310) may be disposed with the magnet (320). At least a portion of an outer periphery surface of housing (310) may take a shape corresponding to that of an inner periphery surface of cover member (100). Particularly, the outer periphery surface of housing (310) may take shape corresponding to that of an inner periphery surface of side (lateral) plate (102) of cover member (100). The housing (310) may be formed with an insulation material. The housing (310) may be formed with a material different from that of the cover member (100). The housing (310) may be formed with an injection object in consideration of productivity. An outer lateral surface of housing (310) may be spaced apart from an inner lateral surface of side (lateral) plate (102) at the cover member (100). The housing (310) may move for OIS driving in a discrete space between the housing (310) and the cover member (100). An upper surface of housing (310) may be coupled by the upper elastic member (510a, 510b). A lower surface of housing (310) may be coupled by the lower elastic member (520a, 520b).

The housing (310) in the first exemplary embodiment of the present invention may be integrally formed. That is, in the first exemplary embodiment of the present invention, two driving parts for AF driving are separately controlled while a driving part for OIS driving is singly controlled. In other words, in the first exemplary embodiment of the present invention, although the first lens module and the second lens module are separately moved during AF driving, the first lens module and the second lens module are integrally moved during OIS driving. The mutual interference among magnets can be ruled out in the VCM structure for dual OIS through the first exemplary embodiment of the present invention.

The housing (310) may include a bobbin reception part (311a, 311b), a connection part (311c), a driving part coupling part (312), a lug (313), a third reception groove (314), a through hole (315a, 315b, 315c, 315d), a reception groove (316), a support part (317), a fifth through hole (318) and a recessed part (319). However, any one or more of the bobbin reception part (311a, 311b), the connection part (311c), the driving part coupling part (312), the lug (313), the third reception groove (314), the through hole (315a, 315b, 315c, 315d), the reception groove (316), the support part (317), the fifth through hole (318) and the recessed part (319) may be omitted or changed from the housing (310).

The housing (310) may include a first bobbin reception part (311a) disposed with a first bobbin (210a), a second bobbin reception part (311b) disposed with a second bobbin (210b), and a connection part (311c) connecting the first bobbin (210a) reception part and the second bobbin (210b) reception part.

The bobbin reception part (311a, 311b) may be formed on the housing (310). The bobbin reception part (311a, 311b) may be formed at an inside of the housing (310). The bobbin reception part (311a, 311b) may include a through hole so formed as to vertically pass through the housing (310). The bobbin reception part (311a, 311b) may include a first bobbin reception part (311a) and a second bobbin reception part (311b). The first bobbin reception part (311a) may be disposed with a first bobbin (210a). The second bobbin reception part (311b) may be disposed with a second bobbin (210b). The bobbin reception part (311a, 311b) may be movably disposed with the (210a, 210b). At least a portion of the bobbin reception part (311a, 311b) may take a shape corresponding to that of the bobbin (210a, 210b). An inner periphery surface of the housing (310) forming a through hole of the bobbin reception part (311a, 311b) may be spaced apart from an outer periphery surface of the bobbin (210a, 210b). However, a portion of the bobbin (210a, 210b) may be formed with a stopper protruding to an outside to contact an upper surface of the housing (310) and to mechanically restrict an optical axis direction movement of the bobbin (210a, 210b). The connection part (311c) may connect the first bobbin reception part (311a) and the second bobbin reception part (311b). The connection part (311c) may be interposed between the first bobbin (210a) and the second bobbin (210b).

The driving part coupling part (312) may be coupled by a magnet (320). The driving part coupling part (312) may be formed on the housing (310). The driving part coupling part (312) may be formed on an inner periphery surface of the housing (310). In this case, it is advantageous for the magnet (320) disposed on the driving part coupling part (312) to electromagnetically interact with the first and second coils (220a, 220b) disposed on an inside of the magnet (320). The driving part coupling part (312) may take a bottom-opened shape. In this case, the magnet (320) disposed on the driving part coupling part (312) may have an advantageous electromagnetic interaction with the third coil (422) disposed at a lower side of the magnet (320). The driving part coupling part (312) may be formed as a groove formed by allowing an inner periphery surface of housing (310) to be outwardly recessed. At this time, the driving part coupling part (312)

may be formed in a plural number. Meantime, each of the driving part coupling part (312) may be accommodated by a magnet (320). For example, the driving part coupling part (312) may be divided to eight (8) pieces. Each of the eight driving part coupling parts (312) may be disposed with a magnet (320). The driving part coupling part (312) may be formed on a corner portion of the housing (310). In a modification, the driving part coupling part (312) may be formed on a lateral surface of housing (310).

The housing (310) may include a first coupling surface (312a) coupled with a first lateral surface (322a) of second corner magnet (322), a second coupling surface (312b) coupled with a second lateral surface (322b) of second corner magnet (322) and a third coupling surface (312c) coupled with a third lateral surface (322c) of second corner magnet (322). The second coupling surface (312b) may be formed between the first coupling surface (312a) and the third coupling surface (312c). The housing (310) may include a fourth coupling surface (312d) coupled with an upper surface of second corner magnet (322). That is, the housing (310) may be coupled with at least four (4) surfaces of the second corner magnet (322). The housing (310) may be coupled with at least four surfaces of second corner magnet (322) using an adhesive.

The housing (310) may include a fifth coupling surface (312e) coupled with a first lateral surface (321a) of first corner magnet (321), a sixth coupling surface (312f) coupled with a second lateral surface (312b) of first corner magnet (321), and a seventh coupling surface (312g) coupled with a third lateral surface (321c) of first corner magnet (312). The sixth coupling surface (312f) may be formed between the fifth coupling surface (312e) and the seventh coupling surface (312g). The housing (310) may be coupled with at least four (4) surfaces of the first corner magnet (321). The housing (310) may be coupled with at least four surfaces of first corner magnet (321) using an adhesive.

The housing (310) may be formed with a first through hole (315a) passing through a portion of a lateral surface of housing (310) and through a portion of the first coupling surface (312a). The housing (310) may be formed with a second through hole (315b) passing through a portion of a lateral surface of housing (310) and through a portion of the second coupling surface (312b).

The housing (310) may be formed with a third through hole (315c) passing through a portion of a lateral surface of housing (310) and through a portion of the third coupling surface (312c). The first through hole (315a), the second through hole (315b) and the third through hole (315c) may be used in order to infuse an adhesive between the housing (310) and the second corner magnet (322). Thus, the first through hole (315a), the second through hole (315b) and the third through hole (315c) may be respectively called an "adhesive infused hole". The second through hole (315b) may pass through a portion of a lateral surface of connection part (311c) and through a portion of the second coupling surface (312b). The third through hole (315c) may pass through a portion of a lower surface of connection part (311c) and through a portion of the third through hole (312c).

The housing (310) may be formed with a fourth through hole (315d) passing through a portion of a corner surface of housing (310) and through a portion of the sixth coupling surface (312f). The fourth through hole (315d) may be used in order to infuse an adhesive between the housing (310) and the first corner magnet (321). Thus, the fourth through hole (315d) may be also called an "adhesive infused hole".

The fourth coupling surface (312d) of housing (310) may be disposed with a reception groove (316) formed by allowing a portion of the fourth coupling surface (312d) to be recessed. The reception groove (316) may accommodate a portion of the adhesive disposed between the housing (310) and the second corner magnet (322).

A lug (313) may be coupled with the upper elastic member (510a, 510b). The lug (313) may be coupled with the outer part (511a, 511b) of the upper elastic member (510a, 510b). The lug (313) may be so formed as to protrude from an upper surface of housing (310). For example, the lug (313) may be coupled by being inserted into a first coupling hole (511aa) of the outer part (511a, 511b) of the upper elastic member (510a, 510b). At this time, the lug (313) may be fused while being inserted into the first coupling hole (511aa) of the outer part (511a, 511b) to fix the upper elastic member (510a, 510b) between the fused lug (313) and an upper surface of housing (310).

A lower surface of housing (310) may be formed with a third reception groove (314) corresponding to the fourth coupling hole of the outer part (521a) of the first lower elastic member (520a) and accommodating an adhesive. The third reception groove (314) may be disposed by allowing a portion of a lower surface of housing (310) to be recessed. The third reception groove (314) may accommodate an adhesive. The third reception groove (314) may correspond to the fourth coupling hole of the outer part (521a) of the lower elastic member (520a). The third reception groove (314) may be formed at a position corresponding to that of the fourth coupling hole of outer part (521a). The third reception groove (314) may be formed with a shape corresponding to that of the fourth coupling hole of the outer part (521a). The third reception groove (314) may be coupled with the first lower elastic member (520a). The third reception groove (314) may be coupled with the outer part (521a) of the first lower elastic member (520a).

The housing (310) may be formed with a support part (317) supporting both distal ends of inner lateral surface of magnet (320) from an inside. The support part (317) may be protrusively formed on the housing (310). The support part (317) may support both distal ends of inner lateral surface of the magnet (320) from an inside. That is, the support part (317) may support an inner lateral surface of magnet (320) to inhibit a phenomenon of the magnet (320) from being disengaged toward an inside of the housing (310).

The housing (310) may be formed with a fifth through hole (318) spaced apart from the third through hole (315c) by passing through the connection part (311c) to an optical axis direction. The fifth through hole (318) may be formed by passing through the connection part (311c) of housing (310) to an optical axis direction. The fifth through hole (318) may be spaced apart from the third through hole (315c). The third through hole (315C) is formed with a purpose of inserting an adhesive, and the fifth through hole (318) is formed with a purpose of thinning/slimming the product.

The housing (310) may include a recessed part (319) formed by allowing a portion of an upper surface of housing (310) to be recessed. The recessed part (319) may be formed by allowing a portion of the upper surface of housing (310) to be recessed. The recessed part (319) may be formed on a corner of the housing (310). A portion of the recessed part (319) may be overlapped with the coupling part (514a) to an optical axis direction. Through this structure, the recessed part (319) can accommodate a damper even if the damper (700) coated on the coupling part (514a) overflows.

A coupled structure of housing (310) with eight (8) corner magnets (321, 322, 323, 324, 325, 326, 327, 328) has been so far explained. However, an explanation on the first corner magnet (321) may be inferrably applied to the fourth corner magnet (321), the fifth corner magnet (325) and the eighth corner magnet (328), both of which are relatively outwardly arranged. Furthermore, an explanation on the second corner magnet (322) may be inferrably applied to the third corner magnet (323), the sixth corner magnet (326) and the seventh corner magnet (327) which are relatively outwardly arranged.

The magnet (320) may be disposed on the housing (310). The magnet (320) may be disposed at an outside of first and second coils (220a, 220b). The magnet (320) may face the first and second coils (220a, 220b). The magnet (320) may electromagnetically interact with the first and second coils (220a, 220b). The magnet (320) may be disposed at an upper side of a third coil (422). The magnet (320) may face the third coil (422). The magnet (320) may electromagnetically interact with the third coil (422). The magnet (320) may be commonly used for AF focus and OIS function. However, the magnet (320) may include a plurality of magnets separately and respectively used for AF function and the OIS function. The magnet (320) may be disposed on a corner portion of the housing (310). At this time, the magnet (320) may be a corner magnet. The magnet (320) may take a cubic shape having an inner lateral surface broader than an outer lateral surface. In a modification, the magnet (320) may be disposed on a side surface of housing (310). At this time, the magnet (320) may be a flat magnet. The magnet (320) may take a flat plate shape. The magnet (320) may include a plurality of flat plate magnets disposed at a lateral part of housing (310).

The magnet (320) may include a plurality of magnets each spaced apart from the other. The magnet (320) may include eight magnets, each spaced apart from the other. At this time, the said eight magnets may be so arranged as to allow adjacent two magnets to form a 900 relative to the housing (310). That is, the magnet (320) may be arranged on four corners of the housing (310) at an equidistant space. In this case, an efficient inner volumetric use of housing (310) can be promoted. Furthermore, the magnet (320) may be adhered by an adhesive to the housing (310).

The magnet (320) may be formed by a plurality of corner magnets disposed on corners of housing (310). The plurality of corner magnets may include first to eighth magnets (321, 322, 323, 324, 325, 326, 327, 328) each spaced apart from the other. The plurality of corner magnets may be formed with first to eighth corner magnets (321, 322, 323, 324, 325, 326, 327, 328) each spaced apart from the other. That is, the magnet (320) may be formed with a total of eight magnets. The magnet (320) may be formed with eight magnets (321, 322, 323, 324, 325, 326, 327, 328) respectively disposed at positions corresponding to four first axis coil units and four second coil units.

The first to four corner magnets (321, 322, 323, 324) may be respectively disposed on corners of first bobbin reception part (311a). The fifth to eighth corner magnets (325, 326, 327, 328) may be respectively disposed on corners of second bobbin reception part (311b). The first to fourth corner magnets (321, 322, 323, 324) may be disposed on a first bobbin reception part (311a) side of housing (310) to a counterclockwise direction as illustrated in FIG. 10. The fifth to eighth corner magnets (325, 326, 327, 328) may be disposed on a second bobbin reception part (311b) side of housing (310) to a clockwise direction as illustrated in FIG. 10.

The first corner magnet (321) may be disposed at a more outer side than the second corner magnet (322) on the housing (310). The second corner magnet (322) may be disposed more inner side than the first corner magnet (321) on the housing (310). The second corner magnet (322) may be disposed nearer to a center of the housing (310) than the first corner magnet (321).

At least three lateral surfaces of the second corner magnet (322) may be coupled to the housing (310) by an adhesive. An upper surface of the second corner magnet (322) may be coupled to the housing (310) by an adhesive. An inner lateral surface of the second corner magnet (322) may be supported by the support part (317) of housing (310). Through this structure, a portion of inner lateral surface of the second corner magnet (322) may be opened inwardly. Furthermore, a lower surface of the second corner magnet (322) may be downwardly opened.

In the present exemplary embodiment of the present invention, at least four surfaces may be fixed by an adhesive in order to fix the magnet (320) to the housing (310). Three lateral surfaces of magnet (320) and an upper surface may be fixed to the housing (310) using an adhesive. In the first exemplary embodiment of the present invention, a through hole communicating with an outside may be disposed on a surface of the housing (310) adhered by the adhesive to the magnet (320). In the first exemplary embodiment of the present invention, an adhesive may be infused through the said through hole. Although explanations are focused on the second corner magnet (322) in the abovementioned first exemplary embodiment of the present invention, a coupled structure of second corner magnet (322) to the housing (310) may be inferrably applied to the coupled structure of the first to eighth corner magnets (321, 322, 323, 324, 325, 326, 327, 328) to the housing (310).

The stator (400) may be disposed at a lower side of housing (310). The stator (400) may be disposed at a lower side of OIS mover (300). The stator (400) may face the OIS mover (300). The stator (400) may movably support the OIS mover (300). The stator (400) may move the OIS mover (300). At this time, the AF mover (200a, 200b) may also be moved with the OIS mover (300).

The stator (400) may include a substrate (410), a circuit member (420) and a base (430). However, any one or more of the substrate (410), the circuit member (420) and the base (430) may be omitted or changed from the stator (400).

The substrate (410) may supply a power to the third coil (422). The substrate (410) may be coupled with the circuit member (420). The substrate (410) may be coupled to a PCB (10) disposed at a lower side of base (430). The substrate (410) may be disposed at a lower surface of circuit member (420). The substrate (410) may be disposed on an upper surface of base (430). The substrate (410) may be interposed between the circuit member (420) and the base (430). The substrate (410) may include a circuit member (420) having a third coil (422) so disposed as to face the magnet (320) between the housing (310) and the base (430). The substrate (410) may be coupled by a support member (600). At this time, a lower surface of substrate (410) and a lower end of support member (600) may be coupled by the soldering. The substrate (410) may be integrally formed.

The substrate (410) may include an FPCB (Flexible Printed Circuit Board). The substrate (410) may be partially bent. The substrate (410) may supply a power to the first and second coils (220a, 220b). The substrate (410) may supply a power to the first coil (220a) through the support member (600) and the first upper elastic member (510a). The substrate (410) may supply a power to the second coil (220b) through the support member (600) and the second upper elastic member (510b).

The substrate (410) may include a first opening (411a), a second opening (411b) and a terminal part (412). However, any one or more of the first opening (411a), the second opening (411b) and the terminal part (412) may be omitted or changed from the substrate (410).

The first opening (411a) may be formed on the substrate (410). The first opening (411a) may be formed by being leaned to one side of substrate (410). The first opening (411a) may be so formed as to pass through the substrate (410). The first opening (411a) may pass through a light having passed the first lens module. The first opening (411a) may be formed in a round shape. However, the shape of the first opening (411a) is not limited thereto. The first opening (411a) may be spaced apart from the second opening (411b).

The second opening (411b) may be formed on the substrate (410). The second opening (411b) may be formed by being leaned to one side of substrate (410). The second opening (411b) 는 may be so formed as to pass through the substrate (410). The second opening (411b) may pass through a light having passed the first lens module. The second opening (411b) may be formed in a round shape. However, the shape of the second opening (411b) is not limited thereto. The second opening (411b) may be spaced apart from the first opening (411a).

The terminal part (412) may be disposed on the substrate (410). The terminal part (412) may be formed by allowing a portion of the substrate (410) to be downwardly bent. The terminal part (412) may be at least partially exposed to an outside. The terminal part (412) may be coupled to the PCB (10) disposed at a lower side of base (430) by way of soldering. A lower end of the terminal part (412) may directly contact the PCB (10). The terminal part (412) may be disposed on a terminal coupling part (434a, 434b) of base (430). The substrate (410) may include a terminal part (412) connected to an outside power source.

The terminal part (412) in the first exemplary embodiment of the present invention may include a total of 16 terminals. Two terminals in the 16 terminals may be electrically connected to a first axis driving coil (423), two terminal may be electrically connected to a second axis driving coil (424), four terminals may be electrically connected to a first axis sensor (810), four terminals may be electrically connected to a second axis sensor (820), two terminals may be electrically connected to a first coil (220a), and two terminals may be electrically connected to a second coil (220b). Eight terminals in the 16 terminals may be extended from a first lateral surface of substrate (410), and remaining eight terminals may be extended from a second lateral surface disposed opposite to the first lateral surface.

For reference, in light of the fact that, in case of a single OIS module, two terminals are required on an AF coil, four terminals are required on an OIS coil (two terminals on the first axis driving coil and two terminals on the second axis driving coil), and eight terminals are required on a sensor (four terminals on the first axis sensor, and four terminals on the second axis sensor), a total of 14 terminals are required. Hence, a total of 28 terminals are required for a dual camera module where two single OIS modules are arranged in parallel. In view of the fact that only a total of 16 terminals are required in the realization of an OIS driving for a dual camera module in the first exemplary embodiment of the present invention, it may be seen that 12 terminals are omitted over the foregoing comparative exemplary embodiment. Thus, the first exemplary embodiment of the present invention has an advantageous effect in that working processes may be simplified and obtainment of space for terminals and conductive line design can be advantaged.

The circuit member (420) may be disposed on the base (430). The circuit member (420) may be disposed on the substrate (410). The circuit member (420) may be disposed on an upper surface of substrate (410). The circuit member (420) may be disposed at a lower side of magnet (320). The circuit member (420) may be interposed between the magnet (320) and the base (430). The circuit member (420) may include a hole passing through the support member (600). A corner of the circuit member (420) may take a shape corresponding to that of the substrate (410) and may include a hole. Through this structure, the substrate (410) can be reinforced in terms of strength over a structure where a corner side of the circuit member (420) is omitted. The circuit member (420) may be integrally formed.

The circuit member (420) may include a substrate part (421) and a third coil (422). However, any one or more of the substrate part (421) and the third coil (422) may be omitted or changed from the circuit member (420).

The substrate part (421) may be a circuit board. The substrate part (421) may be an FPCB. The substrate part (421) may be integrally formed with a third coil (422). The substrate part (421) may be formed with a hole passed through by the support member (600). In a modification, the substrate part (421) may be coupled by the support member (600). At this time, a lower surface of substrate part (421) and a lower end of the support member (600) may be coupled by soldering. The substrate part (421) may be formed with an opening. The opening of the substrate part (421) may be formed to correspond to the opening (411a, 411b) of substrate (410).

The third coil (422) may face the magnet (320). In this case, when a current is supplied to the third coil (422) to form a magnetic field about the third coil (422), the magnet (320) may move to the third coil by the electromagnetic interaction between the third coil (422) and the magnet (320). The third coil (422) may electromagnetically interact with the magnet (320). The third coil (422) may move the housing (310) and the bobbin (210a, 210b) relative to the base (430) to a direction perpendicular to an optical axis through the electromagnetic interaction with the magnet (320). The third coil (422) may be an FP (Fine Pattern) coil integrally formed on the substrate part (421). The third coil (422) may be formed on the circuit member (420) with an FP coil. The third coil (422) may include a plurality of coils each spaced apart from the other.

The third coil (422) may include a first axis driving coil (423) moving the magnet (320) to a first axis direction, and a second axis driving coil (424) moving the magnet (320) to a second axis direction different from the first axis. The first axis may be perpendicular to the second axis. Each of the first axis and the second axis may be perpendicular to an optical axis of a lens coupled to the first bobbin (210a). Each of the first axis and the second axis may be perpendicular to an optical axis of lens coupled to the second bobbin (210b).

The first axis driving coil (423) may include four first axis coil units each mutually spaced apart, and a connection coil connecting the four first axis coil units. At this time, the four first axis coil unit may be all electrically conducted through the connection coil. That is, the said four first axis coil units may be integrally controlled. However, the first axis driving coil (423) and the second axis driving coil (424) may be separately controlled.

The second axis driving coil (424) may include four second axis coil units each mutually spaced apart, and a connection coil connecting the four second axis coil units. At this time, the four second axis coil unit may be all electrically conducted through the connection coil. That is, the said four second axis coil units may be integrally controlled.

The base (430) may be disposed underneath the housing (310). The base (430) may be disposed at a lower surface of substrate (410). An upper surface of base (430) may be disposed with the substrate (410). The base (430) may be disposed with the circuit member (420). The base (430) may be coupled with the cover member (100). The base (430) may be disposed at an upper surface of PCB (10). However, a separate holder member (20) may be interposed between the base (430) and the PCB (10). The base (430) may perform a function of a sensor holder protecting an image sensor mounted on the PCB (10). The base (430) may be integrally formed.

The base (430) may include a through hole (431a, 431b), a sensor coupling part (433), a terminal coupling part (434), a staircase part (435), a recessed part (436) and a partition (437). However, any one or more of the through hole (431a, 431b), the sensor coupling part (433), the terminal coupling part (434), the staircase part (435), the recessed part (436) and the partition (437) may be omitted or changed from the base (430).

The base (430) may include a first through hole (431a) formed at a position corresponding to that of the first bobbin (210a), a second through hole (431b) formed at a position corresponding to that of the second bobbin (210b), a recessed part (436) formed by allowing a portion of a lower surface of base (430) to be recessed, and a partition (437) protruded from a recessed surface of the recessed part (436) to a lower surface of base (430) between the first through hole (431a) and the second through hole (431b) and extended from a lateral surface of one side of base (430) to a lateral surface of other side of base (430).

The through hole (431a, 431b) may be formed on the base (430). The through hole (431a, 431b) may be so formed as to vertically pass through the base (430). The through hole (431a, 431b) may be formed with an infrared filter. However, the infrared filter may be coupled to a separate holder member (20) disposed at a lower surface of base (430). A light having passed the lens module through the through hole (431a, 431b) may be incident on the image sensor. The through hole (431a, 431b) may include a first through hole (431a) and a second through hole (431b). The first through hole (431a) may be passed through by a light having passed the first lens module. The second through hole (431b) may be passed through by a light having passed the second lens module. The through hole (431a, 431b) may take a circular shape. However, the shape of the through hole (431a, 431b) is not limited thereto.

The sensor coupling part (433) may be disposed with a sensor (800). The sensor coupling part (433) may accommodate at least a portion of the sensor (800). The sensor coupling part (433) may be formed by a groove formed by allowing an upper surface of base (430) to be downwardly recessed. The sensor coupling part (433) may be formed by a plurality of grooves. For example, the sensor coupling part (433) may be formed with two grooves. At this time, each of the said two grooves may be disposed with a second sensor (800). The sensor coupling part (433) may include a first sensor coupling part (433a) and a second sensor coupling part (433b). The first sensor coupling part (433a) may be disposed with a first axis sensor (810). The second sensor coupling part (433b) may be disposed with a second axis sensor (820).

The terminal coupling part (434) may be disposed with a terminal part (412) of substrate (410). The terminal coupling part (434) may be formed by a groove formed by allowing a portion of a lateral surface of one side of the base (430) to be inwardly recessed. At this time, the terminal coupling part (434) may be surface-contacted by at least a portion of the terminal part (412) of substrate (410). A width of the terminal coupling part (434) may be correspondingly formed with that of the terminal part (412) of substrate (410). A length of the terminal coupling part (434) may be correspondingly formed with that of the terminal part (412) of substrate (410). The terminal coupling part (434) may be respectively disposed on both oppositely disposed lateral surfaces. The terminal coupling part (434) may include a first terminal coupling part (434a) formed at a lateral surface of one side of base (430), and a second terminal coupling part (434b) formed at a lateral surface of the other side of base (430). The first terminal coupling part (434a) may be formed on a lateral surface corresponding to a longer side of lateral surface of base (430) when viewed from an upper side of base (430). The first terminal coupling part (434a) may be formed at a center portion of a lateral surface of one side of base (430). The second terminal coupling part (434b) may take a shape corresponding to that of the first terminal coupling part (434a) at the opposite side of the first terminal coupling part (434a). The terminal coupling part (434) may be downwardly extended from a lower surface of the base (430). As a result, a lower end of the terminal coupling part (434) may be disposed on a side lower than a lower surface of the base (430).

The staircase part (435) may be formed at a lateral surface of base (430). The staircase part (435) may be formed by circumventing an outer periphery surface of base (430). The staircase part (435) may be formed by allowing an upper surface of the lateral surface of base (430) to be recessed. Alternatively, the staircase part (435) may be formed by allowing a lower surface of the lateral surface of base (430) to be protruded. The staircase part (435) may be disposed with a lower end of the side (lateral) plate (102) of the cover member (100).

The recessed part (436) may be formed by allowing a portion of a lower surface of base (430) to be recessed. The recessed surface formed by the recessed part (436) may be disposed at a position upper side than the base (430).

The partition (437) may be protrusively formed from the recessed surface of the recessed part (436) to a lower surface of base (430) between the first through hole (431a) and the second through hole (431b). The partition (437) may be extended from a lateral surface of one side of base (430) to a lateral surface of the other side. The partition (437) may reinforce the strength of base (430). The partition (437) may be doubly formed. In this case, the partition (437) may be more effective to the reinforcement of strength of base (430). The partition (437) may inhibit a light supposed to be incident on the first image sensor from being incident onto the second image sensor by a space formed at a lower side of the base (430). Conversely, the partition (437) may inhibit a light supposed to be incident on the second image sensor from being incident onto the first image sensor by a space formed at a lower side of the base (430). At least two partitions (437) may be disposed each spaced apart to thereby form a space between the said two partitions (437).

Hereinafter, the elastic member (500a, 500b) and the support member (600) will be described as a configuration guiding the movement of the bobbin (210a, 210b) and the housing (310). However, the said description is only an example, and other members than a spring and a wire for guiding the movement of bobbin (210a, 210b) and the housing (310) may be used. For example, a ball guide may replace the elastic member (500a, 500b) and the support member (600).

The first elastic member (500a) may be coupled with the first bobbin (210a) and the housing (310). The first elastic member (500a) may elastically support the first bobbin (210a). The first elastic member (500a) may possess the elasticity on at least a portion thereof. The first elastic member (500a) may movably support the first bobbin (210a) relative to the housing (310) to an optical axis direction. That is, the first elastic member (500a) may support the first bobbin (210a) for AF driving. At this time, the first elastic member (500a) may be called an 'AF support member'.

The first elastic member (500a) may include a first upper elastic member (510a) and a first lower elastic member (520a). However, any one or more of the first upper elastic member (510a) and the first lower elastic member (520a) may be omitted or changed from the first elastic member (500a). The first upper elastic member (510a) and the first lower elastic member (520a) may be integrally formed.

The first upper elastic member (510a) may be disposed on an upper side of first bobbin (210a) and may be coupled with the first bobbin (210a) and the housing (310). The first upper elastic member (510a) may be disposed at an upper side of first bobbin (210a). The first upper elastic member (510a) may be coupled with the first bobbin (210a) and the housing (310). The first upper elastic member (510a) may be coupled to an upper surface of first bobbin (210a) and to an upper surface of housing (310).

The first upper elastic member (510a) may elastically support the first bobbin (210a). The first upper elastic member (510a) may possess the elasticity on at least a portion thereof. The first upper elastic member (510a) may movably support the first bobbin (210a). The first upper elastic member (510a) may movably move the first bobbin (210a) relative to the housing (310) to an optical axis direction. The first upper elastic member (510a) may be formed with a leaf spring.

Each of the first upper elastic members (510a) may be spaced apart from the other, and each may include first and second upper elastic units (510aa, 510ab) each connected to the first coil (220a). The first upper elastic unit (510aa) may be connected to one end of the first coil (220a). The second upper elastic unit (510ab) may be connected to the other end of first coil (220a). The first upper elastic unit (510aa) may be connected to a first wire (601). The second upper elastic unit (510ab) may be connected to a second wire (602). The first and second upper elastic units (510aa, 510ab) may be electrically connected to the first coil (220a). The first and second upper elastic units (510aa, 510ab) may be formed with an electrically conductive material. The first coil (220a) may receive a current through the first and second upper elastic units (510aa, 510ab).

The first upper elastic member (510a) may include a first outer part (511a), a first inner part (512a), a first connection part (513a) and a coupling part (514a). However, any one or more of the first outer part (511a), the first inner part (512a), the first connection part (513a) and the coupling part (514a) may be omitted or changed from the first upper elastic member (510a).

The first outer part (511a) may be coupled with the housing (310). The first outer part (511a) may be coupled to an upper surface of housing (310). The first outer part (511a) may be coupled with a lug (313) of housing (310). The first outer part (511a) may include a first coupling hole (511aa) coupled with the lug (313) of housing (310). The first coupling hole (511aa) of the first outer part (511a) may be coupled by being fused with the lug (313) of the housing (310).

The first inner part (512a) may be coupled with the first bobbin (210a). The first inner part (512a) may be coupled to an upper surface of first bobbin (210a). The first inner part (512a) may be coupled to a first reception groove (213a) of first bobbin (210a) by an adhesive. The first inner part (512a) may include a second coupling hole (512aa) corresponding to the first reception groove (213a) of first bobbin (210a).

The first connection part (513a) may connect the first outer part (511a) and the first inner part (512a). The first connection part (513a) may elastically connect the first outer part (511a) and the first inner part (512a). The first connection part (513a) may possess the elasticity. At this time, the first connection part (513a) may be called an 'elastic part'. The first connection part (513a) may be formed by being bent more than twice.

The coupling part (514a) may be coupled with the support member (600). The coupling part (514a) may be coupled to the support member (600) by soldering. The coupling part (514a) may include a hole passed through by the support member (600). Through this structure, a portion having passed the coupling part (514a) on the support member (600) may be coupled by an upper surface of the coupling part (514a) by way of soldering. The coupling part (514a) may be extended from the first outer part (511a). The coupling part (514a) may be extended from the first outer part (511a) to an outside. The coupling part (514a) may include a bent part formed by being bent.

The coupling part (514a) may include a first extension part (5144aa) extended from the first outer part (511a) to a corner side of housing (310), and a second extension part (514ab) extended from the first extension part (514aa) to a center direction of the first upper elastic member (510a). The first extension part (514aa) may be extended from the first outer part (511a) to a corner side of housing (310). The second extension part (514ab) may be extended from the first extension part (514aa) to a center direction of the first upper elastic member (510a). The second extension part (514ab) may be extended from the first extension part (514aa) to a first outer part (511a) direction of the first upper elastic member (510a). The first outer part (511a) and the second extension part (514ab) may be spaced apart. However, the second extension part (514ab) and the first outer part (511a) may be connected by a damper (700).

The damper (700) in the first exemplary embodiment of the present invention may be coated on the second extension part (514ab) and the first outer part (511a). Through this structure, the resonance phenomenon generated on the elastic member (500a, 500b) and the support member (600) may be inhibited. Furthermore, the said structure has an advantageous effect over a structure where the damper (700) is coated on the coupling part (514a) and the housing (310) or on the support member (600) and the housing (310) in that design is easy. This is because the first upper elastic member (510a) is relatively easy in design change and manufacturing compared with the housing (310). Meantime, an area contacted by the damper (700) can be maximized by forming the shape of the second extension part (514ab) and the first outer part (511a) with a plurality of round parts in the first exemplary embodiment of the present invention. That is, the peculiar shape of the second extension part (514ab) and the first outer part (511a) may inhibit the damper (7000 from being disengaged in the first exemplary embodiment of the present invention.

Although an additional damper is an element not shown in the first exemplary embodiment of the present invention, the additional damper may be coated in addition to the aforementioned damper (700). Particularly, the additional damper may be coated on the housing (310) and the support member (600). Furthermore, the additional damper may be coated on the housing (310) and the first and second upper elastic member (510*a*, 510*b*). Moreover, the support member (600) and the first and second upper elastic member (510*a*, 510*b*) may be also coated with damper.

Meantime, the first exemplary embodiment of the present invention has been explained by focusing on the dual lens drive device or by using the dual lens drive device as a premise. However, the coated structure of the damper (700) in the first exemplary embodiment is simply explained with a dual lens drive device as a premise for the convenience sake of explanation and it should be noted that the scope of right of the present invention is not limited to the dual lens drive device. The coated structure of damper (700) in the first exemplary embodiment of the present invention may be applied not only on a dual lens drive device but also on a single lens drive device. The said single lens drive device may include a cover member (100), a first AF mover (200*a*), an OIS mover (300), a stator (400), a first elastic member (500*a*), a support member (600), a damper (700) and a sensor (800). The explanation on these elements may be inferably applied from the explanation on the first exemplary embodiment of the present invention. That is, the first elastic member (500*a*) of the single lens drive device may be coated with a damper (700), and the explanation thereto may be inferably applied from the explanation of the first exemplary embodiment of the present invention.

The second extension part (514*ab*) may be so formed as to have a broader width on at least a portion while being extended to a center direction of the first upper elastic member (510*a*). A distal end of the second extension part (514*ab*) may be connected to the first extension part (514*aa*) and the other end may be formed with a free end. The other end of the second extension part (514*ab*) may be formed by being curved. An area facing the other end of the second extension part (514*ab*) from the first outer part (511*a*) may take a shape corresponding to that of the second extension part (514*ab*).

A cross-sectional surface of the other end at the second extension part (514*ab*) may be formed to be round. Through the said structures, the damper (700) coated on the second extension part (514*ab*) may be inhibited from being disengaged. That is, through the said structures, the damper (700) may be more securely fixed to the second extension part (514*ab*) and the first outer part (511*a*).

The first lower elastic member (520*a*) may be disposed underneath the first bobbin (210*a*) to be coupled to the first bobbin (210*a*) and the housing (310). The first lower elastic member (520*a*) may be disposed underneath the first bobbin (210*a*). The first lower elastic member (520*a*) may be coupled to the first bobbin (210*a*) and the housing (310). The first lower elastic member (520*a*) may be coupled to a lower surface of first bobbin (210*a*) and to a lower surface of housing (310). The first lower elastic member (520*a*) may elastically support the first bobbin (210*a*). The first lower elastic member (520*a*) may possess the elasticity on at least a portion thereof. The first lower elastic member (520*a*) may movably support the first bobbin (210*a*). The first lower elastic member (520*a*) may movably support the first bobbin (210*a*) relative to the housing (310) to an optical axis direction. The first lower elastic member (520*a*) may be formed with a leaf spring. The first lower elastic member (520*a*) may be integrally formed.

The first lower elastic member (520*a*) may include a second outer part (521*a*), a second inner part (522*a*) and a second connection part (523*a*). However, any one or more of the second outer part (521*a*), the second inner part (522*a*) and the second connection part (523*a*) may be omitted or changed from the first lower elastic member (520*a*).

The first lower elastic member (520*a*) may include a second outer part (521*a*) coupled to the housing (310), a second inner part (522*a*) coupled to the first bobbin (210*a*) and a second connection part (523*a*) connecting the second inner part (522*a*) and the second outer part (521*a*).

The second outer part (521*a*) may be coupled with the housing (310). The second outer part (521*a*) may be coupled to a lower surface of housing (310). The second outer part (521*a*) may be coupled with a third reception groove (314) of housing (310) using an adhesive. The second outer part (521*a*) may include a fourth coupling hole corresponding to the third reception groove (314) of housing (310).

The second inner part (522*a*) may be coupled to the first bobbin (210*a*). The second inner part (522*a*) may be coupled to a lower surface of first bobbin (210*a*). The second inner part (522*a*) may be coupled to a second reception groove (214*a*) of first bobbin (210*a*) using an adhesive. The second inner part (522*a*) may include a third coupling hole corresponding to the second reception groove (214*a*) of first bobbin (210*a*).

The second connection part (523*a*) may connect the second outer part (521*a*) and the second inner part (522*a*). The second connection part (523*a*) may elastically connect the second outer part (521*a*) and the second inner part (522*a*). The second connection part (523*a*) may possess the elasticity. At this time, the second connection part (523*a*) may be called an 'elastic part'. The second connection part (523*a*) may be formed by being bent more than twice.

The second elastic member (500*b*) may be coupled to the second bobbin (210*b*) and the housing (310). The second elastic member (500*b*) may elastically support the second bobbin (210*b*). The second elastic member (500*b*) may possess the elasticity on at least a portion thereof. The second elastic member (500*b*) may movably move the second bobbin (210*b*). The second elastic member (500*b*) may movably support the second bobbin (210*b*) relative to the housing (310) to an optical axis direction. That is, the second elastic member (500*b*) may support the second bobbin (210*b*) so that the second bobbin (210*b*) can perform the AF driving. At this time, the second elastic member (500*b*) may be called an 'AF support member'.

The second elastic member (500*b*) may include a second upper elastic member (510*b*) and a second lower elastic member (520*b*). However, any one or more of the second upper elastic member (510*b*) and the second lower elastic member (520*b*) may be omitted or changed from the second elastic member (500*b*).

The second upper elastic member (510*b*) may be disposed on an upper side of second bobbin (210*b*) and may be coupled with the second bobbin (210*b*) and the housing (310). The second upper elastic member (510*b*) may be disposed at an upper side of second bobbin (210*b*). The second upper elastic member (510*b*) may be coupled with the second bobbin (210*b*) and the housing (310). The second upper elastic member (510*b*) may be coupled to an upper surface of the second bobbin (210*b*) and to an upper surface of the housing (310).

The second upper elastic member (510*b*) may elastically support the second bobbin (210*b*). The second upper elastic member (510*b*) may possess the elasticity on at least a portion thereof. The second upper elastic member (510*b*) may movably support the second bobbin (210*b*). The second upper elastic member (510*b*) may movably move the second bobbin (210*b*) relative to the housing (310) to an optical axis direction. The second upper elastic member (510*b*) may be formed with a leaf spring.

Each of the second upper elastic members (510*b*) may be spaced apart from the other, and each may include third and fourth upper elastic units (510*ba*, 510*bb*) each connected to the second coil (220*b*). The third upper elastic unit (510*ba*) may be connected to one end of the second coil (220*b*). The fourth upper elastic unit (510*bb*) may be connected to the other end of second coil (220*b*). The third upper elastic unit (510*ba*) may be connected to a third wire (603). The fourth upper elastic unit (510*bb*) may be connected to a fourth wire (604). The third and fourth upper elastic units (510*ba*, 510*bb*) may be electrically connected to the second coil (220*b*). The third and fourth upper elastic units (510*ba*, 510*bb*) may be formed with an electrically conductive material. The second coil (220*b*) may receive a current through the third and fourth upper elastic units (510*ba*, 510*bb*).

The second upper elastic member (510*b*) may include an outer part (511*b*), an inner part (512*b*), a connection part (513*b*) and a coupling part (514*b*). However, any one or more of the outer part (511*b*), the inner part (512*b*), the connection part (513*b*) and the coupling part (514*b*) may be omitted or changed from the first upper elastic member (510*a*).

The outer part (511*b*) may be coupled with the housing (310). The outer part (511*b*) may be coupled to an upper surface of housing (310). The outer part (511*b*) may be coupled with a lug (313) of housing (310). The outer part (511*b*) may include a first coupling hole coupled with the lug (313) of housing (310). The first coupling hole of the outer part (511*b*) may be coupled by being fused with the lug (313) of the housing (310).

The inner part (512*b*) may be coupled with the second bobbin (210*b*). The inner part (512*b*) may be coupled to an upper surface of second bobbin (210*b*). The inner part (512*b*) may be coupled to an upper reception groove (213*b*) of second bobbin (210*b*) by an adhesive. The inner part (512*b*) may include a second coupling hole corresponding to the upper reception groove (213*b*) of second bobbin (210*b*).

The connection part (513*b*) may connect the outer part (511*b*) and the inner part (512*b*). The connection part (513*b*) may elastically connect the outer part (511*b*) and the inner part (512*b*). The connection part (513*b*) may possess the elasticity. At this time, the connection part (513*b*) may be called an 'elastic part'. The connection part (513*b*) may be formed by being bent more than twice.

The coupling part (514*b*) may be coupled with the support member (600). The coupling part (514*b*) may be coupled to the support member (600) by soldering. The coupling part (514*b*) may include a hole passed through by the support member (600). Through this structure, a portion having passed the coupling part (514*b*) on the support member (600) may be coupled by an upper surface of the coupling part (514*b*) by way of soldering. The coupling part (514*b*) may be extended from the outer part (511*b*). The coupling part (514*b*) may be extended from the outer part (511*b*) to an outside. The coupling part (514*b*) may include a bent part formed by being bent.

The coupling part (514*b*) may include a first extension part extended from the outer part to a corner side of housing (310), and a second extension part extended from the first extension part to a center direction of the second upper elastic member (510*b*). The first extension part may be extended from the outer part to a corner side of housing (310). The second extension part may be extended from the first extension part to a center direction of the second upper elastic member (510*b*). The second extension part may be extended from the first extension part to an outer part (511*b*) direction of the second upper elastic member (510*b*). The outer part (511*b*) and the second extension part may be spaced apart. However, the second extension part and the outer part (511*b*) may be connected by a damper (700). That is, the damper (700) may be coated on the second extension part and the outer part (511*b*). Through this structure, the resonance phenomenon generated from the elastic member (500*a*, 500*b*) and the support member (600) may be inhibited. Furthermore, the said structure has an advantageous effect over a structure where the damper (700) is coated on the coupling part (514*b*) and the housing (310) or on the support member (600) and the housing (310) in that design is easy. This is because the second upper elastic member (510*b*) is relatively easy in design change and manufacturing compared with the housing (310).

The second lower elastic member (520*b*) may be disposed underneath the second bobbin (210*b*), and may be coupled to the second bobbin (210*b*) and the housing (310). The second lower elastic member (520*b*) may be disposed at a lower side of second bobbin (210*b*). The second lower elastic member (520*b*) may be coupled to the second bobbin (210*b*) and the housing (310). The second lower elastic member (520*b*) may be coupled to a lower surface of second bobbin (210*b*) and to a lower surface of housing (310). The second lower elastic member (520*b*) may elastically support the second bobbin (210*b*). The second lower elastic member (520*b*) may possess elasticity at least partially. The second lower elastic member (520*b*) may movably support the second bobbin (210*b*). The second lower elastic member (520*b*) may movably support the second bobbin (210*b*) relative to the housing (310) to an optical axis direction. The second lower elastic member (520*b*) may be formed with a leaf spring. The second lower elastic member (520*b*) may be integrally formed.

The second lower elastic member (520*b*) may include an outer part (521*b*), an inner part (522*b*) and a connection part (523*b*). However, any one or more of the outer part (521*b*), the inner part (522*b*) and the connection part (523*b*) may be omitted or changed from the second lower elastic member (520*b*).

The second lower elastic member (520*b*) may include an external part (521*b*) coupled to the housing (310), an inner part (522*b*) coupled to the second bobbin (210*b*) and a connection part (523*b*) connecting the inner part (522*b*) and the outer part (521*b*).

The outer part (521*b*) may be coupled with the housing (310). The outer part (521*b*) may be coupled to a lower surface of housing (310). The outer part (521*b*) may be coupled with a third reception groove (314) of housing (310) using an adhesive. The outer part (521*b*) may include a fourth coupling hole corresponding to the third reception groove (314) of housing (310).

The inner part (522*b*) may be coupled to the second bobbin (210*b*). The inner part (522*b*) may be coupled to a lower surface of the second bobbin (210*b*). The inner part (522*b*) may be coupled to a lower reception groove (214*b*) of the second bobbin (210*b*) using an adhesive. The inner part (522*b*) may include a third coupling hole corresponding to the lower reception groove (214*b*) of the second bobbin (210*b*).

The connection part (523b) may connect the outer part (521b) and the inner part (522b). The connection part (523b) may elastically connect the outer part (521b) and the inner part (522b). The connection part (523b) may possess the elasticity. At this time, the connection part (523b) may be called an 'elastic part'. The connection part (523b) may be formed by being bent more than twice.

The first coupling hole (511aa) of the first outer part (511a) at the first upper elastic member (510a) according to the first exemplary embodiment of the present invention may be coupled by being fused to a lug (313) of the housing (310). Furthermore, the first inner part (512a), the second outer part (521a) and the second inner part (522a) may be coupled to the housing (310) and the first bobbin (210a) using an adhesive.

That is, one area out of two areas coupled by the first upper elastic member (510a) with the housing (310) and two areas coupled by the first upper elastic member (510a) with the first bobbin (210a) may be coupled by fused coupling between a lug and a hole, and the remaining three areas may be coupled by allowing an adhesive to be coated on a coupling hole.

In the first exemplary embodiment of the present invention, in light of the fact that a mutual optical axis alignment between the first bobbin (210a) and the second bobbin (210b) is important, only one area is coupled by fusion among the four coupled areas and the remaining three areas are coupled by using an adhesive, as mentioned above. Thus, in the first exemplary embodiment of the present invention, a phenomenon of the first bobbin (210a) and the second bobbin (210b) being misaligned may be inhibited due to generation of tilt in the process of the first elastic member (500a) being coupled to the first bobbin (210a). Conversely, in the first exemplary embodiment of the present invention, a phenomenon of the first bobbin (210a) and the second bobbin (210b) being misaligned may be inhibited due to generation of tilt in the process of the second elastic member (500b) being coupled to the second bobbin (210b).

In a modification, the lug (313) of housing (310) and the third reception groove (314) of housing (310) may be reversely formed. That is, the lug (313) may be formed at a lower surface of housing (310), and the third reception groove (314) may be formed at an upper surface of housing (310). In the first exemplary embodiment of the present invention, the first upper elastic member (510a) is first fixed to an upper surface of housing (310), and then, the first bobbin (210a) is inserted into a lower side of housing (310) to allow the first bobbin (210a) and the first upper elastic member (510a) to be coupled. However, in the modification, the first lower elastic member (520a) is first fixed to a lower surface of housing (310) and then, the first bobbin (210a) is inserted at an upper side of housing (310) to allow the first bobbin (210a) and the first lower elastic member (520a) to be coupled.

The support member (600) may movably support the housing (310). The support member (600) may elastically support the housing (310). The support member (600) may possess the elasticity at least on a portion thereof. For example, the support member (600) may movably support the housing (310) relative to the stator (400) to a direction perpendicular to an optical axis. At this time, the bobbin (210a, 210b) may integrally move along with the housing (310). In another example, the support member (600) may tiltably support the housing (310) relative to the stator (400). That is, the support member (600) may support to allow the housing (310) and the bobbin (210a, 210b) to perform an OIS driving. At this time, the support member (600) may be called an 'OIS support member'. For example, the support member (600) may be formed with a wire. In another example, the support member (600) may be formed with a leaf spring.

The support member (600) may be connected to the first upper elastic member (500a) and the substrate (410). The support member (600) may be connected to the second upper elastic member (500b) and the substrate (410). The support member (600) may be coupled to the upper elastic member (510a, 510b) and the stator (400). A lower end of the support member (600) may be coupled to the substrate (410). The support member (600) may pass through the substrate (410). Through the said structure, a lower end of the support member (600) may be coupled to a lower surface of substrate (410) by way of soldering. An upper end of the support member (600) may be coupled to the coupling part (514a, 514b) of upper elastic member (510a, 510b). The upper end of the support member (600) may pass through the coupling part (514a, 514b) of upper elastic member (510a, 510b). In the said structure, the upper end of the support member (600) may be coupled to an upper surface of the coupling part (514a, 514b) of upper elastic member (510a, 510b) by way of soldering. In a modification, a lower end of the support member (600) may be coupled to a substrate part (421) of circuit member (420). The lower end of the support member (600) may be coupled to the base (430). The upper end of the support member (600) may be coupled to the housing (310). The said structure of support member (600) is not limited thereto, and any structure capable of movably supporting the OIS mover (300) to the stator may be provided. The support member (600) may be coupled to a second extension part (514ab). The support member (600) may include four (4) support parts. Each of the support parts may be a wire. A lower end of wire may be soldered to a lower surface of substrate (410). An upper end of wire may be soldered to the coupling part (514a).

The support member (600) may be formed with a plurality of elements. The support member (600) may be formed with four (4) support parts, each spaced apart from the other. At this time, the support part may be a wire. The support member (600) may be formed with four wires (601, 602, 603, 604), each wire spaced apart from the other wire. The support member (600) may be formed with first to fourth wires (601, 602, 603, 604), each wire spaced apart from the other wire. The support member (600) may include first to fourth wires (601, 602, 603, 604), each wire spaced apart from the other wire. The support member (600) may be comprised of first to fourth wires (601, 602, 603, 604), each wire spaced apart from the other wire. That is, the support member (600) may be formed with a total of four (4) wires. In particular, the support member (600) may be formed with first to fourth wires (601, 602, 603, 604) each paired with the first to fourth upper elastic units (510aa, 510ab, 510ba, 510bb).

The first wire (601) may be connected to the first upper elastic unit (510aa). The second wire (602) may be connected to the second upper elastic unit (510ab). The third wire (603) may be connected to the third upper elastic unit (510ba). The fourth wire (604) may be connected to the fourth upper elastic unit (510bb).

The damper (700) may be formed with a material having viscosity. The damper (700) may be coated on the outer part (511a) and the coupling part (514a). The damper (700) may be coated on the second extension part (514ab) and the first outer part (511a). Through this structure, the resonance phenomenon generated from the elastic member (500a, 500b) and the support member (600) may be inhibited. To be more specific, through the said structure, a phenomenon of oscillation generated from intrinsic resonance frequency of elastic member (500a, 500b) and the support member (600) may be inhibited. Furthermore, the said structure has an advantageous effect of easy design over a structure where the damper (700) is coated on the coupling part (514a) and the housing (310) or to the support member (600) and the housing (310). This is because the first upper elastic member (510a) is relatively easy in design change and simple in manufacturing compared with the housing (310).

The sensor (800) may be coupled to the substrate (410). The sensor (800) may detect the magnet (320). The sensor (800) may be accommodated into the sensor coupling part (433) of base (430). The sensor (800) may be provided for OIS feedback. In this case, the sensor (800) may be called an 'OIS feedback sensor'. The sensor (800) may detect the movement of housing (310). The sensor (800) may detect the movement or tilt of the housing (310) and/or the bobbin (210a, 210b) to a direction perpendicular to an optical axis. The sensor (800) may detect the magnet (320). The sensor (800) may detect the magnet (320) disposed on the housing (310). The sensor (800) may detect the position of housing (310). The sensor (800) may detect an amount of movement of the housing (310) to a direction perpendicular to an optical axis. At this time, the amount of movement of housing (310) to a direction perpendicular to the optical axis may correspond to that of the bobbin (210a, 210b) and to that of the lens module coupled to the bobbin (210a, 210b). The sensor (800) may be disposed on the stator (400). The sensor (800) may be disposed on a lower surface of substrate (410). The sensor (800) may be electrically connected to the substrate (410). The sensor (800) may be disposed on the base (430). The sensor (800) may be accommodated into the sensor coupling part (433) formed on an upper surface of base (430). The sensor (800) may be a Hall sensor. The sensor (800) may be a Hall IC (Hall integrated circuit). The sensor (800) may detect a magnetic force of magnet (320). That is, the sensor (800) may detect the change in the magnetic force of magnet (320) when the housing (310) is moved to detect the displacement quantity of the housing (310). The sensor (800) may be provided in a plural number. For example, the sensor (800) may be provided in two pieces to detect the x axis and y axis (optical axis is z axis) movement of housing (310). The sensor (800) may include a first axis sensor (810) detecting the movement to a first axis direction of the magnet (320) and a second axis sensor (820) detecting the movement to a second axis direction of the magnet (320). At this time, the first axis and the second axis may be mutually perpendicular. Furthermore, the first axis and the second axis may be perpendicular to an optical axis.

Hereinafter, operation of dual camera module according to the first exemplary embodiment of the present invention will be described.

First, an AF function of dual camera module according to the first exemplary embodiment of the present invention will be described.

When a power is supplied to the first coil (220a), the first coil (220a) performs a movement relative to the magnet (320) in response to an electromagnetic interaction between the first coil (220a) and the magnet (320). At this time, the first bobbin (210a) coupled to the first coil (220a) integrally moves along with the first coil (220a). That is, the first bobbin (210a) coupled by the first lens module moves to the housing (310) to an optical axis direction. This movement of first bobbin (210a) may result in the first lens module closing on or distancing from the first image sensor, such that the focus control to a subject can be performed by supplying a power to the first coil (220a) according to the first exemplary embodiment of the present invention. Meantime, the said focus control may be automatically implemented in response to a distance to a subject.

Likewise, when a power is supplied to the second coil (220b), the second coil (220b) performs a movement relative to the magnet (320) in response to an electromagnetic interaction between the second coil (220b) and the magnet (320). At this time, the second bobbin (210b) coupled to the second coil (220b) integrally moves along with the second coil (220b). That is, the second bobbin (210b) coupled by the second lens module moves to the housing (310) to an optical axis direction. This movement of second bobbin (210b) may result in the second lens module closing on or distancing from the second image sensor, such that the focus control to a subject can be performed by supplying a power to the second coil (220b) according to the first exemplary embodiment of the present invention. Meantime, the said focus control may be automatically implemented in response to a distance to a subject.

In the first exemplary embodiment of the present invention, a current supply to the first and second coils (220a, 220b) is separately controlled such that the AF driving for the first and second lens modules may be separately controlled.

Now, the OIS function of the dual camera module will be described according to the first exemplary embodiment of the present invention. When a power is supplied to the third coil (422), the magnet (320) is moved to the third coil (422) in response to the electromagnetic interaction between the third coil (422) and the magnet (320). At this time, the housing (310) coupled with the magnet (320) is integrally moved along with the magnet (320). That is, the housing (310) is moved to the base (430) to a horizontal direction (direction perpendicular to an optical axis). However, at this time, the housing (310) may be induced to be tilted to the base (430). Meantime, the bobbin (210a, 210b) may be integrally moved along with the housing (310) in response to the horizontally-directed movement of the housing (310). Hence, the said movement of the housing (310) may result in the lens module coupled with the bobbin (210a, 210b) moving to a direction parallel with a direction disposed with the image sensor relative to the image sensor. That is, in the first exemplary embodiment of the present invention, the supply of power to the third coil (422) may enable to perform the OIS function.

Meantime, in order to implement a more accurate realization of OIS function by the dual lens module according to the first exemplary embodiment of the present invention, an OIS feedback function may be performed. The sensor (800) disposed on the base (430) may detect the magnetic field of the magnet (320) disposed on the housing (310). As a result, when the housing (310) performs a relative movement to the base (430), the amount of magnetic field detected by the sensor (800) may be changed. The first axis sensor (810) and the second axis sensor (820) detects the amount of movement or position of the housing (310) to a horizontal direction (x axis and y axis directions) using the foregoing method, and transmits a detected value to the controller. The controller may determine whether to perform an additional movement to the housing (310) using the received value. The said processes are generated in real time to allow the OIS function of the camera module according to the first exemplary embodiment of the present invention to be more accurately performed through the OIS feedback control.

Hereinafter, configuration of dual camera module according to a modification of the first exemplary embodiment of the present invention will be described with reference to the accompanying drawings.

FIG. 13 is a conceptual view illustrating a modification of the first exemplary embodiment of the present invention.

The dual camera module according to the modification may be different from the dual camera module according the aforementioned first exemplary embodiment of the present invention in that there is a difference in the disposition of magnet (320). Thus, hereinafter, the difference will be focused in explanation between the two exemplary embodiments and other remaining configurations may be inferred from the explanation of the first exemplary embodiment of the present invention.

The magnet (320) in the modification may be disposed on a lateral surface of housing (310). This is different from the first exemplary embodiment of the present invention in that the magnet (320) is disposed at a corner side of the housing (310). Meantime, the magnet (320) in the modification may be formed with seven (7) pieces. This is different from the first exemplary embodiment of the present invention where the magnet (320) is to be disposed with eight (8) corner magnets. In particular, the application of seven magnets (320) in the modification may allow the magnet (320) disposed between the first and second bobbins (210a, 210b) to be commonly used in the AF driving of the first and second bobbins (210a, 210b). Meantime, arrangement of N pole and S pole may be different in order to apply the seven magnets (320) in the modification. The magnet (320) facing the first bobbin (210a) may allow the N pole to face the first bobbin (210a). Furthermore, the magnet (320) facing the second bobbin (210b) may allow the S pole to face the second bobbin (210b). Of course, the arrangement of N pole and S pole of magnet (320) may be also reversely disposed from the previous explanation. The said arrangement structure of magnet (320) will be explained in more details hereinafter.

Now, as a second exemplary embodiment, a dual lens drive device having an arrangement structure of magnet disposed at a lateral surface of housing as in the modification, a dual camera module applied therewith and an optical device will be described in more details with reference to the accompanying drawings.

Figure 16:
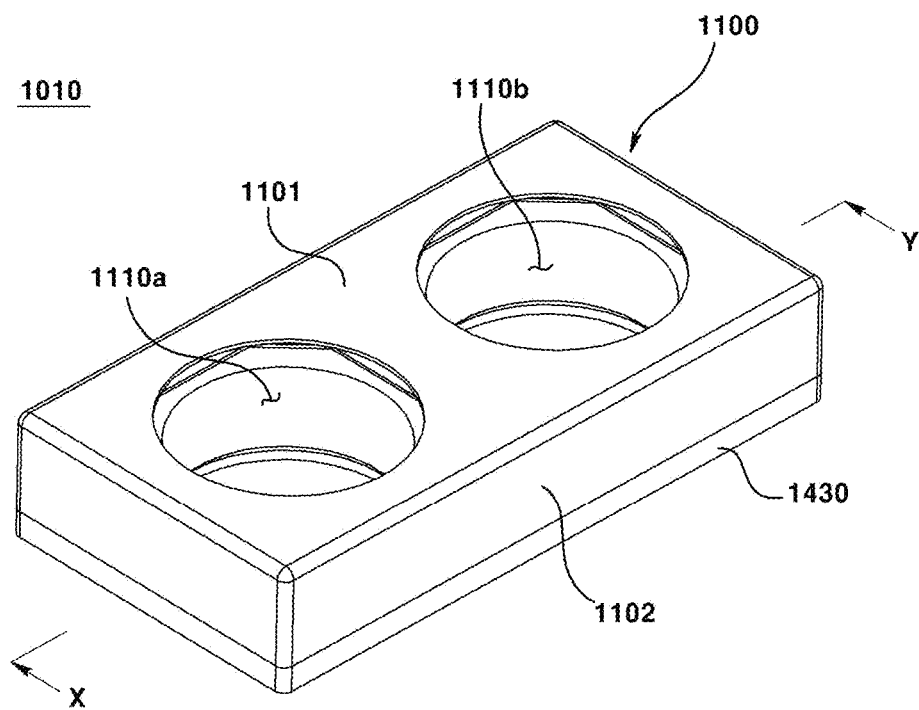
FIG. 16 is a perspective view of a dual lens drive device according to a second exemplary embodiment of the present invention.
Figure 17:
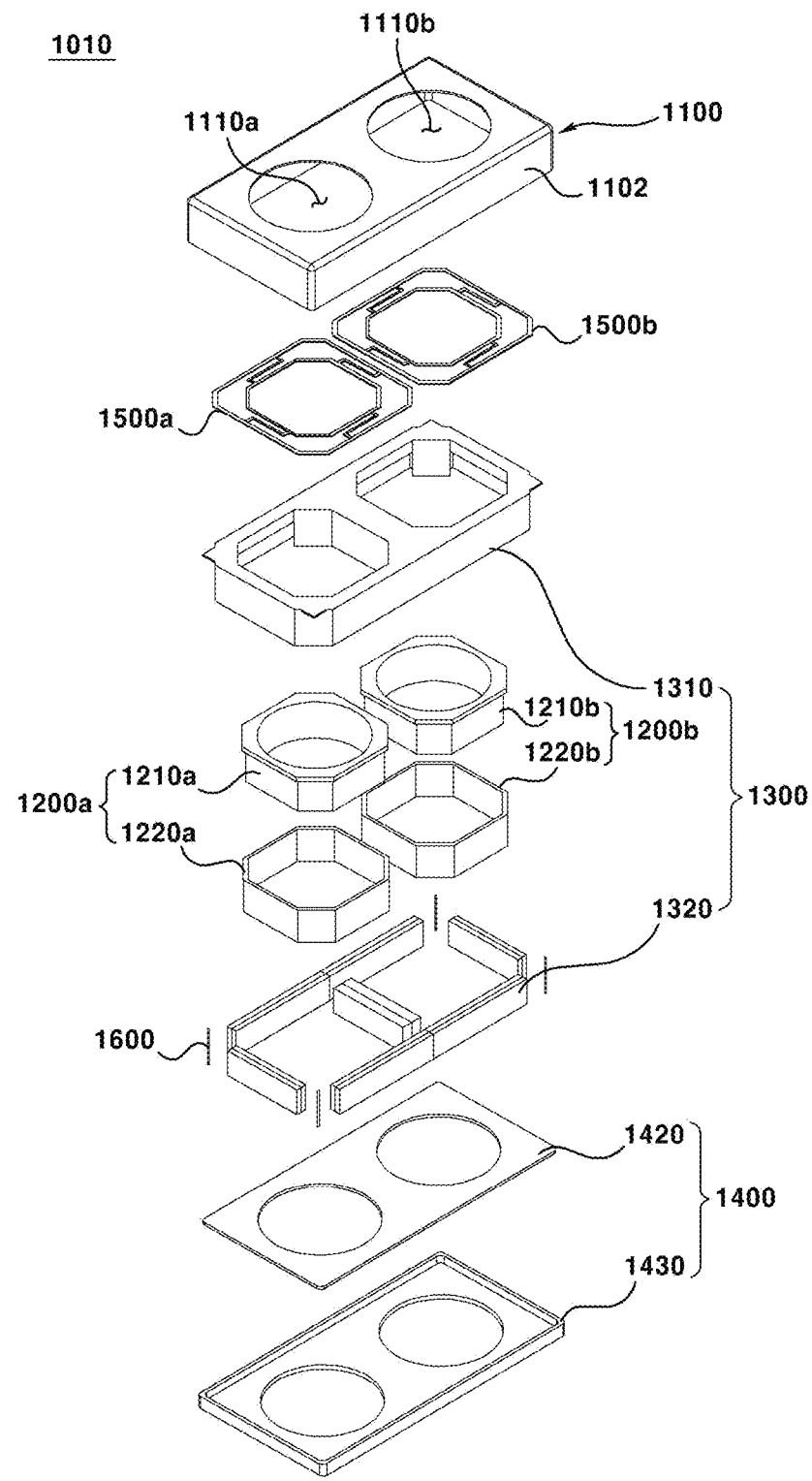
FIG. 17 is an exploded perspective view of a dual lens drive device according to a second exemplary embodiment of the present invention.
Figure 18:
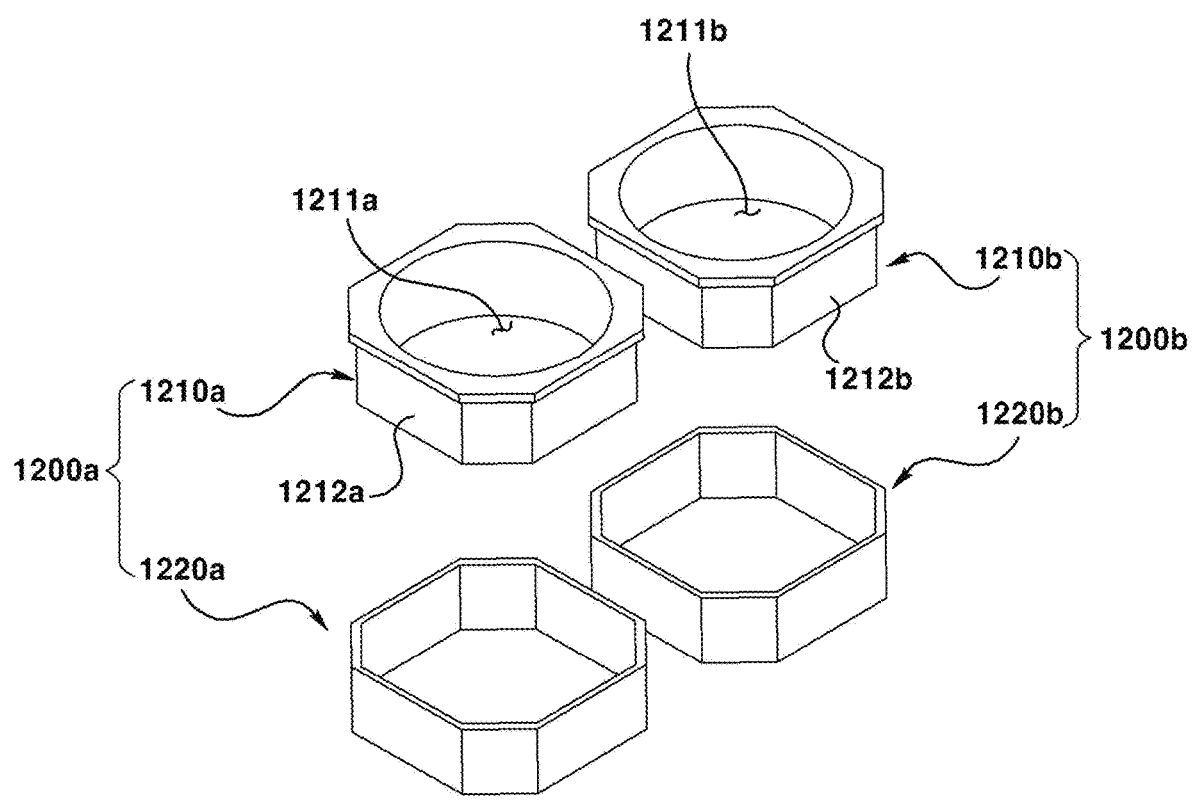
FIG. 18 is a perspective view of a dual lens drive device and a coil according to a second exemplary embodiment of the present invention.
Figure 19:
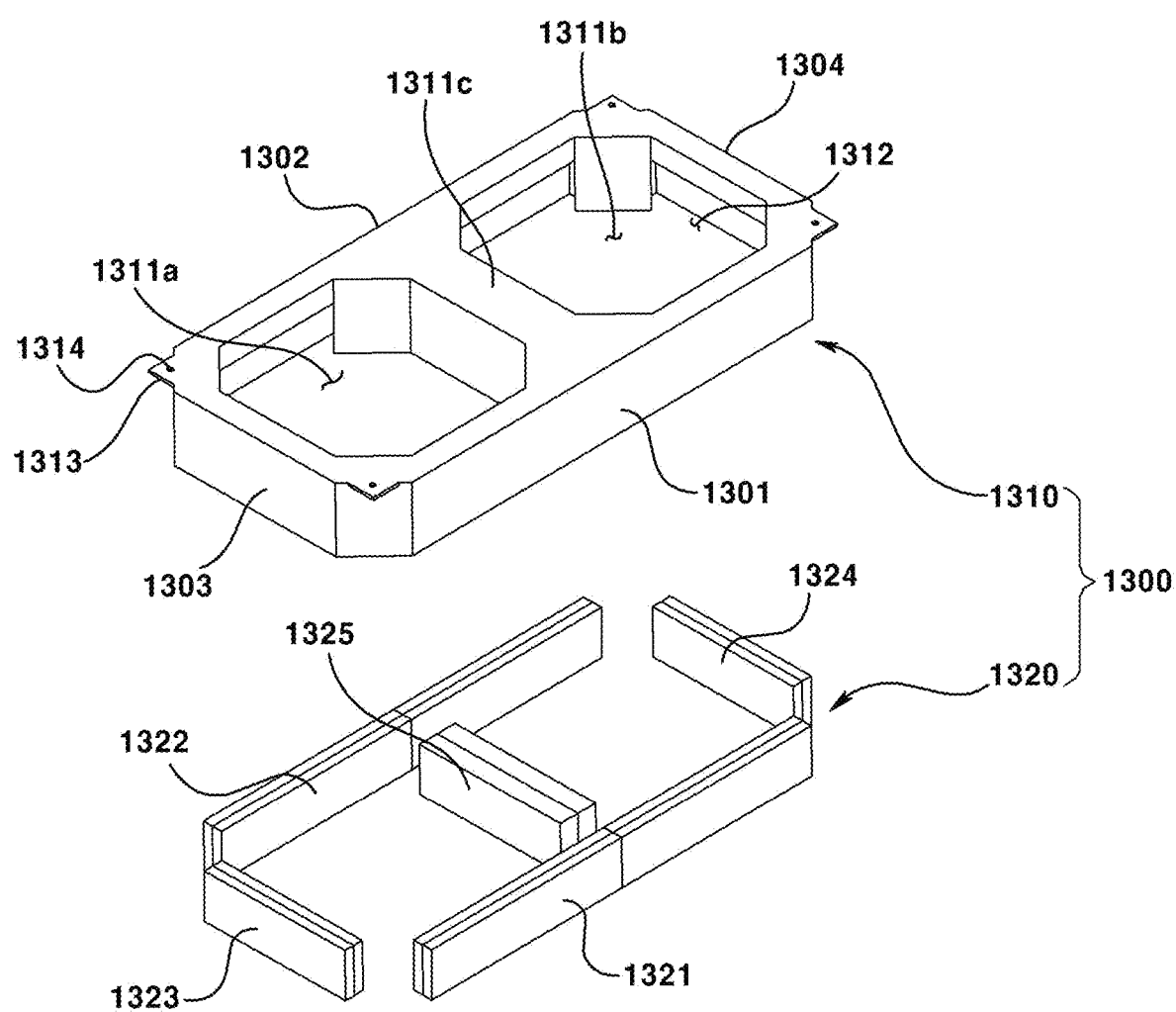
FIG. 19 is a perspective view of a housing and a magnet of a dual lens drive device according to a second exemplary embodiment of the present invention.
Figure 20:
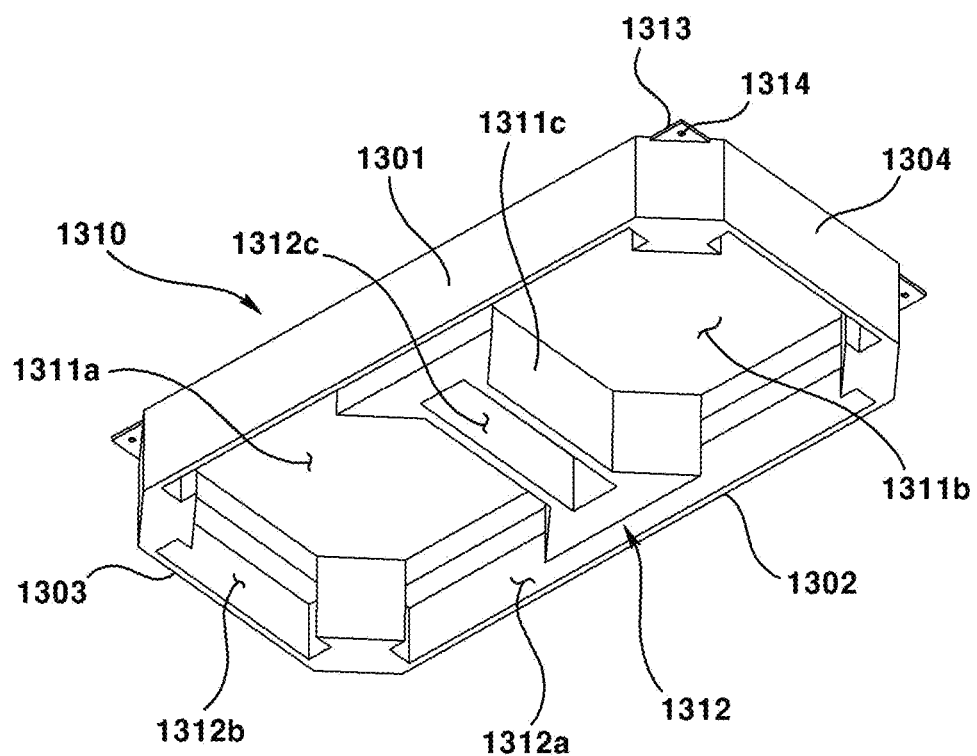
FIG. 20 is a bottom perspective view of a housing of a dual lens drive device according to a second exemplary embodiment of the present invention.
Figure 21:
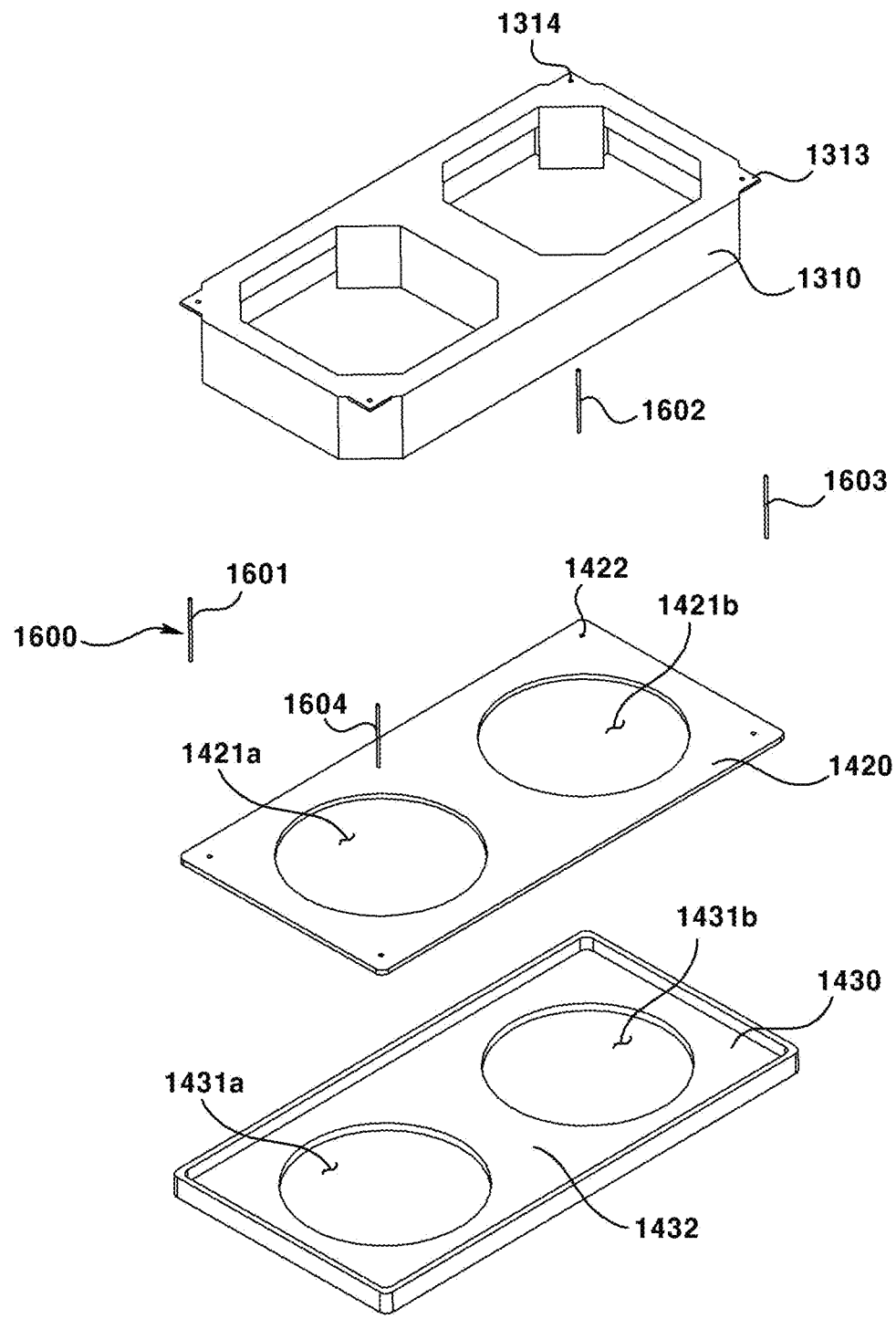
FIG. 21 is a perspective view of some elements of housing of a dual lens drive device according to a second exemplary embodiment of the present invention.
Figure 22:
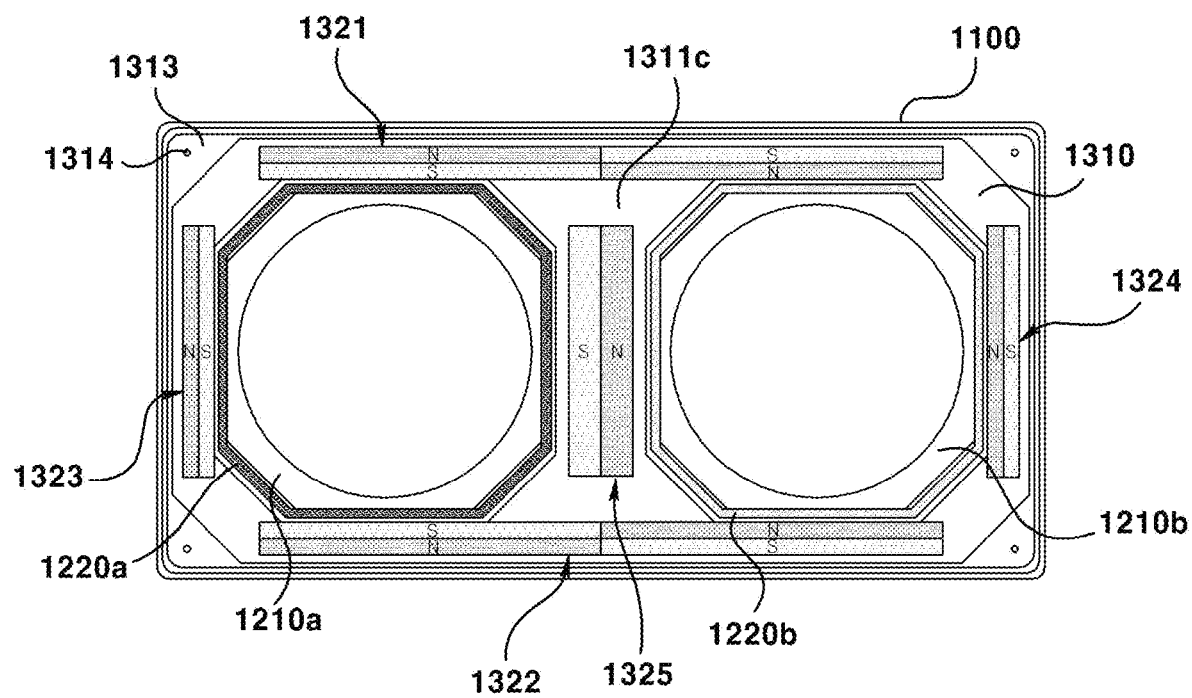
FIG. 22 is a bottom view illustrating a stator omitted from a dual lens drive device according to a second exemplary embodiment of the present invention.
Figure 23:
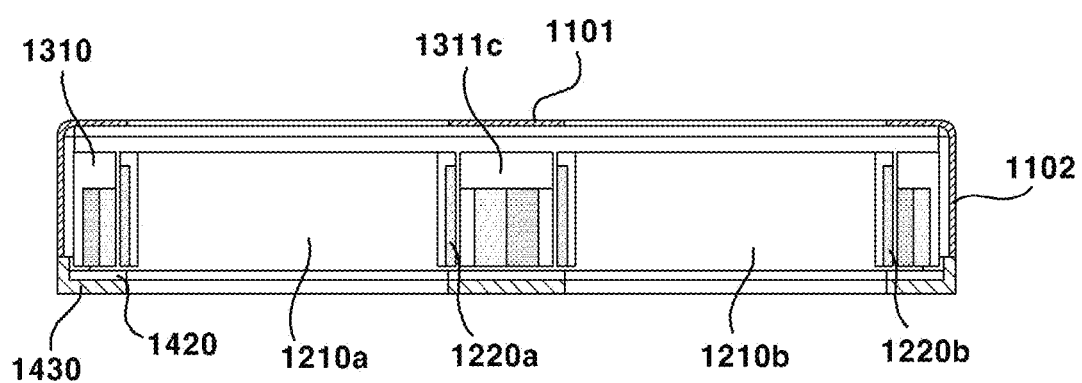
FIG. 23 is a cross-sectional view taken along line X-Y of FIG. 16.
Figure 24:
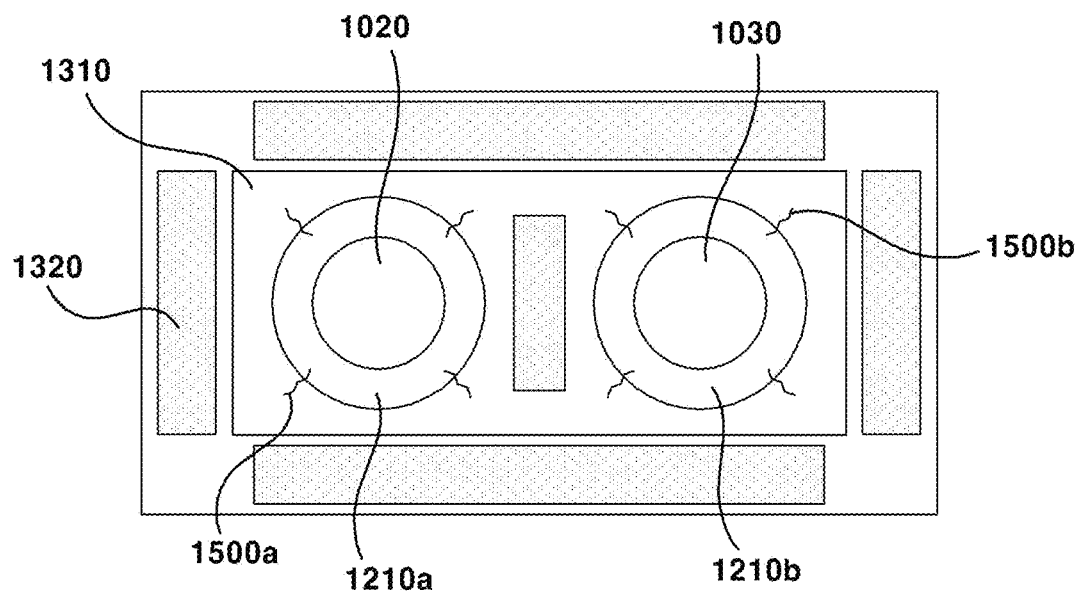
FIG. 24 is a conceptual view of a dual lens drive device according to a second exemplary embodiment of the present invention.
Figure 25:
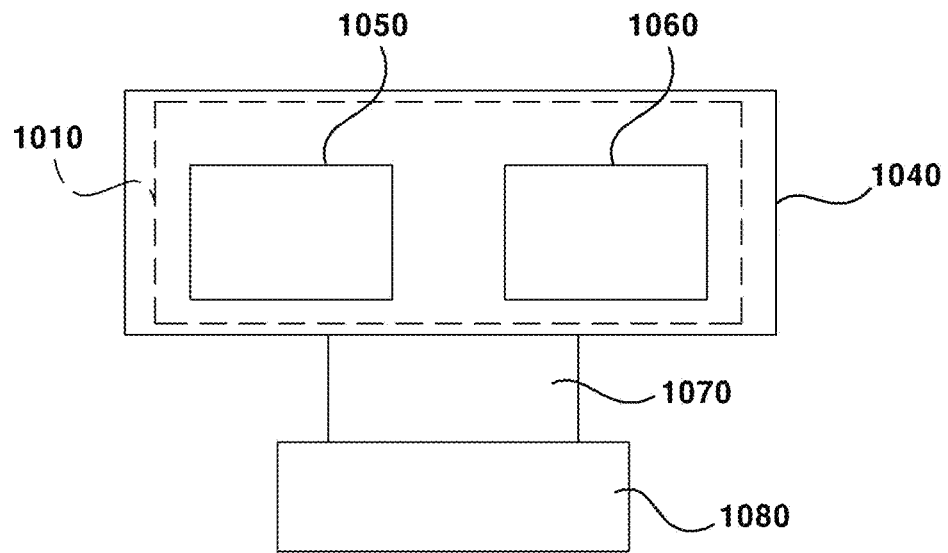
FIG. 25 is a conceptual view of a dual camera module according to a second exemplary embodiment of the present invention.

FIG. 17 is an exploded perspective view of a dual lens drive device according to a second exemplary embodiment of the present invention, FIG. 18 is a perspective view of a dual lens drive device and a coil according to a second exemplary embodiment of the present invention, FIG. 19 is a perspective view of a housing and a magnet of a dual lens drive device according to a second exemplary embodiment of the present invention, FIG. 20 is a bottom perspective view of a housing of a dual lens drive device according to a second exemplary embodiment of the present invention, FIG. 21 is a perspective view of some elements of housing of a dual lens drive device according to a second exemplary embodiment of the present invention, FIG. 22 is a bottom view illustrating a stator omitted from a dual lens drive device according to a second exemplary embodiment of the present invention, FIG. 23 is a cross-sectional view taken along line X-Y of FIG. 16, FIG. 24 is a conceptual view of a dual lens drive device according to a second exemplary embodiment of the present invention, and FIG. 25 is a conceptual view of a dual camera module according to a second exemplary embodiment of the present invention.

Hereinafter, the configuration of dual camera module according to the second exemplary embodiment of the present invention will be described in details with reference to the accompanying drawings.

FIG. 25 is a conceptual view of a dual camera module according to a second exemplary embodiment of the present invention.

A dual camera module may include a lens module (1020, 1030), an IR (Infrared) filter (not shown), a PCB (Printed Circuit Board, 1040), and an image sensor (1050, 1060), a controller (not shown) and in addition, a dual lens drive device (1010). However, any one or more of the lens module (1020, 1030), the IR filter, the PCB (1040), the image sensor (1050, 1060), the controller and the dual lens drive device (1010) may be omitted or changed from the configuration of the dual camera module.

The lens module (1020, 1030) may include one or more lenses. The lens module (1020, 1030) may include a lens and a lens barrel. The lens module (1020, 1030) may include one or more lenses (not shown) and a lens barrel accommodating the lenses. However, one element of the lens module (1020, 1030) is not limited by the lens barrel, and any holder structure capable of supporting one or more lenses will suffice. The lens module (1020, 1030) may include a first lens module (1020) and a second lens module (1030). The first lens module (1020) may be coupled to a first bobbin (1210a). The second lens module (1030) may be coupled to a second bobbin (1210b). The lens module (1020, 1030) may integrally move with the first and second bobbins (1210a, 1210b). The lens module (1020, 1030) may be coupled to the first and second bobbins (1210a, 1210b) using an adhesive (not shown). For example, the lens module (1020, 1030) may be screw-coupled to the bobbins (1210a, 1210b). Meantime, a light having passed the lens module (1020, 1030) may be irradiated on an image sensor. Furthermore, in the second exemplary embodiment of the present invention, a black mask is applied to a lens to effectively remove the flair phenomenon, the detailed explanation of which will be described later.

The IR filter may shield a light of infrared range incident on the image sensor. The IR filter may be interposed between the lens module (1020, 1030) and an image sensor (1050, 1060). Alternatively, the IR filter may be disposed at a holder member (not shown) separately formed on the base (1430). In another example, the IR filter may be mounted on a through hole (1431a, 1431b) of base (1430). The IR filter may include a first IR filter and a second IR filter. The first IR filter may be mounted on the first through hole (1431a) of base (1430). The second IR filter may be mounted on the second through hole (1431b). The infrared filter may be formed with a film material or a glass material. The infrared filter may be formed by allowing an infrared cut-off coating material to be coated on a plate-shaped optical filter such as an imaging plane protection cover glass or a cover glass. The infrared filter may be an infrared absorption filter. In another example, the infrared filter may be an IR reflection filter reflecting the IR.

The abovementioned black mask is provided to inhibit miscellaneous lights from being incident on an image sensor by flare phenomenon, and may be formed about an infrared filter. However, when a black mask is formed on an IR filter, there may be a fear of positions of masks being alternately disposed due to accumulation of assembly tolerances in the process of applying two infrared filters when a dual lens is formed. Thus, in the present exemplary embodiment, when a dual lens is formed, a black mark may be formed on a lens module that passes through a separate alignment process.

The PCB (1040) may be disposed at an upper surface of base (1430). The PCB (1040) may be disposed at a lower surface of base (1430). However, a separate holder member may be interposed between the PCB (1040) and the base (1430). The PCB (1040) may be disposed with an image sensor. The PCB (1040) may be electrically connected to an image sensor.

A light having passed the lens module of the dual lens drive device may be irradiated on the image sensor mounted on the PCB (1040). The PCB (1040) may supply a power (current) to the first to third coils (1220a, 1220b). Meantime, the PCB (1040) may be disposed with a controller to control the dual lens drive device (1010).

The image sensor (1050, 1060) may be mounted on the PCB (1040). The image sensor (1050, 1060) may be electrically connected to the PCB (1040). For example, the image sensor (1050, 1060) may be coupled to the PCB (1040) by way of SMT (Surface Mounting Technology). In another example, the image sensor (1050, 1060) may be coupled to the PCB (1040) by way of flip flop technology. The image sensor (1050, 1060) may include a first image sensor (1050) and a second image sensor (1060). The first image sensor (1050) may be so disposed as to match the first lens module (1020) in terms of optical axis. The second image sensor (1060) may be so disposed as to match the second lens module (1030) in terms of optical axis. That is, an optical axis of image sensor (1050, 1060) may be aligned with an optical axis of lens module (1020, 1030). Through this structure, the image sensor (1050, 1060) may obtain a light having passed the lens module (1020, 1030). The image sensor (1050, 1060) may convert a light irradiated on an effective image region of the image sensor (1050, 1060) to an electric signal. The image sensor may be, for example, a CCD (charge coupled device), a MOS (metal oxide semiconductor), a CPD and a CID. However, the types of image sensors are not limited thereto, any configuration capable of converting an incident light to an electric signal may be used for the image sensor (1050, 1060).

The controller may be disposed on a PCB (1040). In another example, the controller may be disposed other elements than the PCB (1040). The controller may individually control a direction, intensity and an amplitude of a current supplied to the first to third coils (1220a, 1220b). The controller may perform any one or more of AF function and OIS function of dual camera module by controlling a current supplied to the first to third coils (1220a, 1220b). That is, the controller may move the lens module (1020, 1030) to an optical axis direction or move or tilt the lens module (1020, 1030) to a direction perpendicular to an optical axis direction. Furthermore, the controller may perform any one or more of a feedback control of AF function or a feedback control of OIS function.

The dual camera module may further include an FPCB (1070) and a connector (1080). However, any one or more of the FPCB (1070) and the connector (1080) may be omitted or changed from the dual camera module. The FPCB (1070) may connect the PCB (1040) and the connector (1080). The FPCB 1070) may possess the flexibility. A width of the FPCB (1070) may be narrower than that of the PCB (1040) and that of the connector (1080).

The connector (1080) may be used for connecting the dual camera module with other outside elements. The connector (1080) may be connected to the PCB (1040) through the FPCB (1070). The connector (1080) may be a BTB (Board-to-Board) connector, for example.

Hereinafter, the configuration of dual lens drive device will be described according to a second exemplary embodiment of the present invention with reference to the accompanying drawings.

FIG. 16 is a perspective view of a dual lens drive device according to a second exemplary embodiment of the present invention, FIG. 17 is an exploded perspective view of a dual lens drive device according to a second exemplary embodiment of the present invention, FIG. 18 is a perspective view of a dual lens drive device and a coil according to a second exemplary embodiment of the present invention, FIG. 19 is a perspective view of a housing and a magnet of a dual lens drive device according to a second exemplary embodiment of the present invention, FIG. 20 is a bottom perspective view of a housing of a dual lens drive device according to a second exemplary embodiment of the present invention, FIG. 21 is a perspective view of some elements of housing of a dual lens drive device according to a second exemplary embodiment of the present invention, FIG. 22 is a bottom view illustrating a stator omitted from a dual lens drive device according to a second exemplary embodiment of the present invention, FIG. 23 is a cross-sectional view taken along line X-Y of FIG. 16, and FIG. 24 is a conceptual view of a dual lens drive device according to a second exemplary embodiment of the present invention.

The dual lens drive device (1010) may include a cover member (1100), a first AF mover (1200a), a second AF mover (1200b), an OIS mover (1300), a stator (1400), a first elastic member (1500a), a second elastic member (1500b) and a support member (1600). However, any one or more of the cover member (1100), the first AF mover (1200a), the second AF mover (1200b), the OIS mover (1300), the stator (1400), the first elastic member (1500a), the second elastic member (1500b) and the support member (1600) may be omitted or changed from the (1010).

The cover member (1100) may form an external shape of the dual lens drive device (1010). The cover member (1100) may take a bottom-opened cubic shape. However, the shape of the cover member (110) is not limited thereto. The cover member (1100) may be of a non-magnetic substance. When the cover member (1100) is formed with a magnetic substance, the magnetic force of the cover member (1100) may affect a magnet (1320). The cover member (1100) may be formed with a metal material. To be more specific, the cover member (1100) may be formed with a metal plate. In this case, the cover member (1100) may shield an EMI (Electro Magnetic Interference). Because of the said characteristic of the cover member (1100), the cover member (1100) may be called an "EMI shield can". The cover member (1100) may be connected to a ground part of the PCB (1040). The cover member (1100) can shield radio waves generated from outside of the lens drive device from being introduced into the cover member (1100). Furthermore, the cover member (1100) may shield radio waves generated from inside of the cover member (1100) from being discharged to outside of the cover member (1100).

The cover member (1100) may include an upper plate (1101) and a side plate (1102). The cover member (1100) may include an upper plate (1101) and a side plate (1102). The cover member (1100) may include an upper plate (1101) and a side plate (1102) extended by being bent from the upper plate (1101). The cover member (1100) may include an upper plate (1101) and a side plate (1102) extended downwardly from an outer periphery of the upper plate (1101). For example, the cover member (1100) may be coupled to the base (1430). A portion of the side plate (1102) at the cover member (1100) may be coupled to the base (1430). A lower end of the side plate (1102) of the cover member (1100) may be coupled to the base (1430). An inner lateral surface of the side plate (1102) of the cover member (1100) may be directly contacted to an outside lateral surface of the base (1430). An inner lateral surface of the side plate (1102) at the cover member (1100) may be coupled to the base (1430) by an adhesive (not shown). In another example, the cover member (1100) may be directly coupled to an upper surface of the PCB (1040). An inner space formed by the cover member (1100) and the base (1430) may be disposed with any one or more of a first AF mover (1200*a*), a second AF mover (1200*b*), an OIS mover (1300), a stator (1400), a first elastic member (1500*a*), a second elastic member (1500*b*) and a support member (1600). Through this structure, the cover member (1100) can protect inner elements from an outside shock and simultaneously inhibit an outside foreign object from being inwardly introduced. The cover member (1100) may be integrally formed.

The cover member (1100) may include a first opening (1110*a*) and a second opening (1110*b*). The cover member (1100) may include a first opening (1110*a*) on the upper plate (1101) formed at a position corresponding to that of the first bobbin (1210*a*). The cover member (1100) may include a second opening (1110*b*) on the upper plate (1101) formed at a position corresponding to that of the second bobbin (1210*b*).

The openings (1110*a*, 1110*b*) may be formed on the upper plate (1101) of cover member (1100). The openings (1110*a*, 1110*b*) may upwardly expose the lens module (1020, 1030). The openings (1110*a*, 1110*b*) may take a shape corresponding to that of the lens module (1020, 1030). Each of the openings (1110*a*, 1110*b*) may be greater in size than a diameter of the lens module (1020, 1030) to allow the lens module (1020, 1030) to be assembled through the openings (1110*a*, 1110*b*). A light having been introduced into and through the openings (1110*a*, 1110*b*) may pass through the lens module (1020, 1030). At this time, the light having passed the lens module (1020, 1030) may be converted to an electric signal by an image sensor and may be obtained as an image.

The first AF mover (1200*a*) may be coupled with the first lens module (1020). The first AF mover (1200*a*) may accommodate the first lens module (1020) at an inside thereof. An inner periphery surface of first AF mover (1200*a*) may be coupled by an outer periphery surface of the first lens module (1020). The first AF mover (1200*a*) may be moved through interaction with the OIS mover (1300) and/or the mover (1400). At this time, the first AF mover (1200*a*) may move integrally with the first lens module (1020). The first AF mover (1200*a*) may move for AF focus function.

The first AF mover (1200*a*) may include a first bobbin (1210*a*) and a first coil (1220*a*). However, any one or more of the first bobbin (1210*a*) and the first coil (1220*a*) may be omitted or changed from the first AF mover (1200*a*).

The first bobbin (1210*a*) may be disposed at a first hole (1311*a*) of housing (1310) in order to move to a first direction. The first bobbin (1210*a*) may be disposed at an inside of the housing (1310). The first bobbin (1210*a*) may be disposed at a first hole (1311*a*) of the housing (1310). The first bobbin (1210*a*) may move to an optical axis direction about the housing (1310). The first bobbin (1210*a*) may be coupled with the first lens module (1020). An inner periphery surface of first bobbin (1210*a*) may be coupled by an outer periphery surface of the first lens module (1020). The first bobbin (1210*a*) may be coupled with the first coil (1220*a*). An outer periphery surface of first bobbin (1210*a*) may be coupled by the first coil (1220*a*). An upper surface of first bobbin (1210*a*) may be coupled with a first upper elastic member. A lower surface of first bobbin (1210*a*) may be coupled with a first lower elastic member.

The first bobbin (1210*a*) may include a first through hole (1211*a*), a first driving part coupling part (1212*a*). However, any one or more of the first through hole (1211*a*) and the first driving part coupling part (1212*a*) may be omitted from the first bobbin (1210*a*).

The first through hole (1211*a*) may be disposed at an inside of the first bobbin (1210*a*). The first through hole (1211*a*) may be so formed as to be opened at an upper side and a bottom side. The first through hole (1211*a*) may be coupled by the first lens module (1020). An inner periphery surface of the first through hole (1211*a*) may be formed with a screw thread corresponding to that formed on an outer periphery surface of the first lens module (1020). That is, the first through hole (1211*a*) may be screw-connected with the first lens module (1020). An adhesive may be interposed between the first lens module (1020) and the first bobbin (1210*a*). At this time, the adhesive may be an epoxy hardened by any one or more of UV, heat and laser.

The first driving part coupling part (1212*a*) may be coupled by a first coil (1220*a*). The first driving part coupling part (1212*a*) may be formed on an outer periphery surface of first bobbin (1210*a*). The first driving part coupling part (1212*a*) may be formed by a groove formed by allowing a portion of the outer periphery surface of first bobbin (1210*a*) to be inwardly recessed. At this time, the first driving part coupling part (1212*a*) may be accommodated by at least a portion of the first coil (1220*a*). The first driving part coupling part (1212*a*) may be integrally formed with the outer periphery surface of first bobbin (1210*a*). For example, the first driving part coupling part (1212*a*) may be continuously formed along the outer periphery surface of first bobbin (1210*a*). At this time, the first driving part coupling part (1212*a*) may be wound with the first coil (1220*a*). In another example, the first driving part coupling part (1212*a*) may be formed in a plural number, each being mutually spaced apart. At this time, the first coil (1220*a*) may be also formed in a plural number to be respectively coupled to the first driving part coupling part (1212*a*). In still another example, the first driving part coupling part (1212*a*) may be formed with an upper side opened or a bottom side opened. At this time, the first coil (1220*a*) may be inserted into and coupled with the first driving part coupling part (1212*a*) through the opening in a pre-wound state.

An upper surface of first bobbin (1210*a*) may be formed with an upper coupling part coupled with an inner side of the first upper elastic member. A lower surface of first bobbin (1210*a*) may be formed with a lower coupling part coupled with an inner part of the first lower elastic member.

The first coil (1220*a*) may be disposed on the first bobbin (1210*a*). The first coil (1220*a*) may be disposed at an outer periphery surface of first bobbin (1210*a*). The first coil (1220*a*) may be directly wound on the first bobbin (1210*a*). The first coil (1220*a*) may face a magnet (1320). In this case, when a current is supplied to the first coil (1220*a*) to form a magnet field about the first coil (1220*a*), the first coil (1220*a*) may move relative to the magnet (1320) in response to an electromagnetic interaction between the first coil (1220*a*) and the magnet (1320). The first coil (1220*a*) may electromagnetically interact with the magnet (1320). The first coil (1220*a*) may move the first bobbin (1210*a*) relative to the housing (1310) to an optical axis through the electromagnetic interaction with the magnet (1320). For example, the first coil (1220*a*) may be an integrally formed coil. In another example, the first coil (1220*a*) may include a plurality of coils each spaced apart from the other. The first coil (1220*a*) may include four (4) coils each spaced apart. At this time, the said four coils may be disposed at an outer periphery surface of the first bobbin (1210*a*) in order to allow two adjacent coils to mutually form a 90°.

The second AF mover (1200*b*) may be coupled with the second lens module (1030). The second AF mover (1200*b*) may be accommodated into an inside of the second lens module (1030). An inner periphery of the second AF mover (1200*b*) may be coupled by an outer periphery surface of the second lens module (1030). The second AF mover (1200*b*) may be moved through the interaction with the OIS mover (1300) and/or the stator (1400). At this time, the second AF mover (1200*b*) may integrally move with the second lens module (1030). The second AF mover (1200*b*) may be moved for autofocus function.

The second AF mover (1200*b*) may include a second bobbin (1210*b*) and a second coil (1220*b*). However, any one or more of the second bobbin (1210*b*) and the second coil (1220*b*) may be omitted or changed from the second AF mover (1200*b*).

The second bobbin (1210*b*) may be so disposed at a second hole (1311*b*) of housing (1310) as to move to a first direction. The second bobbin (1210*b*) may be disposed at an inside of the housing (1310). The second bobbin (1210*b*) may be disposed on a second hole (1311*b*) of the housing (1310). The second bobbin (1210*b*) may be moved to an optical axis direction about the housing (1310). The second bobbin (1210*b*) may be so disposed at the second hole (1311*b*) of the housing (1310) as to be moved to an optical axis. The second bobbin (1210*b*) may be coupled with the second lens module (1030). An inner periphery surface of the second bobbin (1210*b*) may be coupled by an outer periphery surface of the second lens module (1030). The second bobbin (1210*b*) may be coupled by the second coil (1220*b*). An outer periphery surface of second bobbin (1210*b*) may be coupled by the second coil (1220*b*). An upper surface of second bobbin (1210*b*) may be coupled by the second upper elastic member. A lower surface of second bobbin (1210*b*) may be coupled with the second lower elastic member.

The second bobbin (1210*b*) may include a second through hole (1211*b*) and a second driving part coupling part (1212*b*). However, any one or more of the second through hole (1211*b*) and the second driving part coupling part (1212*b*) may be omitted or changed from the second bobbin (1210*b*).

The second through hole (1211*b*) may be disposed at an inside of the second bobbin (1210*b*). The second through hole (1211*b*) may be so formed as to be opened at an upper side and a bottom side. The second through hole (121*b*) may be coupled by the second lens module (1030). An inner periphery surface of the second through hole (1211*b*) may be formed with a screw thread corresponding to that formed on an outer periphery surface of the second lens module (1030). That is, the second through hole (1211*b*) may be screw-connected with the second lens module (1030). An adhesive may be interposed between the second lens module (1030) and the second bobbin (1210*b*). At this time, the adhesive may be an epoxy hardened by any one or more of UV, heat and laser.

The second driving part coupling part (1212*b*) may be coupled by a second coil (1220*b*). The second driving part coupling part (1212*b*) may be formed on an outer periphery surface of second bobbin (1210*b*). The second driving part coupling part (1212*b*) may be formed by a groove formed by allowing a portion of the outer periphery surface of second bobbin (1210*b*) to be inwardly recessed. At this time, the second driving part coupling part (1212*b*) may be accommodated by at least a portion of the second coil (1220*b*). The second driving part coupling part (1212*b*) may be integrally formed with the outer periphery surface of second bobbin (1210*b*). For example, the second driving part coupling part (1212*b*) may be continuously formed along the outer periphery surface of second bobbin (1210*b*). At this time, the second driving part coupling part (1212*b*) may be wound with the second coil (1220*b*). In another example, the second driving part coupling part (1212*b*) may be formed in a plural number, each being mutually spaced apart. At this time the second coil (1220*b*) may be also formed in a plural number to be respectively coupled to the second driving part coupling part (1212*b*). In still another example, the second driving part coupling part (1212*b*) may be formed with an upper side opened or a bottom side opened. At this time, the second coil (1220*b*) may be inserted into and coupled with the second driving part coupling part (1212*b*) through the opening in a pre-wound state.

An upper surface of second bobbin (1210*b*) may be formed with an upper coupling part coupled to an inner part of the second upper elastic member.

A lower surface of second bobbin (1210*b*) may be disposed with a lower coupling part coupled an inner part of the first lower elastic member.

The second coil (1220*b*) may be disposed on the second bobbin (1210*b*). The second coil (1220*b*) may be disposed at an outer periphery surface of the second bobbin (1210*b*). The second coil (1220*b*) may be directly wound on the second bobbin (1210*b*). The second coil (1220*b*) may face a magnet (1320). In this case, when a current is supplied to the second coil (1220*b*) to form a magnet field about the second coil (1220*b*), the second coil (1220*b*) may move relative to the magnet (1320) in response to an electromagnetic interaction between the second coil (1220*b*) and the magnet (1320). The second coil (1220*b*) may electromagnetically interact with the magnet (1320). The second coil (1220*b*) may move the second bobbin (1210*b*) relative to the housing (1310) to an optical axis through the electromagnetic interaction with the magnet (1320). For example, the second coil (1220*b*) may be an integrally formed coil. In another example, the second coil (1220*b*) may include a plurality of coils each spaced apart from the other. The second coil (1220*b*) may include four (4) coils each spaced apart. At this time, the said four coils may be disposed at an outer periphery surface of the second bobbin (1210*b*) in order to allow two adjacent coils to mutually form a 90°.

The OIS mover (1300) may accommodate, at an inside, at least a portion of a first AF mover (1200*a*) and a second AF mover (1200*b*). The OIS mover (1300) may move the first AF mover (1200*a*) and the second AF mover (1200*b*) or may move along with the first AF mover (1200*a*) and the second AF mover (1200*b*). The OIS mover (1300) may be moved through the interaction with the stator (1400). The OIS mover (1300) may be moved for OIS function. The OIS mover (1300) may be integrally moved with the AF movers (1200*a*, 1200*b*) for the OIS function.

The OIS mover (1300) may include a housing (1310) and a magnet (1320). However, any one or more of the housing (1310) and the magnet (1320) may be omitted or changed from the OIS mover (1300).

The housing (1310) may be disposed at an outside of the bobbin (1210*a*, 1210*b*). The housing (1310) may accommodate, at an inside thereof, at least a portion of the bobbin (1210*a*, 1210*b*). For example, the housing (1310) may take a cubic shape. The housing (1310) may be disposed with the magnet (1320). The housing (1310) may include four side surfaces, and four corner portions disposed among the four side surfaces. The housing (1310) may be disposed with a magnet (1320). Each of the four corner portions of housing (1310) may be disposed with the magnet (1320). In a modification, each of the four side surfaces of the housing (1310) may be disposed with the magnet (1320). At least a portion of an outer periphery surface of housing (1310) may take a shape corresponding to that of an inner periphery surface of cover member (1100). Particularly, the outer periphery surface of housing (1310) may take shape corresponding to that of an inner periphery surface of side (lateral) plate (1102) of cover member (1100). The housing (1310) may be formed with an insulation material. The housing (1310) may be formed with a material different from that of the cover member (1100). The housing (1310) may be formed with an injection object in consideration of productivity. An outer lateral surface of housing (1310) may be spaced apart from an inner lateral surface of side (lateral) plate (1102) at the cover member (1100). The housing (1310) may move for OIS driving in a discrete space between the housing (1310) and the cover member (1100). An upper surface of housing (1310) may be coupled by first and second upper elastic members. A lower surface of housing (1310) may be coupled by first and second lower elastic members.

The housing (1310) in the second exemplary embodiment of the present invention may be integrally formed. That is, in the second exemplary embodiment of the present invention, two driving parts for AF driving are separately controlled while a driving part for OIS driving is singly controlled. In other words, in the second exemplary embodiment of the present invention, although the first lens module (1020) and the second lens module (1030) are individually moved during the AF driving, the first lens module (1020) and the second lens module (1030) are integrally moved during the OIS driving. The mutual interference among magnets can be removed in the VCM structure for dual OIS through the second exemplary embodiment of the present invention.

The housing (1310) may include a first side part (1301) facing a lateral surface of the first bobbin (1210a) and a lateral surface of second bobbin (1210b). The housing (1310) may include a second side part (1302) disposed opposite to the first side part (1301). The housing (1310) may include a third side part (1303) disposed between the first side part (1301) and the second side part (1302) to face a lateral surface of the first bobbin (1210a). The housing (1310) include a fourth side part (1304) disposed between the first side part (1301) and the second side part (1302) to face a lateral surface of the second bobbin (1210b).

The housing (1310) may include a first hole (1311a) a second hole (1311b), a connection part (1311c), a magnet reception (1312), a coupling part (1313) and a coupling hole (1314). However, any one or more of the first hole (1311a) the second hole (1311b), the connection part (1311c), the magnet reception (1312), the coupling part (1313) and the coupling hole (1314) may be omitted or changed from the housing (1310).

The housing (310) may include a first hole (1311a) and a second hole (1311b) spaced apart from the first hole (1311a). The first hole (1311a) may be formed at a position facing that of the first image sensor (1050). The second hole (1311b) may be formed at a position facing that of the second image sensor (1060). The first hole (1311a) may be disposed with a first bobbin (1210a). The second hole (1311b) may be disposed with a second bobbin (1210b). Hereinafter, the first hole (1311a) and the second hole (1311b) are commonly called bobbin reception part (1311a, 1311b). The bobbin reception part (1311a, 1311b) may be formed on the housing (1310). The bobbin reception part (1311a, 1311b) may be formed at an inside of the housing (1310). The bobbin reception part (1311a, 1311b) may include a through hole so formed as to vertically pass through the housing (1310). The bobbin reception part (1311a, 1311b) may be movably disposed with the bobbin (1210a, 1210b). At least a portion of the bobbin reception part (1311a, 1311b) may take a shape corresponding to that of the bobbin (1210a, 1210b). An inner periphery surface of the housing (1310) forming a through hole of the bobbin reception part (1311a, 1311b) may be spaced apart from an outer periphery surface of the bobbin (1210a, 1210b). However, a portion of the bobbin (1210a, 1210b) may be formed with a stopper protruding to an outside to contact an upper surface of the housing (1310) and to mechanically restrict an optical axis direction movement of the bobbin (1210a, 1210b). The connection part (1311c) may connect the first hole (1311a) and the second hole (1311b). The connection part (1311c) may be interposed between the first bobbin (1210a) and the second bobbin (1210b).

The housing (1310) may include a magnet reception part (1312) accommodating a magnet (1320). The magnet reception part (1312) may be opened to a lower side. The magnet reception part (1312) may be coupled by the magnet (1320). The magnet reception part (1312) may be formed on the housing (1310). The magnet reception part (1312) may be formed at an inner periphery surface of housing (1310). In this case, the magnet (1320) disposed on the magnet reception part (1312) may be advantageous for the electromagnetic interaction with the first and second coils (1220a, 1220b) disposed at an inside of the magnet (1320). The magnet reception part (1312) may be opened at a lower surface. In this case, the magnet (1320) disposed on the magnet reception part (1312) may be advantageous for the electromagnetic interaction with the third coil disposed at a lower side of the magnet (1320). The magnet reception part (1312) may be a groove formed by allowing an inner periphery surface of the housing (1310) to be outwardly recessed. At this time, the magnet reception part (1312) may be formed in a plural number.

The plurality of magnet reception parts (1312) may include a first reception groove (1312a), a second reception groove (1312b) and a third reception groove (1312c). The first reception groove (1312a) may be formed on a first side part (1301) and a second side part (1302). The second reception groove (1312b) may be formed on a third side part (1303) and a fourth side part (1304). The third reception groove (1312c) may be formed on the connection part (1311c) of housing (1310). Thus, a width of the first reception groove (1312a) may be larger than that of the second reception groove (1312b). Furthermore, a width of the second reception groove (1312b) may be larger than that of the third reception groove (1312c). Alternatively, a width of the second reception groove (1312b) may be same as that of the third reception groove (1312c).

The coupling part (1313) may be coupled with the support member (1600) by being extended from the housing (1310). The coupling part (1313) may be respectively formed on four (4) corner portions of the housing (1310). The coupling part (1313) may be formed at an upper end of housing (1310). The coupling part (1313) may be a portion of the elastic member (1500).

The coupling hole (1314) may be so formed as to pass through the coupling part (1313). The coupling hole (1314) may be inserted by the support member (1600). The support member (1600) may be coupled with the coupling part (1313) by soldering while being penetrative of the coupling hole (1314).

The magnet (1320) may be disposed on the housing (1310). The magnet (1320) may be formed outside of the first and second coils (1220a, 1220b). The magnet (1320) may face the first and second coils (1220a, 1220b). The magnet (1320) may electromagnetically interact with the first and second coils (1220a, 1220b). The magnet (1320) may be disposed on an upper side of third coil. The magnet (1320) may face the third coil. The magnet (1320) may electromagnetically interact with the third coil. The magnet (1320) may be commonly used for the AF function and the OIS function.

However, the magnet (1320) may include a plurality of magnets separately and respectively used for AF function and the OIS function. The magnet (1320) may be disposed on a lateral surface of the housing (1310). At this time, the magnet (1320) may be a flat plate magnet. The magnet (1320) may take a flat plate shape. The magnet (1320) may include a plurality of flat plate magnets disposed at a lateral part of housing (1310). In a modification, the magnet (1320) may be disposed at a corner portion of the housing (1310). The magnet (1320) may take a cubic shape having an inner lateral surface broader than an outer lateral surface.

The magnet (1320) may include a plurality of magnets. The magnet (1320) may include a plurality of magnets. The magnet (1320) may include a first magnet (1321) disposed on a first lateral part (1301). The magnet (1320) may include a second magnet (1322) disposed on a second lateral part (1302). The magnet (1320) may include a third magnet (1323) disposed on a third lateral part (1303). The magnet (1320) may include a fourth magnet (1324) disposed on a fourth lateral part (1304). The magnet (1320) may include a fifth magnet (1325) interposed between the first and second bobbins (1210a, 1210b).

The first magnet (1321) may be disposed on the first lateral part (1301) of the housing (1310). The first magnet (1321) may be accommodated into a first reception groove (1312a) of housing (1310). An inner length of the first magnet (1321) to a horizontal direction may be longer than that of the third magnet (1323). An inner length of the first magnet (1321) to a horizontal direction may be longer by 1.7~2.3 times than that of the third magnet (1323). Alternatively, an inner length of the first magnet (1321) to a horizontal direction may be longer by 1.5~2.5 times than that of the third magnet (1323). An inner surface of first magnet (1321) may be such that polarity of an area facing the first coil (1220a) is different from that of the second coil (1220b). The first magnet (1321) may be integrally formed. The first magnet (1321) may be divided into two magnets.

The second magnet (1322) may be disposed at a second side part (1302) of housing (1310). The second magnet (1322) may be accommodated into the first reception groove (1312a) of housing (1310). An inner length of the second magnet (1322) to a horizontal direction may be longer than that of the fourth magnet (1324). The inner surface of the second magnet (1322) may be disposed such that polarity of an area facing the first coil (1220a) is different from that facing the second coil (1220b). The second magnet (1322) may be integrally formed. The second magnet (1322) may be divided to two magnets.

The third magnet (1323) may be disposed at a third side part (1303) of housing (1310). The third magnet (1323) may be accommodated into the second reception groove (1312b) of housing (1310). An inner length of the third magnet (1323) to a horizontal direction may be shorter than that of the first magnet (1321).

The fourth magnet (1324) may be disposed at a fourth side part (1304) of housing (1310). The fourth magnet (1324) may be accommodated into the second reception groove (1312b) of housing (1310). An inner length of the fourth magnet (1324) to a horizontal direction may be shorter than that of the second magnet (1322).

The fifth magnet (1325) may be disposed on the connection part (1311c) of housing (1310). The fifth magnet may be accommodated into the third reception groove (1312c) of housing (1310). The fifth magnet (1325) may be interposed between the first and second bobbin (1210a, 1210b). The fifth magnet (1325) may be interposed between the first coil (1220a) and the second bobbin (1220b). The fifth magnet (1325) may be disposed such that polarity of an area facing the first coil (1220a) is different from that facing the second coil (1220b).

A portion of inner surface of the first magnet (1321) facing the first coil (1220a), a portion of second magnet (1322), an inner surface of third magnet (1323) and one lateral surface of fifth magnet (1325) may possess a first polarity. The other portion of inner surface of the first magnet (1321) facing the second coil (1220b), the other portion of inner surface of second magnet (1322), an inner surface of fourth magnet (1324) and the other lateral surface of fifth magnet (1325) may possess a second polarity different from the first polarity. At this time, the first polarity may be an S pole, the second polarity may be an N pole. Alternatively, the first polarity may be an N pole and the second polarity may be an S pole.

The stator (1400) may be disposed at a lower side of housing (1310). The stator (1400) may be disposed at a lower side of OIS mover (1300). The stator (1400) may face the OIS mover (1300). The stator (1400) may movably support the OIS mover (1300). The stator (1400) may move the OIS mover (1300). At this time, the AF mover (1200a, 1200b) may also be moved with the OIS mover (1300).

The stator (1400) may include a substrate (not shown), a circuit member (1420) and a base (1430). However, any one or more of the substrate, the circuit member (1420) and the base (1430) may be omitted or changed from the stator (1400).

The substrate may include a circuit member (1420) having a third coil so disposed as to face the magnet (1320) between the housing (1310) and the base (1430). The substrate may supply a power to the third coil. The substrate may be coupled with the circuit member (1420). The substrate may be integrally formed with the circuit member (1420). The substrate may be coupled to a PCB (1040) disposed at a lower side of base (1430). The substrate may be disposed at a lower surface of circuit member (1420). The substrate may be disposed on an upper surface of base (1430). The substrate may be interposed between the circuit member (1420) and the base (1430).

The substrate may be coupled by a support member (1600). At this time, a lower surface of substrate and a lower end of the support member (1600) may be coupled by way of soldering. The substrate may be integrally formed. The substrate may be an FPCB (Flexible Printed Circuit Board).

The circuit member (1420) may be disposed on the base (1430). The circuit member (1420) may be disposed on the substrate. The circuit member (1420) may be disposed on an upper surface of substrate. The circuit member (1420) may be disposed at a lower side of magnet (1320). The circuit member (1420) may be interposed between the magnet (1320) and the base (1430). The circuit member (1420) may be integrally formed.

The circuit member (1420) may include a substrate part and a third coil. However, any one or more of the substrate part and the third coil may be omitted or changed from the circuit member (1420).

The substrate part may be a circuit board. The substrate part may be an FPCB. The substrate part may be integrally formed with a third coil. The substrate part may be formed with a coupling hole (1422) passed through by the support member (1600). The substrate part (421) may be coupled by the support member (1600). At this time, a lower surface of substrate part and a lower end of the support member (1600) may be coupled by soldering. The substrate part may be formed with an opening (1421*a*, 1421*b*).

The first opening (1421*a*) may be disposed on the circuit member (1420). The first opening (1421*a*) may be leaned onto one side of the circuit member (1420). The first opening (1421*a*) may be so formed as to pass through the circuit member (1420). The first opening (1421*a*) may pass through a light having passed through the first lens module (1020). The first opening (1421*a*) may be formed with a round shape. However, the shape of the first opening (1421*a*) is not limited thereto. The first opening (1421*a*) may be spaced apart from the second opening (1421*b*).

The second opening (1421*b*) may be disposed on the circuit member (1420). The second opening (1421*b*) may be leaned onto one side of the circuit member (1420). The second opening (1421*b*) may be so formed as to pass through the circuit member (1420). The second opening (1421*b*) may pass through a light having passed through the second lens module (1030). The second opening (1421*b*) may be formed with a round shape. However, the shape of the second opening (1421*b*) is not limited thereto. The second opening (1421*b*) may be spaced apart from the first opening (1421*a*).

The third coil may face the magnet (1320). In this case, when a current is supplied to the third coil to form a magnetic field about the third coil, the magnet (1320) may move to the third coil by the electromagnetic interaction between the third coil and the magnet (1320). The third coil may electromagnetically interact with the magnet (1320). The third coil may move the housing (1310) and the bobbin (1210*a*, 1210*b*) relative to the base (1430) to a direction perpendicular to an optical axis through the electromagnetic interaction with the magnet (1320). The third coil may be an FP (Fine Pattern) coil integrally formed on the substrate part. The third coil may be formed on the circuit member (1420) with an FP coil. The third coil may include a plurality of coils each spaced apart from the other.

The third coil may include a first axis driving coil moving the magnet (1320) to a first axis direction, and a second axis driving coil moving the magnet (1320) to a second axis direction different from the first axis. The first axis may be perpendicular to the second axis. Each of the first axis and the second axis may be perpendicular to an optical axis of the first lens module (1020) coupled to the first bobbin (1210*a*). Each of the first axis and the second axis may be perpendicular to an optical axis of the second lens module (1030) coupled to the second bobbin (1210*b*).

The circuit member (1420) may include a coupling hole (1422) passing through the support member (1600). The coupling hole (1422) may be formed on the circuit member (1420). The coupling hole (1422) of the circuit member (1420) may be formed at a position corresponding to that of a coupling hole (1314) of the housing (1310). The coupling hole (1422) may be inserted by the support member (1600). Under this state, the support member (1600) may be coupled to the circuit member (1420) by way of soldering.

The base (1430) may be disposed underneath the housing (1310). The base (1430) may be disposed at a lower surface of the circuit member (1420). An upper surface of base (1430) may be disposed with the circuit member (1420). The base (1430) may be disposed with the substrate. The base (1430) may be coupled with the cover member (1100). The base (1430) may be disposed at an upper surface of PCB (1040). However, a separate holder member may be interposed between the base (1430) and the PCB (1040). The base (1430) may perform a function of a sensor holder protecting an image sensor (1050, 1060) mounted on the PCB (1040). The base (1430) may be integrally formed.

The base (1430) may include a through hole (1431*a*, 1431*b*) and a reception groove (1432). However, any one or more of the through hole (1431*a*, 1431*b*) and the reception groove (1432) may be omitted or changed from the base (1430).

The base (1430) may include a first through hole (1431*a*) formed at a position corresponding to that of the first bobbin (1210*a*). The base (1430) may include a second through hole (1431*b*) formed at a position corresponding to that of the second bobbin (1210*b*). The through hole (1431*a*, 1431*b*) may be formed on the base (1430). The through hole (1431*a*, 1431*b*) may be so formed as to vertically pass through the base (1430). The through hole (1431*a*, 1431*b*) may be formed with an infrared filter. A light having passed the lens module (1020, 1030) through the through hole (1431*a*, 1431*b*) may be incident on the image sensor (1050, 1060). The through hole (1431*a*, 1431*b*) may include a first through hole (1431*a*) and a second through hole (1431*b*). The first through hole (1431*a*) may be passed through by a light having passed the first lens module (1020). The second through hole (1431*b*) may be passed through by a light having passed the second lens module (1030). The through hole (431*a*, 431*b*) may take a circular shape. However, the shape of the through hole (431*a*, 431*b*) is not limited thereto.

The reception groove (1432) may be formed by allowing a portion of an upper surface of the base (1420) to be recessed. The reception groove (1432) may accommodate the circuit member (1420). The reception groove (1432) may take a shape corresponding to that of the circuit member (1420).

Hereinafter, an elastic member (1500*a*, 1500*b*) and a support member (1600) as elements to guide the movement of the bobbin (1210*a*, 1210*b*) and the housing (1310) will be described. However, this is an example, and other members than a spring and a wire for guiding the movement of the bobbin (1210*a*, 1210*b*) and the housing (1310) may be used. For example, a ball guide may replace the elastic member (1500*a*, 1500*b*) and the support member (1600).

The first elastic member (1500*a*) may be coupled to the first bobbin (1210*a*) and the housing (1310). The first elastic member (1500*a*) may elastically support the first bobbin (1210*a*). The first elastic member (1500*a*) may possess the elasticity on at least a portion thereof. The first elastic member (1500*a*) may movably support the first bobbin (1210*a*). The first elastic member (1500*a*) may movably support the first bobbin (1210*a*) to the housing (1310) to an optical axis direction. That is, the first elastic member (1500*a*) may support in such a manner that the first bobbin (1210*a*) can perform the AF driving. At this time, the first elastic member (1500*a*) may be called an 'AF support member'.

The first elastic member (1500*a*) may include a first upper elastic member and a first lower elastic member. However, any one or more of the first upper elastic member and the first lower elastic member may be omitted or changed from the first elastic member (1500*a*).

The first upper elastic member may be disposed on an upper side of first bobbin (1210*a*) and may be coupled with the first bobbin (1210*a*) and the housing (1310). The first upper elastic member may include an outer part coupled to an upper surface of the first bobbin (1210*a*), an inner part coupled to an upper surface of housing (1310) and a connection part connecting the outer part and the inner part.

The first lower elastic member may be disposed on a lower side of first bobbin (1210*a*) and may be coupled with the first bobbin (1210*a*) and the housing (1310). The first lower elastic member may include an outer part coupled to a lower surface of the first bobbin (1210*a*), an inner part coupled to a lower surface of housing (1310) and a connection part connecting the outer part and the inner part.

The second elastic member (1500*b*) may be coupled with the second bobbin (1210*b*) and the housing (1310). The second elastic member (1500*b*) may elastically support the second bobbin (1210*b*). The second elastic member (1500*b*) may possess the elasticity on at least a portion thereof. The second elastic member (1500*b*) may movably support the second bobbin (1210*b*). The second elastic member (1500*b*) may movably support the second bobbin (1210*b*) relative to the housing (1310) to an optical axis direction. That is, the second elastic member (1500*b*) may support the second bobbin (1210*b*) for AF driving. At this time, the second elastic member (1500*b*) may be called an 'AF support member'.

The second elastic member (1500*b*) may include a second upper elastic member and a second lower elastic member. However, any one or more of the second upper elastic member and the second lower elastic member may be omitted or changed from the second elastic member (1500*b*).

The second upper elastic member may be disposed on an upper side of the second bobbin (1210*b*) and may be coupled with the second bobbin (1210*b*) and the housing (1310). The second upper elastic member may include an outer part coupled to a lower surface of the second bobbin (1210*b*), an inner part coupled to a lower surface of housing (1310) and a connection part connecting the outer part and the inner part.

The support member (1600) may movably support the housing (1310). The support member (1600) may movably support the housing (1310) relative to the substrate. The support member (1600) may elastically support the housing (1310). The support member (1600) may possess the elasticity at least on a portion thereof. For example, the support member (1600) may movably support the housing (1310) relative to the stator (1400) to a direction perpendicular to an optical axis. At this time, the bobbin (1210*a*, 1210*b*) may integrally move along with the housing (1310). In another example, the support member (1600) may tiltably support the housing (1310) relative to the stator (1400). That is, the support member (1600) may support to allow the housing (1310) and the bobbin (1210*a*, 1210*b*) to perform an OIS driving. At this time, the support member (1600) may be called an 'OIS support member'. For example, the support member (1600) may be formed with a wire. In another example, the support member (1600) may be formed with a leaf spring.

The support member (1600) may be coupled to a coupling part (1313) of housing (1310) and the circuit member (1420). The support member (1600) may pass through a coupling hole (1314) of the coupling part (1313) at the housing (1310) and a coupling hole (1422) of the circuit member (1420). The support member (1600) may be coupled to the coupling part (1313) by soldering. The support member (1600) may be coupled to the circuit member (1420) by soldering.

The support member (1600) may be formed with a plurality of elements. The support member (1600) may be formed with four (4) support parts, each spaced apart from the other. At this time, the support part may be a wire. The support member (1600) may be formed with four wires (1601, 1602, 1603, 1604), each wire spaced apart from the other wire. The support member (1600) may be formed with first to fourth wires (1601, 1602, 1603, 1604), each wire spaced apart from the other wire. The support member (1600) may include first to fourth wires (1601, 1602, 1603, 1604), each wire spaced apart from the other wire. The support member (1600) may be comprised of first to fourth wires (1601, 1602, 1603, 1604), each wire spaced apart from the other wire. That is, the support member (1600) may be formed with a total of four (4) wires.

The dual lens drive device according to the second exemplary embodiment of the present invention may further comprise a damper and a sensor.

The damper may be formed with a material having viscosity. The damper may be coated on any one or more of the elastic member (1500*a*, 1500*b*), the support member (1600) and the housing to inhibit the resonance of the elastic member (1500*a*, 1500*b*) and the support member (1600).

The sensor may be disposed for AF feedback function and/or OIS feedback function. The sensor may be a Hall sensor. The sensor may detect the position of the bobbin (1210*a*, 1210*b*) and/or the housing (1310) by detecting the magnetic force.

Hereinafter, the operation of dual camera module according to the second exemplary embodiment of the present invention will be described.

First, an AF function of dual camera module according to the second exemplary embodiment of the present invention will be described.

When a power is supplied to the first coil (1220*a*), the first coil (1220*a*) performs a movement relative to the magnet (1320) in response to an electromagnetic interaction between the first coil (1220*a*) and the magnet (1320). At this time, the first bobbin (1210*a*) coupled to the first coil (1220*a*) integrally moves along with the first coil (1220*a*). That is, the first bobbin (1210*a*) coupled by the first lens module (1020) moves to the housing (1310) toward an optical axis direction. This movement of first bobbin (1210*a*) may result in the first lens module (1020) closing on or distancing from the first image sensor (1050), such that the focus control to a subject can be performed by supplying a power to the first coil (1220*a*) according to the second exemplary embodiment of the present invention. Meantime, the said focus control may be automatically implemented in response to a distance to a subject.

Likewise, when a power is supplied to the second coil (1220*b*), the second coil (1220*b*) performs a movement relative to the magnet (1320) in response to an electromagnetic interaction between the second coil (1220*b*) and the magnet (1320). At this time, the second bobbin (1210*b*) coupled to the second coil (1220*b*) integrally moves along with the second coil (1220*b*). That is, the second bobbin (1210*b*) coupled by the second lens module (1030) moves to the housing (310) toward an optical axis direction. The said movement of second bobbin (1210*b*) may result in the second lens module (1030) closing on or distancing from the second image sensor (1060), such that the focus control to a subject can be performed by supplying a power to the second coil (1220b) according to the second exemplary embodiment of the present invention. Meantime, the said focus control may be automatically implemented in response to a distance to a subject.

In the second exemplary embodiment of the present invention, a current supply to the first and second coils (1220a, 1220b) is separately controlled such that the AF driving for the first and second lens modules (1020, 1030) may be separately controlled.

Now, the OIS function of the dual camera module will be described according to the second exemplary embodiment of the present invention. When a power is supplied to the third coil, the magnet (1320) is moved to the third coil in response to the electromagnetic interaction between the third coil and the magnet (1320). At this time, the housing (1310) coupled with the magnet (1320) may be integrally moved along with the magnet (1320). That is, the housing (1310) may be moved to the base (1430) toward a horizontal direction (direction perpendicular to an optical axis). However, at this time, the housing (1310) may be induced to be tilted to the base (1430). Meantime, the bobbin (1210a, 1210b) may be integrally moved along with the housing (1310) in response to the horizontally-directed movement of the housing (1310). Hence, the said movement of the housing (1310) may result in the lens module (1020, 1030) coupled with the bobbin (1210a, 1210b) moving to a direction parallel with a direction disposed with the image sensor (1050, 1060) relative to the image sensor (1050, 1060). That is, in the second exemplary embodiment of the present invention, the supply of power to the third coil may enable to perform the OIS function.

Next, in order to effectively remove the flare phenomenon, the structure of the third exemplary embodiment of the present invention applying a black mask to the lens will be described in detail with reference to the accompanying drawings. The explanation that the said structure can be applied to the camera module or the dual camera module according to the first and second exemplary embodiments has been already provided.

Figure 26:
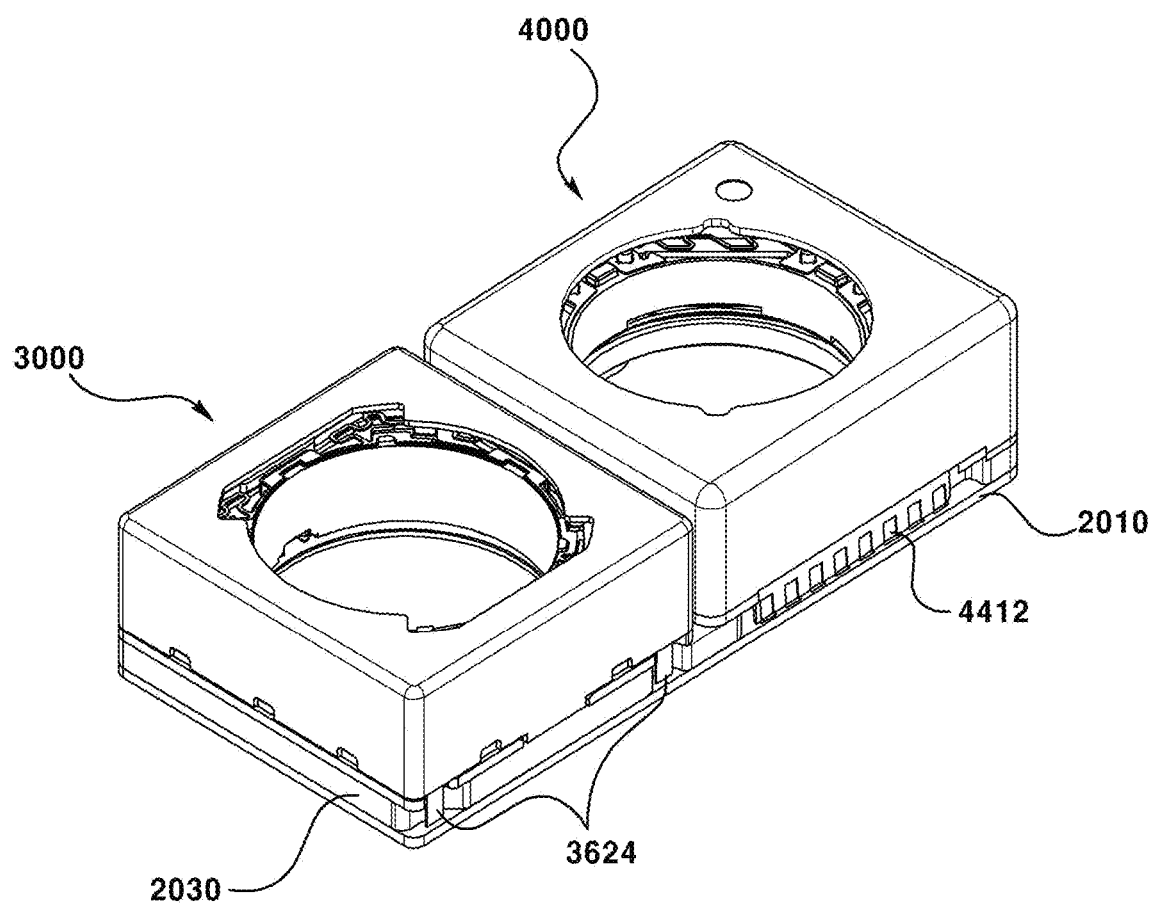
FIG. 26 is a perspective view of a dual camera module according to a third exemplary embodiment of the present invention.
Figure 27:
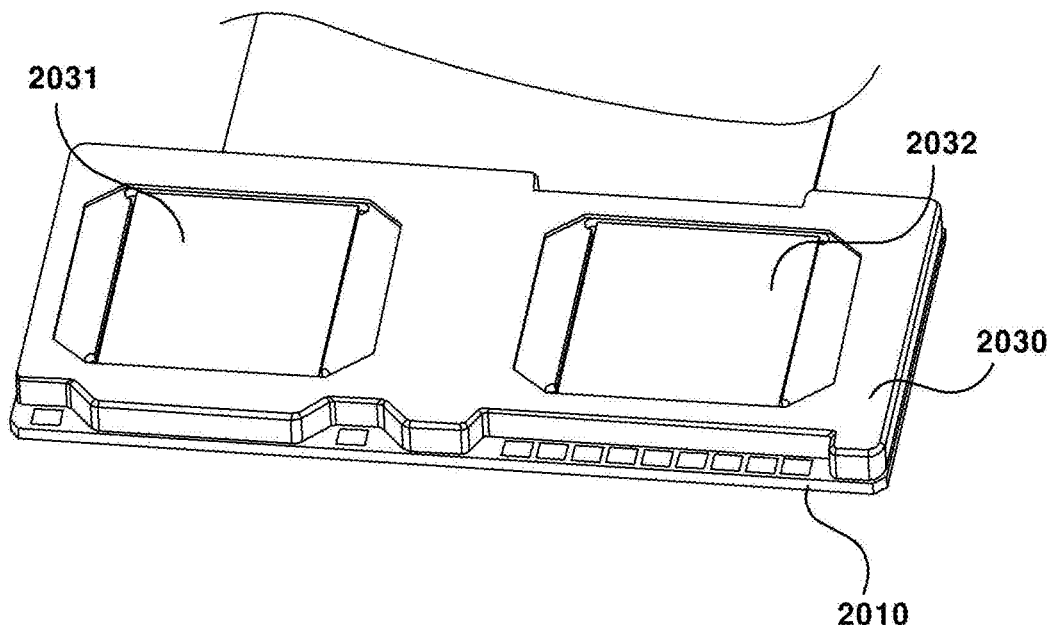
FIG. 27 is a perspective view illustrating a state where first and second lens drive devices are omitted from a dual camera module according to a third exemplary embodiment of the present invention.
Figure 28:
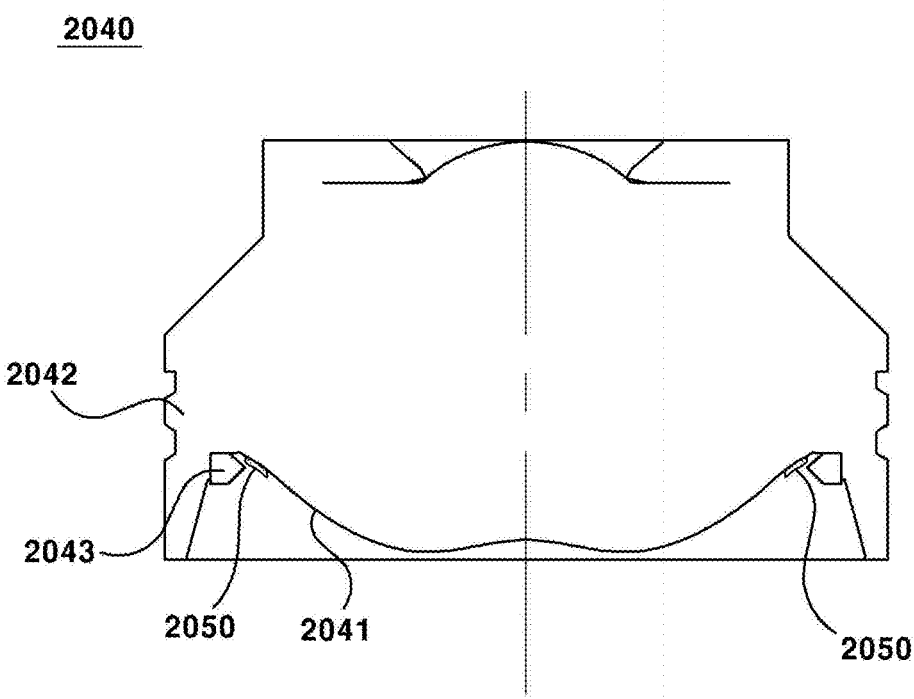
FIG. 28 is a cross-sectional view of a lens module according to a third exemplary embodiment of the present invention.
Figure 29:
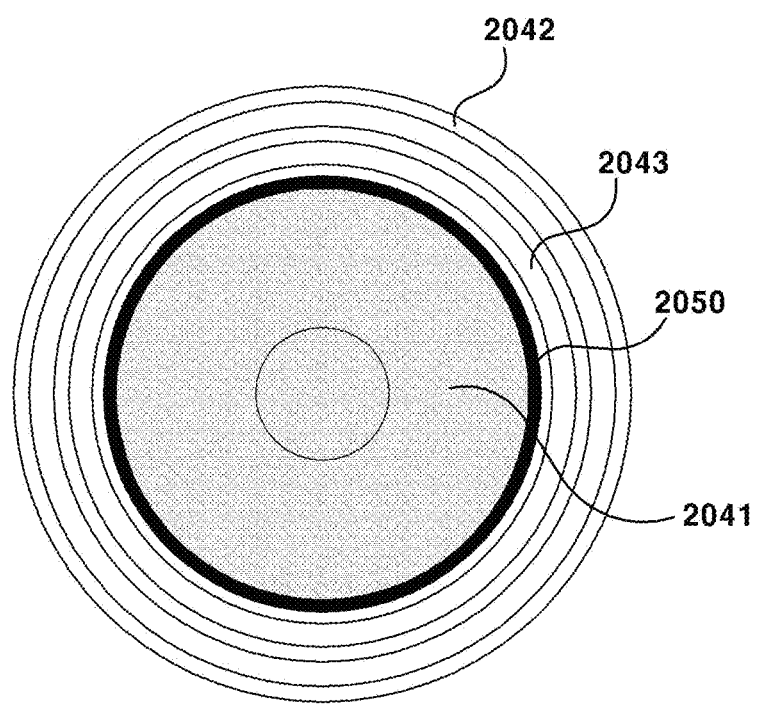
FIG. 29 is a bottom view illustrating a lens module according to a third exemplary embodiment of the present invention.
Figure 30:
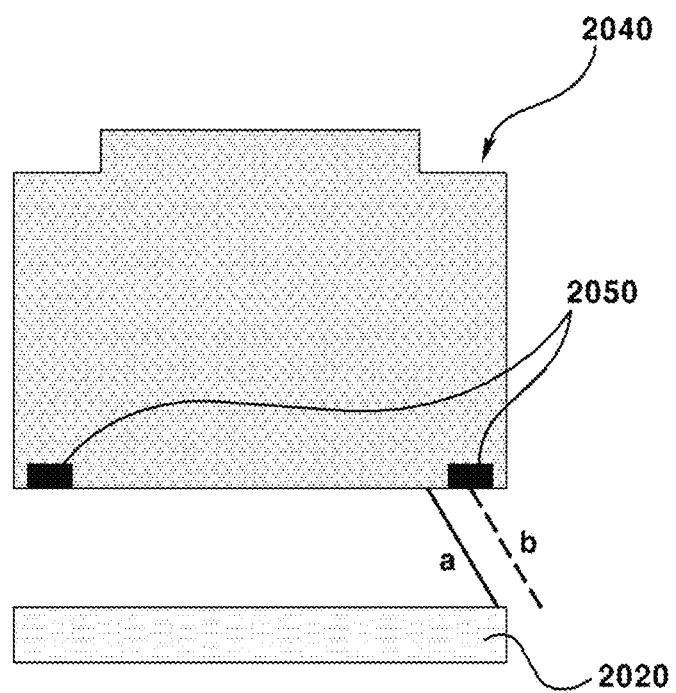
FIG. 30 is a conceptual view of a lens module according to a third exemplary embodiment of the present invention.
Figure 31:
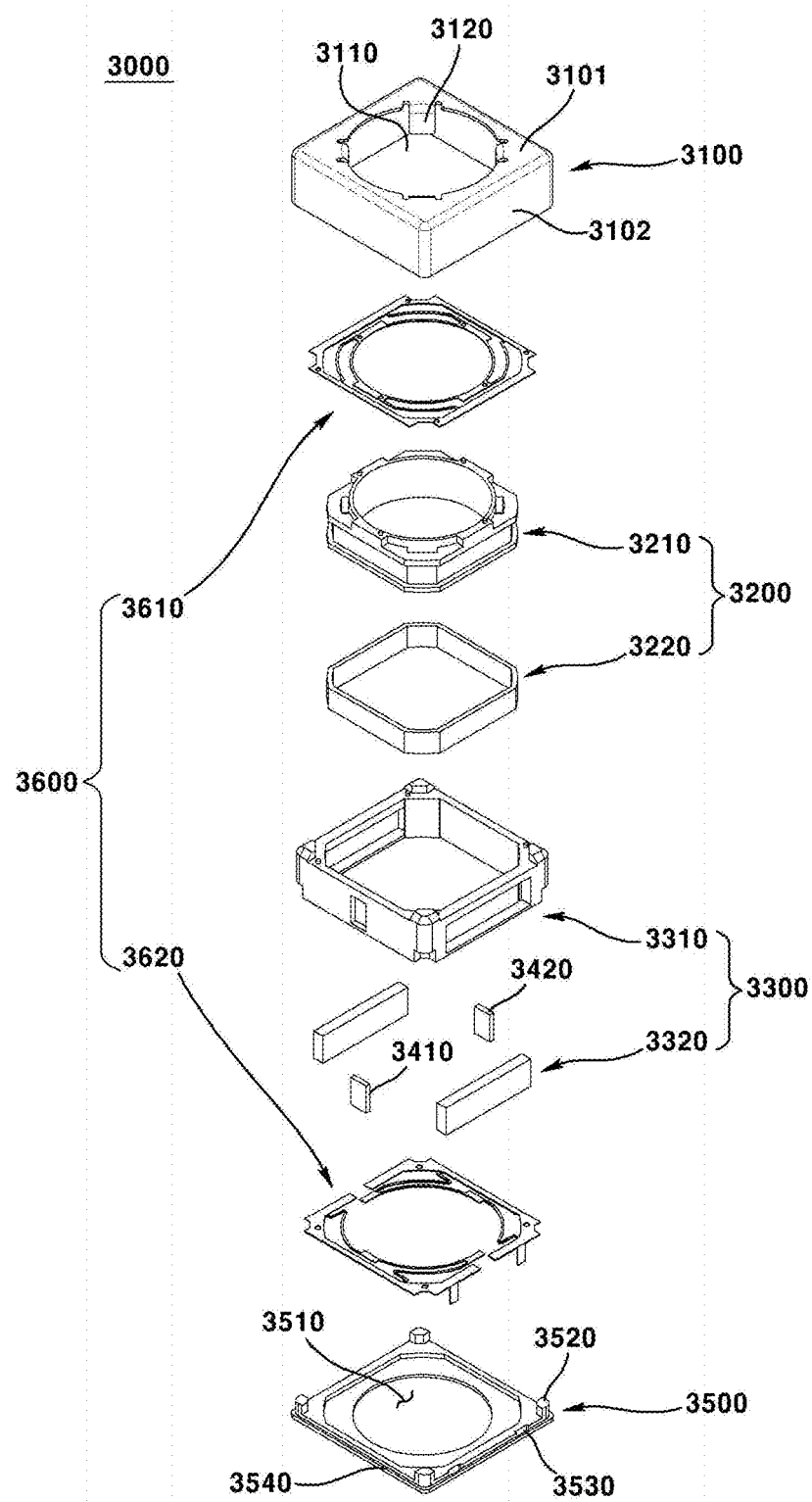
FIG. 31 is an exploded perspective view of a first lens drive device according to a third exemplary embodiment of the present invention.
Figure 32:
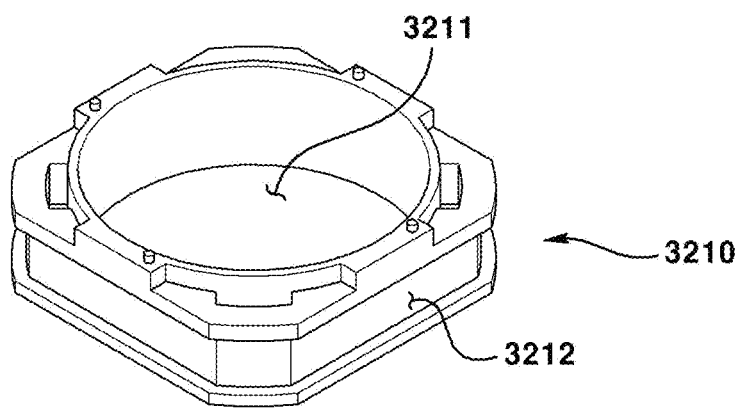
FIG. 32 is an exploded perspective view of a mover of a first lens drive device according to a third exemplary embodiment of the present invention.
Figure 32:
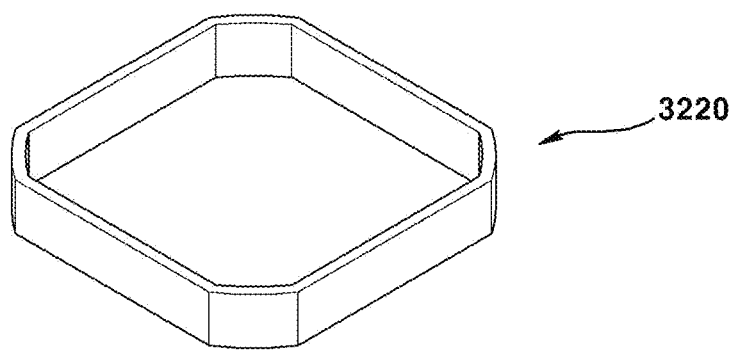
Figure 33:
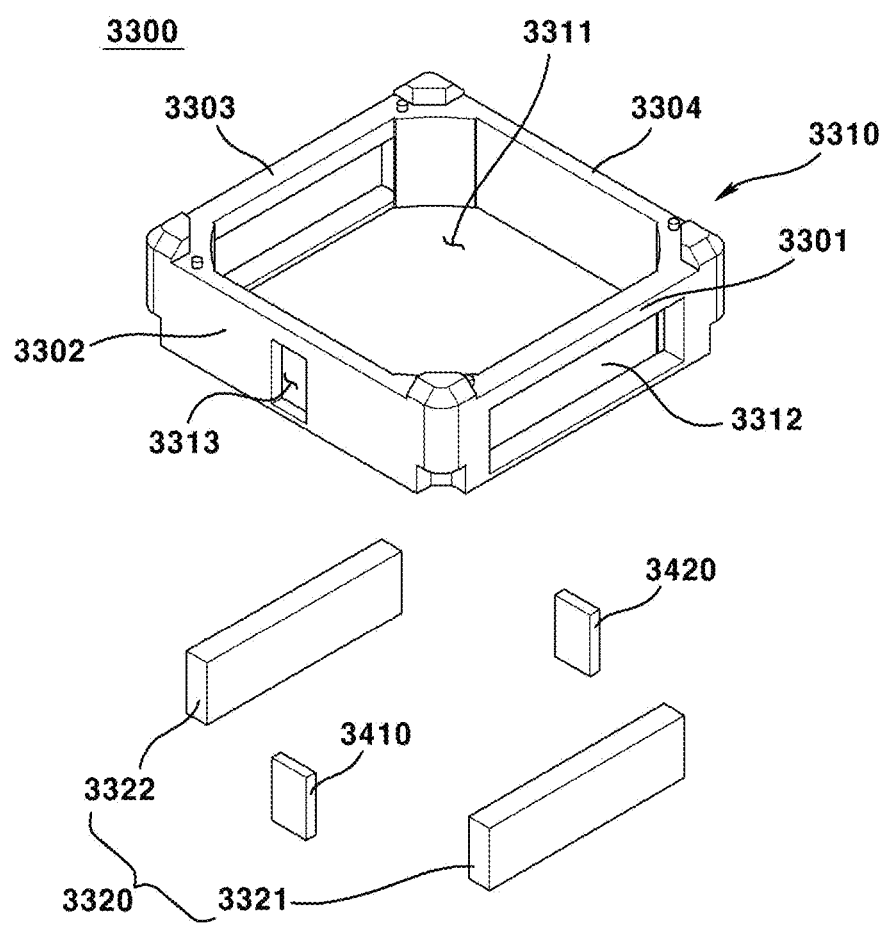
FIG. 33 is an exploded perspective view of a stator of a first lens drive device according to a third exemplary embodiment of the present invention.
Figure 34:
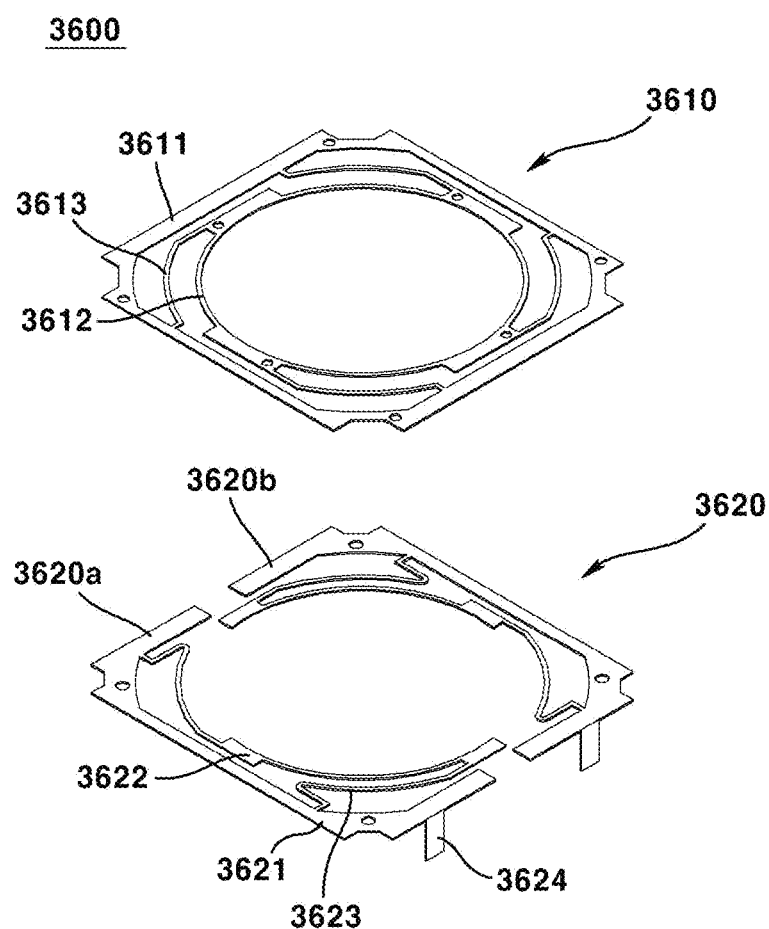
FIG. 34 is an exploded perspective view of an elastic member of a first lens drive device according to a third exemplary embodiment of the present invention.
Figure 35:
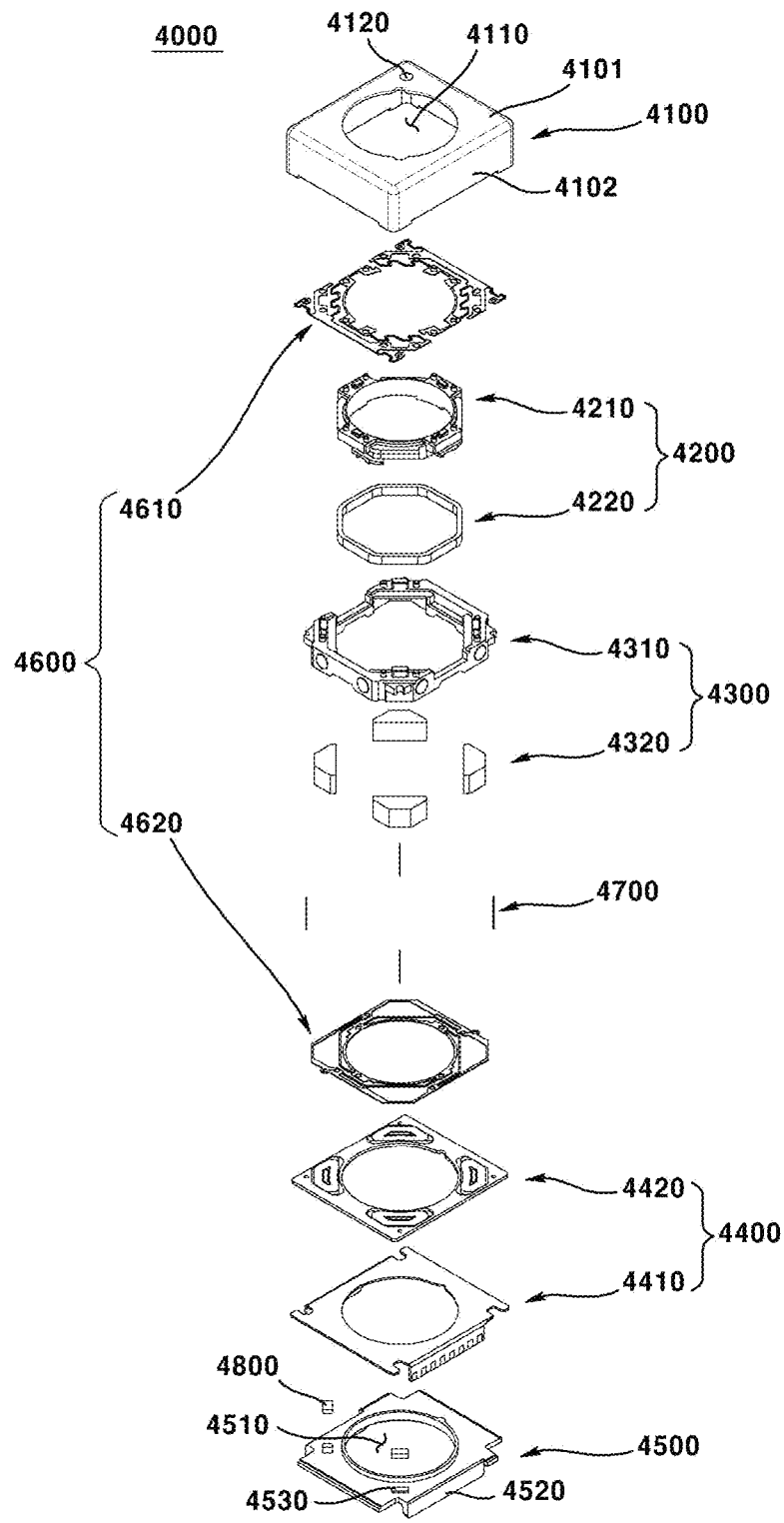
FIG. 35 is an exploded perspective view of a second lens drive device according to a third exemplary embodiment of the present invention.
Figure 36:
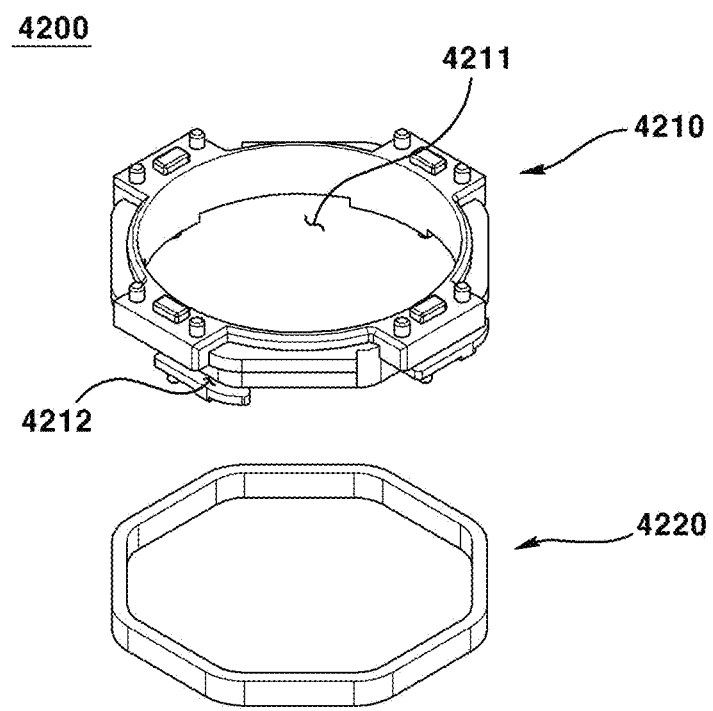
FIG. 36 is an exploded perspective view of an AF mover of a second lens drive device according to a third exemplary embodiment of the present invention.
Figure 37:
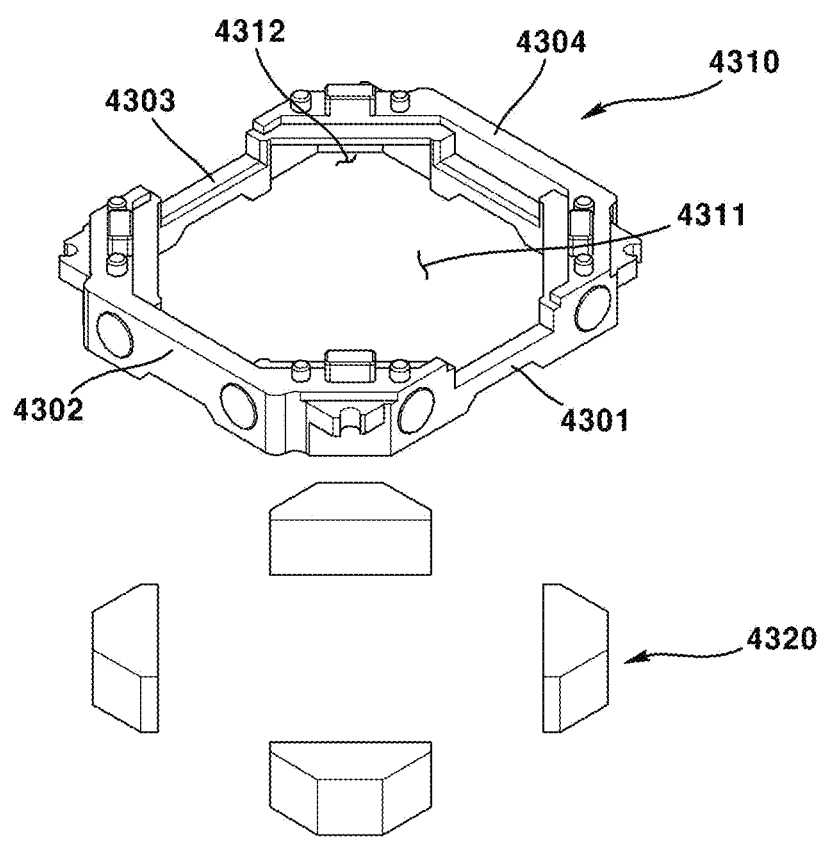
FIG. 37 is an exploded perspective view of an OIS mover of a second lens drive device according to a third exemplary embodiment of the present invention.
Figure 38:
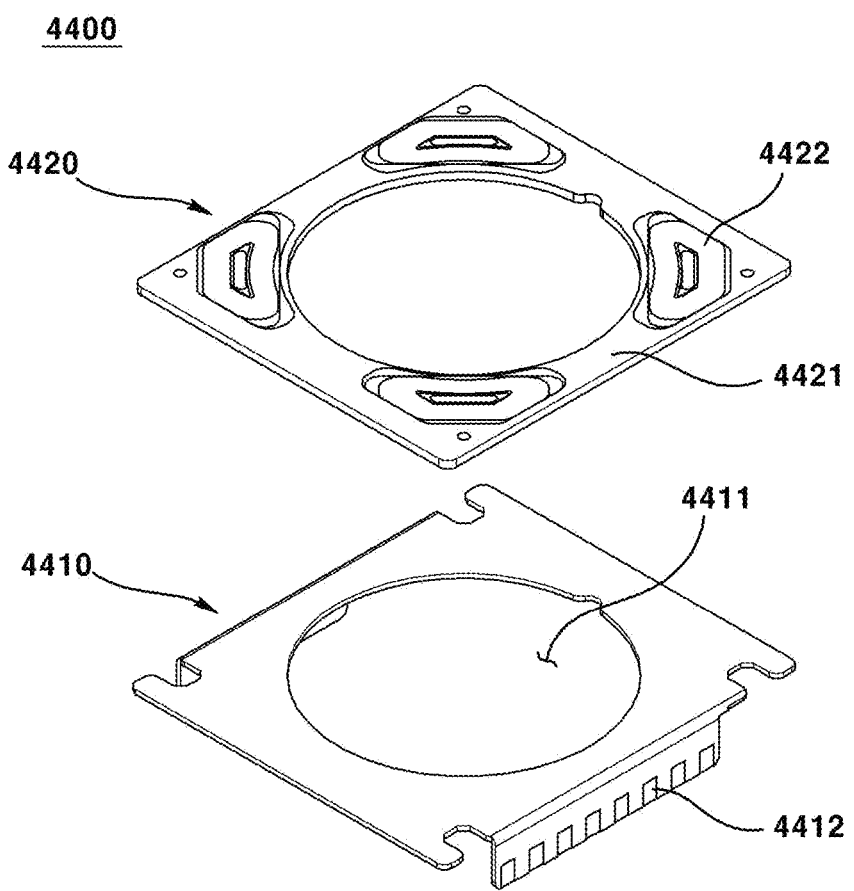
FIG. 38 is an exploded perspective view of a stator of a second lens drive device according to a third exemplary embodiment of the present invention.
Figure 39:
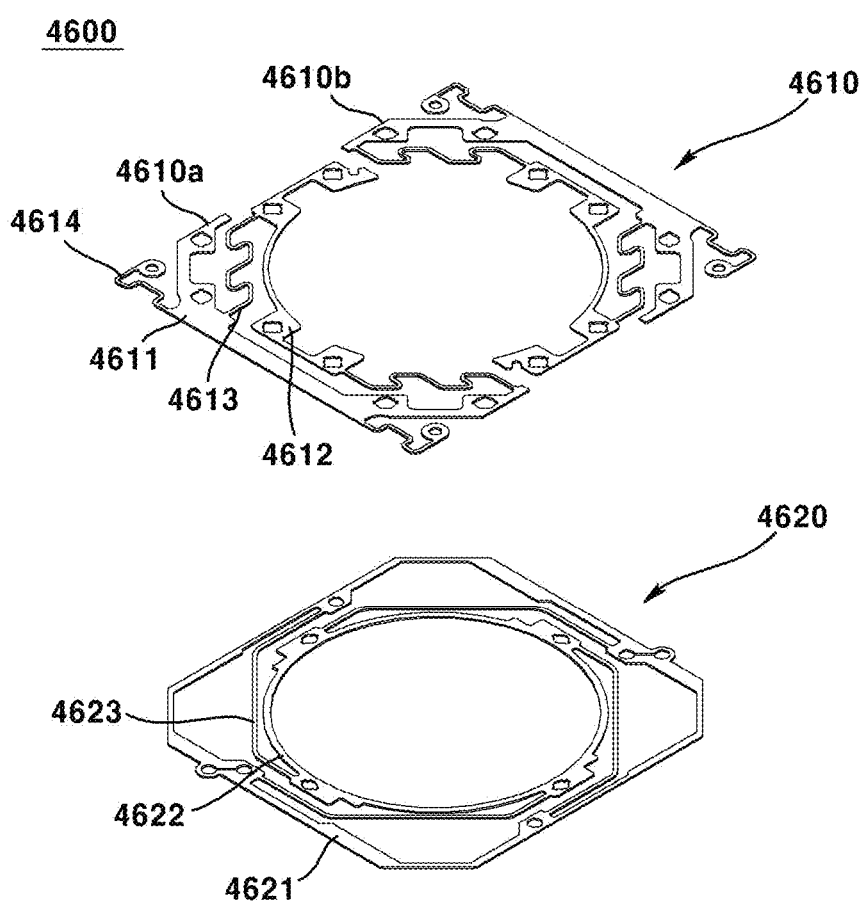
FIG. 39 is an exploded perspective view of an AF support member of a second lens drive device according to a third exemplary embodiment of the present invention.
Figure 40:
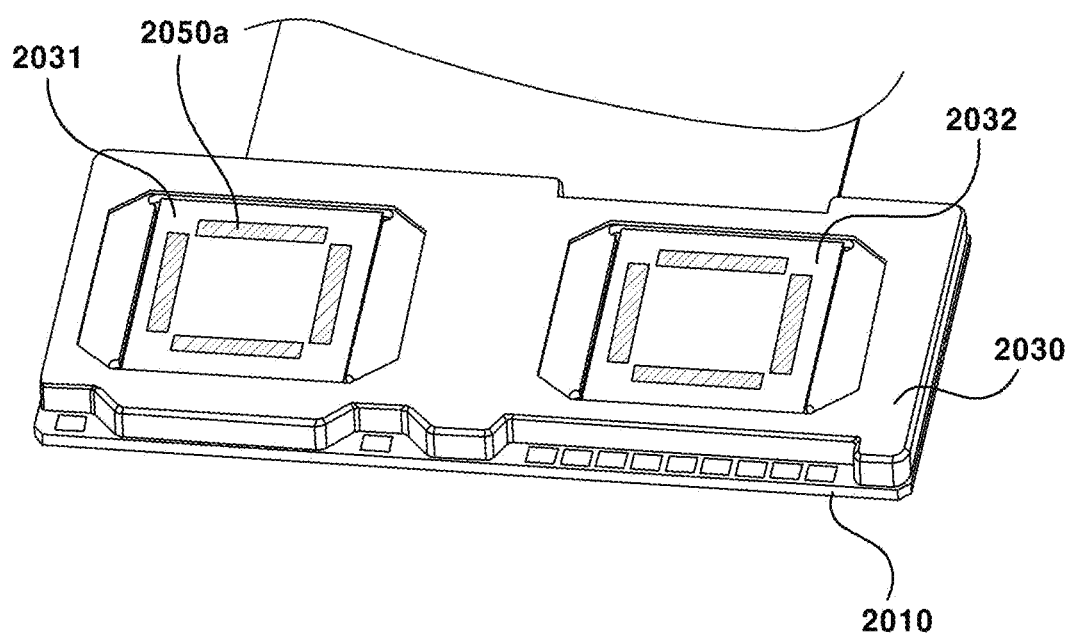
FIG. 40 is a perspective view illustrating a state where first and second lens drive devices are omitted from a dual camera module according to another exemplary embodiment of the present invention.

FIG. 26 is a perspective view of a dual camera module according to a third exemplary embodiment of the present invention, FIG. 27 is a perspective view illustrating a state where first and second lens drive devices are omitted from a dual camera module according to a third exemplary embodiment of the present invention, FIG. 28 is a cross-sectional view of a lens module according to a third exemplary embodiment of the present invention, FIG. 29 is a bottom view illustrating a lens module according to a third exemplary embodiment of the present invention, FIG. 30 is a conceptual view of a lens module according to a third exemplary embodiment of the present invention, FIG. 31 is an exploded perspective view of a first lens drive device according to a third exemplary embodiment of the present invention, FIG. 32 is an exploded perspective view of a mover of a first lens drive device according to a third exemplary embodiment of the present invention, FIG. 33 is an exploded perspective view of a stator of a first lens drive device according to a third exemplary embodiment of the present invention, FIG. 34 is an exploded perspective view of an elastic member of a first lens drive device according to a third exemplary embodiment of the present invention, FIG. 35 is an exploded perspective view of a second lens drive device according to a third exemplary embodiment of the present invention, FIG. 36 is an exploded perspective view of an AF mover of a second lens drive device according to a third exemplary embodiment of the present invention, FIG. 37 is an exploded perspective view of an OIS mover of a second lens drive device according to a third exemplary embodiment of the present invention, FIG. 38 is an exploded perspective view of a stator of a second lens drive device according to a third exemplary embodiment of the present invention, FIG. 39 is an exploded perspective view of an AF support member of a second lens drive device according to a third exemplary embodiment of the present invention and FIG. 40 is a perspective view illustrating a state where first and second lens drive devices are omitted from a dual camera module according to another exemplary embodiment of the present invention.

The dual camera module according to the third exemplary embodiment of the present invention may comprise a PCB (4010), an image sensor (4020), a sensor base (4030), a filter (4031, 4032), a lens module (4040), a light shielding member (4050) and a controller. However, any one or more of the PCB (4010), the image sensor (4020), the sensor base (4030), the filter (4031, 4032), the lens module (4040), the light shielding member (4050) and the controller may be omitted or changed from the dual camera module.

The PCB (4010) may be integrally formed. The PCB (4010) may be disposed at an upper surface with a sensor base (4030). The PCB (4010) may be disposed at a lower surface of the lens driving device (3000, 4000). The PCB (4010) may be coupled with the lens driving device (3000, 4000). The PCB (4010) may be disposed with an image sensor (2020). The PCB (4010) may be electrically connected with the image sensor (2020). The sensor base (2030) may be interposed between the PCB (4010) and the lens driving device (3000, 4000).

At this time, an inside of the sensor base (2030) may be disposed with the image sensor (2020). Through this structure, a light having passed the lens module (2040) coupled to the lens drive device (3000, 4000) may be irradiated on the image sensor (2020) mounted on the PCB (2010). The PCB (2010) may supply a power (current) to the lens drive device (3000, 4000). Meantime, the PCB (2010) may be disposed with a controller to control the lens drive device (3000, 4000).

The image sensor (2020) may be mounted on the PCB (1040). The image sensor (2020) may be electrically connected to the PCB (2010). For example, the image sensor (2020) may be coupled to the PCB (2010) by way of SMT (Surface Mounting Technology). In another example, the image sensor (2020) may be coupled to the PCB (2010) by way of flip flop technology. The image sensor (2020) may be so disposed as to match the lens module (2040) in terms of optical axis. That is, an optical axis of image sensor (2020) may be aligned with an optical axis of the lens module (2040). Through this structure, the image sensor (2020) may obtain a light having passed the lens module (2040). The image sensor (2020) may convert a light irradiated on an effective image region of the image sensor (2020) to an electric signal. The image sensor (2020) may be any one or more of a CCD (charge coupled device), a MOS (metal oxide semi-conductor), a CPD and a CID. However, the types of image sensor (2020) are not limited thereto, any configuration capable of converting an incident light to an electric signal may be used for the image sensor (2020).

An upper surface of image sensor (2020) may include an effective image region where an incident light is processed in an image. An upper surface of image sensor (2020) may include an ineffective image region formed at an outside of the effective image region.

The image sensor (2020) may include a first image sensor and a second image sensor. The first image sensor may be so disposed as to correspond to the first lens module coupled to the first lens drive device (3000). The second image sensor may be so disposed as to correspond to the second lens module coupled to the second lens drive device (4000).

The sensor base (2030) may be disposed on an upper surface of PCB (2010). The sensor base (2030) may be disposed on a lower side of the lens drive device (3000, 4000). An upper surface of sensor base (2030) may be disposed with the first lens drive device (3000) and the second lens drive device (4000). The sensor base (2030) may be integrally formed. The sensor base (2030) may be interposed between the PCB (2010) and the lens drive device (3000, 4000). An inside of the sensor base (2030) may accommodate the image sensor (2050).

The sensor base (2030) may include a first through hole and a second through hole. The first through hole of the sensor base (2030) may be disposed with a first filter (2031). The second through hole of the sensor base (2030) may be disposed with a second filter (2032). The first lens drive device (3000) may be disposed on an upper surface of sensor base (2030) to correspond to the first through hole. The second lens drive device (4000) may be disposed on an upper surface of sensor base (2030) to correspond to the second through hole.

The filter (2031, 2032) may be an IR filter. The filter (2031, 2032) may shield a light of an IR region from being incident on the image sensor. The filter (2031, 2032) may be interposed between the lens module (2040) and the image sensor (2020). The filter (2031, 2032) may be disposed on the sensor base (2030). The filter (2031, 2032) may be formed with a film material or a glass material. The filter (2031, 2032) may be formed by allowing an infrared cut-off coating material to be coated on a plate-shaped optical filter such as an imaging plane protection cover glass or a cover glass. For example the filter (2031, 2032) may be an IR absorption filter (Blue filter) that absorbs infrared rays. In another example, the filter (2031, 2032) may be an IR reflection filter (IR cut-off filter) that reflects the infrared rays.

The filter (2031, 2032) may include a first filter (2031) and a second filter (2032). The first filter (2031) may be disposed on a first through hole of sensor base (2030). The second filter (2032) may be disposed on a second through hole of sensor base (2030). The first filter (2031) may be interposed between the first image sensor and the first lens module. The second filter (2032) may be interposed between the second image sensor and the second lens module.

The abovementioned black mask is to inhibit miscellaneous lights from being incident on an image sensor by flare phenomenon, and may be formed about an infrared filter. However, when a black mask is formed on an infrared filter, there may be a fear of positions of masks being alternately disposed due to accumulation of assembly tolerance in the process of applying two infrared filters when a dual lens is formed. Thus, in the present exemplary embodiment, when a dual lens is formed, a black mark may be formed on a lens module that passes through a separate alignment process.

The lens module (2040) may include at least one lens. The lens module (2040) may include a lens and a lens barrel (2042). The lens module (2040) may include one or more lenses and a lens barrel (2042) accommodating the lens. The lens module (2040) may be coupled to an inside of the lens drive device (3000, 4000). The lens module (2040) may be coupled to the bobbin (3210, 4210) of the lens drive device (3000, 4000). The lens module (2040) may integrally move with the bobbin (3210, 4210). The lens module (2040) may be coupled to the bobbin (3210, 4210) by an adhesive (not shown). For example, the lens module (2040) may be screw-connected with the bobbin (3210, 4210). Meantime, a light having passed the lens module (2040) may be irradiated on the image sensor (2020). The lens may be coupled to the lens drive device (3000, 4000). The lens may be formed with a plurality of lenses.

The lens module (2040) may include a first lens module and a second lens module. The first lens module may be coupled with the first lens drive device (3000). The second lens module may be coupled with the second lens drive device (4000).

A lens disposed at a lower surface with a light shielding member (2050) may be coupled to any one or more of the first lens drive device (3000) and the second lens drive device (4000).

A lower surface of lowermost lens (2041) may include an effective surface where a passed light is incident on an effective region of the image sensor (2020). A lower surface of lowermost lens (2041) may include an ineffective surface where a passed light is incident on an ineffective region of the image sensor (2020) or outside of the image sensor (2020).

A barrel (2042) may accommodate a plurality of lenses and may be coupled with the lens drive device (3000, 4000). An inside of the barrel (2042) may be accommodated with a plurality of lenses. An inner periphery surface of barrel (2042) may be formed with a shape corresponding to that of an outer periphery surface of the plurality of lenses.

The barrel (2042) may include, at an inner periphery surface, a body part coupled by a plurality of lenses and a support part (2043) coupled to an inner periphery surface of the body part to support a lower side of the lowermost lens (2041) in the plurality of lenses from the lower side. The barrel (2042) may include a support part (2043). The support part (2043) may be interpreted as one element of barrel (2042). The support part (2043) may be coupled to an inner periphery surface of barrel (2042). The support part (2043) may be coupled to an inner periphery surface of the body part at the barrel (2042). The support part (2043) may support the lowermost lens (2041) in the plurality of lenses from the lower side. The support part (2043) may take a ring shape. The support part (2043) may support the lower surface of the lowermost lens (2041). The support part (2043) may support an edge of the lowermost lens (2041). The support part (2043) may inhibit the phenomenon of the plurality of lenses being disengaged from an inside of the barrel (2042).

The light shielding member (2050) may be disposed at a lower surface of lens. The light shielding member (2050) may be disposed at a lower surface of the lowermost lens (2041). The light shielding member (2050) may be disposed on an ineffective surface of the lowermost lens (2041). The light shielding member (2050) may be disposed at an ambient area of the lower surface of the lowermost lens (2041). At this time, the ambient area may be interpreted as a concept opposite to a center area. When viewed from under, the light shielding member (2050) may be connected to the support part (2043). The light shielding member (2050) may contact the support part (2043). The light shielding member (2050) may be overlapped with the support part (2043) to a direction perpendicular to an optical axis. The light shielding member (2050) may shield other light (b of FIG. 30) than a light (a of FIG. 30) acceptable by the image sensor (2020). Through this structure, the light shielding member (2050) may minimize the flare phenomenon generated from the image sensor (2020).

The light shielding member (2050) may be formed with a ring shape symmetrical about an optical axis. The light shielding member (2050) may be formed with a shape symmetrical about an optical axis. The light shielding member (2050) may be formed with a ring shape. The light shielding member (2050) may be disposed at a side upper than an apex of the optical axis of the lowermost lens (2041).

The light shielding member (2050) may be formed with a film to be attached to a lower surface of lens. The light shielding member (2050) may be formed with a film type. At this time, the film may be formed with an SOMA material. The light shielding member (2050) may be attached to a lower surface of lens. The light shielding member (2050) may be contacted to a lower surface of lens. At this time, an adhesive (not shown) attaching the light shielding member (2050) to the lens may be interposed between the light shielding member (2050) and the lens.

The light shielding member (2050) may be formed by allowing a non-penetrative material to be coated on a lower surface of lens. The light shielding member (2050) may be formed with a non-penetrative material. The light shielding member (2050) may be a black mask. The light shielding member (2050) may be black in color.

The light shielding member (2050) may include a first light shielding member and a second light shielding member. The first light shielding member may be disposed on the first lens module. The second light shielding member may be disposed on the second lens module.

The dual lens camera module may include a first lens drive device (3000) and a second lens drive device. The lens drive device (3000, 4000) may be disposed on an upper surface of sensor base (2030). The first lens drive device (3000) may be an AF module. At this time, the second lens drive device (4000) may be an OIS module. Here, the OIS module may also perform the AF function. However, the first lens drive device (3000) may be an OIS module. The second lens drive device (4000) may be an AF module. That is, any one of the first lens drive device (3000) and the second lens drive device (4000) may be an AF module and the other may be an OIS module. Alternatively, the first lens drive device (3000) and the second lens drive device (4000) may be all AF modules. Alternatively, the first lens drive device (3000) and the second lens drive device (4000) may be all OIS modules.

Hereinafter, the configuration of a first lens drive device according to a third exemplary embodiment of the present invention will be described with reference to the accompanying drawings.

FIG. 31 is an exploded perspective view of a first lens drive device according to a third exemplary embodiment of the present invention, FIG. 32 is an exploded perspective view of a mover of a first lens drive device according to a third exemplary embodiment of the present invention, FIG. 33 is an exploded perspective view of a stator of a first lens drive device according to a third exemplary embodiment of the present invention, and FIG. 34 is an exploded perspective view of an elastic member of a first lens drive device according to a third exemplary embodiment of the present invention.

The first lens drive device (3000) may comprise a first cover member (3100), a mover (3200), a stator (3300), a third magnet unit (4310), a fourth magnet unit (3420), a first base (3500) and an elastic member (3600). However, any one or more of the first cover member (3100), the mover (3200), the stator (3300), the third magnet unit (4310), the fourth magnet unit (3420), the first base (3500) and the elastic member (3600) may be omitted or changed from the first lens drive device (3000). Particularly, the fourth magnet unit (3420) may be omitted from a first modification.

The first cover member (3100) may be integrally formed with a first housing (3310). Alternatively, the first cover member (3100) may be omitted and the first housing (3310) may function as the first cover member (3100). That is, the first cover member (3100) may be a first housing (3310).

The first cover member (3100) may form an external shape of the first lens drive device (3000). The first cover member (3100) may take a bottom-opened cubic shape. However, the present invention is not limited thereto. The first cover member (3100) may be of a non-magnetic substance. If the first cover member (3100) is formed with a magnetic substance, the magnetic force of the first cover member (3100) may affect a second magnet unit (4320) of the second lens drive device (4000). The first cover member (3100) may be formed with a metal material. To be more specific, the first cover member (3100) may be formed with a metal plate. In this case, the first cover member (3100) may shield an EMI (Electro Magnetic Interference). Because of the said characteristic of the first cover member (3100), the first cover member (3100) may be called an "EMI shield can". The first cover member (3100) can shield radio waves generated from outside of the first lens drive device from being introduced into the first cover member (3100). Furthermore, the first cover member (3100) may shield radio waves generated from inside of the first cover member (3100) from being discharged to outside of the first cover member (3100). However, the material of the first cover member is not limited thereto.

The first cover member (3100) may include an upper plate (3101) and a side plate (3102). The first cover member (3100) may include an upper plate (3101) and a side plate (3102) downwardly extended from an outside of the upper plate (3101). A lower end of the side plate (3102) of the first cover member (3100) may be mounted on a first base (3500). A lower end of the side plate (3102) of the first cover member (3100) may be coupled to a staircase part (3540) of the first base (3500). The first cover member (3100) may be tightly-attached to a portion or all the lateral surface of the first base (3500) to be mounted on the first base (3500). An inner space formed by the first cover member (3100) and the first base (3500) may be disposed with a mover (3200), the stator (3300) and the elastic member (3600). Through the said structure, the first cover member (3100) can protect inner elements from an outside shock and simultaneously inhibit an outside foreign object from being inwardly introduced. However, the said structure is not limited thereto, and a lower end of the side plate (3102) of the first cover member (3100) may directly contact a first substrate (2100) disposed at a lower side of the first base (3500). A portion of the plurality of side plates (3102) may face the second cover member (4100).

The first cover member (3100) may include an opening (3110) and an extension part (3120). However, the extension part (3120) may be omitted or changed from the first cover member (3100).

The opening (3110) may be formed on the upper plate (3101). The opening (3110) may expose the first lens module. The opening (3110) may be formed with a shape corresponding to that of the first lens module. The size of the opening (3110) may be formed to be greater than a diameter of the first lens module to allow the first lens module to be assembled through the opening (3110). Meantime, a light having been introduced into and through the opening (3110)

may pass through the first lens module. At this time, the light having passed the first lens module may be obtained as an image by a first image sensor.

The extension part (3120) may be extended by being inwardly bent from an inner periphery surface of the upper plate (3101). The extension part (3120) may be called an "inner yoke". At least a portion of the extension part (3120) may be inserted into a groove formed on a first bobbin (3210). Through the said structure, the first bobbin (3210) may be inhibited from being rotated in a process of screw-connecting the first lens module to the first bobbin (3210). In addition thereto, the extension part (3120) may inhibit the first bobbin (3210) from being rotated relative to the first cover member (3100).

The mover (3200) may be coupled with the first lens module. The mover (3200) may be accommodated into an inside of the first lens module. An inner periphery surface of the mover (3200) may be coupled to an outer periphery surface of the first lens module. The mover (3200) may be integrally moved with the first lens module through interaction with the stator (3300).

The mover (3200) may include a first bobbin (3210) and a first coil (3220). However, any one or more of the first bobbin (3210) and the first coil (3220) may be omitted or changed from the mover (3200).

The first bobbin (3210) may be disposed at an inside of a first housing (3310). The first bobbin (3210) may be accommodated into a through hole (3311) of the first housing (3310). The first bobbin (3210) may be coupled with the first lens module. To be more specific, an inner periphery surface of the first bobbin (3210) may be coupled by an outer periphery surface of the first lens module. The first bobbin (3210) may be coupled by the first coil (3220). A lower surface of the first bobbin (3210) may be coupled with a first lower elastic member (3620). An upper surface of the first bobbin (3210) may be coupled with a first upper elastic member (3610). The first bobbin (3210) may be moved to an optical axis relative to the first housing (3310).

The first bobbin (3210) may include a through hole (3211) and a coil reception part (3212). However, any one or more of the through hole and the coil reception part (3212) may be omitted or changed from the first bobbin (3210).

The through hole (3211) may be disposed at an inside of the first bobbin (3210). The through hole (3211) may be so formed as to be opened at an upper side and a bottom side. The through hole (3211) may be coupled by the first lens module. An inner periphery surface of the through hole (3211) may be formed with a screw thread corresponding to that formed on an outer periphery surface of the first lens module. That is, the through hole (3211) may be screw-connected with the first lens module. An adhesive may be interposed between the first lens module and the first bobbin (3210). At this time, the adhesive may be an epoxy hardened by any one or more of UV, heat and laser. That is, the first lens module and the bobbin (3210) may be adhered by the UV-curing epoxy and/or heat-curing epoxy.

The coil reception part (3212) may accommodate at least a portion of the first coil (3220). The coil reception part (3212) may be integrally formed with an outside of the first bobbin (3210). Furthermore, the coil reception part (3212) may be continuously formed along the outside of the first bobbin (3210) or formed by being spaced apart from the first bobbin (3210) at a predetermined distance. For example, the coil reception part (3212) may be formed by allowing a portion of the outside of the first bobbin (3210) to be recessed in a corresponding shape with that of the first coil (3220). At this time, the first coil (3220) may be directly wound on a first driving part coupling part (3212). In a modification, the coil reception part (3212) may be formed with an upper or lower side-opened shape. At this time, the first coil (3220) may be inserted into and coupled to the coil reception part (3212) through a pre-wound opened portion.

The first coil (3220) may be disposed on the first bobbin (3210). The first coil (3220) may be disposed on an outer periphery surface of first bobbin (3210). The first coil (3220) may be directly wound on an outer periphery surface of the first bobbin (3210). The first coil (3220) may electromagnetically interact with the first magnet unit (3320). The first coil (3220) may face the first magnet unit (3320). In this case, when a current is supplied to the first coil to form a magnetic field about the first coil (3220), the first coil (3220) may move relative to the first magnet unit (3320) in response to the electromagnetic interaction between the first coil (3220) and the first magnet unit (3320). The first coil (3220) may move for the AF driving. In this case, the first coil (3220) may be called an "AF coil".

The first coil (3220) may include a pair of lead cables (not shown) for power supply. The pair of lead cables of the first coil (3220) may be electrically connected to a first lower elastic member (3620). Each of the pair of lead cables may be electrically connected to first and second support units (3620a, 3620b). In this case, the first coil (3220) may receive a power through the first lower elastic member (3620) electrically connected to the first and second support units (3620a, 2620b).

The stator (3300) may be accommodated into an inside of the mover (3200). The stator (3300) is a fixed member and may move the mover (3200) through the electromagnetic interaction. The stator (3300) may include a first housing (3310) and a first magnet unit (3320). However, any one or more of the first housing (3310) and the first magnet unit (3320) may be omitted or changed from the stator (3300).

The first housing (3310) may be disposed at an outside of the bobbin (3210). The first housing (3310) may be spaced apart from the first bobbin (3210). At least a portion of the first housing (3310) may be formed to correspond in shape to an inside of the first cover member (3100). Particularly, an outside of the first housing (3310) may be so formed as to correspond in shape to an inside of the side plate (3102) of the first cover member (3100). The housing (3310) may take a cubic shape, including four side surfaces, for example. However, the first housing (3310) may take any shape capable of being accommodated into the first cover member (3100). The first housing (3310) may be formed with an insulation material. The first housing (3310) may be formed with an injection object in consideration of productivity. The first housing (3310) may be fixed onto the first base (3500). In a modification, the first housing (3310) may be omitted and the first magnet unit (3320) may be fixed to the first cover member (3100). An upper surface of the first housing (3310) may be coupled by the first upper elastic member (3610). A lower surface of first housing (3310) may be coupled by the first lower elastic member (3620).

The first housing (3310) may include first to fourth side surfaces (3301, 3302, 3303, 3304). The first housing (3310) may include continuously-disposed first to fourth side surfaces (3301, 3302, 3303, 3304). The first housing (3310) may include a first side surface (3301) disposed by a first magnet (3321), a second side surface (3302) disposed by a third magnet unit (3410), a third side surface (3303) disposed by a second magnet (3322). The first housing (3310) may include a fourth side surface (3304) disposed by a fourth magnet unit (3420). The second side surface (3302) may face an eighth side surface (4304).

The first housing (3310) may include a through hole (3311), a magnet reception part (3312) and a third magnet unit reception part (3313). The first housing (3310) may further include a fourth magnet unit reception part (not shown). However, any one or more of the through hole (3311), the magnet reception part (3312), the third magnet unit reception part (3313), and the fourth magnet unit reception part may be omitted or changed from the first housing (3310).

The through hole (3311) may be disposed at an inside of the first housing (3310). The through hole (3311) may be formed with an upper/lower surface-opened shape. The through hole (3311) may be accommodated by the first bobbin (3210). The through hole (3311) may be movably disposed with the first bobbin (3210). The through hole (3311) may be formed with a shape corresponding to that of the first bobbin (3210).

The magnet reception part (3312) may be formed at a lateral surface of the first housing (3310). The magnet reception part (3312) may be formed with a hole passing through the first housing (3310). Alternatively, the magnet reception part (3312) may be formed with a groove by allowing a portion of the first housing (3310) to be recessed. The magnet reception part (3312) may accommodate at least a portion of the first magnet unit (3320). An adhesive (not shown) may be interposed between the magnet reception part (3312) and the first magnet unit (3320). That is, the magnet reception part (3312) and the first magnet unit (3320) may be coupled by an adhesive. The magnet reception part (3312) may be disposed at an inside of the first housing (3310). The magnet reception part (3312) may be formed by allowing a portion of an inside of the first housing (3310) to be outwardly recessed. In this case, the electromagnetic interaction with the first coil (3220) disposed at an inside of the first magnet unit (3320) may be advantageously implemented.

The third magnet unit reception part (3313) may be formed on a second side surface (3302) of the first housing (3310). The third magnet unit reception part (3313) may be formed at an outside of the first housing (3310). The third magnet reception part (3313) may be formed on an outside of the first housing (3310) by being inwardly recessed. Alternatively, the third magnet reception part (3313) may be formed with a hole passing through the first housing (3310). The third magnet unit reception part (3313) may accommodate the third magnet unit (3410). The third magnet unit reception part (3313) may accommodate at least a portion of the third magnet unit (3410). The third magnet unit reception part (3313) may be formed with a shape corresponding to that of the third magnet unit (3410).

The fourth magnet unit reception part may be formed at a fourth lateral surface (3304) of first housing (3310). The fourth magnet unit reception part may be formed at an outside of first housing (3310). The fourth magnet unit reception part may be formed on an outside of the first housing (3310) by being recessed. Alternatively, the fourth magnet unit reception part may be formed with a hole passing through the first housing (3310). The fourth magnet unit reception part may accommodate the fourth magnet unit (3420). The fourth magnet unit reception part may accommodate at least a portion of the fourth magnet unit (3420). The fourth magnet unit reception part may be formed with a shape corresponding to that of the fourth magnet unit (3420). The fourth magnet unit reception part may be symmetrical with the third magnet unit reception part (3313) about an optical axis of the first camera module.

The first magnet unit (3320) may be disposed on the first housing (3310). The first magnet unit (3320) may be accommodated into the magnet reception part (3312) of the first housing (3310). The first magnet unit (3320) may electromagnetically interact with the first coil (3220). The first magnet unit (3320) may face the first coil (3220). The first magnet unit (3320) may move the first bobbin (3210) fixed by the first coil (3220). The first magnet unit (3320) may move the first coil (3220) for the AF driving. In this case, the first magnet unit (3320) may be called an "AF driving magnet".

The first magnet unit (3320) may include first and second magnets (3321, 3322). The first magnet unit (3320) may mutually-spaced-apart first and second magnets (3321, 3322). The first magnet unit (3320) may include mutually-oppositely-disposed first and second magnets (3321, 3322). The first magnet unit (3320) may include the first and second magnets (3321, 3322) each mutually oppositely disposed on a lateral surface of the first housing (3310). The first magnet unit (3320) may include a first magnet (3321) disposed on the first side surface (3301), and a second magnet (3322) disposed on the third side surface (3303).

The first and second magnets (3321, 3322) may be symmetrical about an optical axis of the first camera module. The first and second magnets (3321, 3322) may possess the symmetrical size and shape about an optical axis of the first camera module. The first and second magnets (3321, 3322) may be disposed at a corresponding position about an optical axis of the first camera module. The first and second magnets (3321, 3322) may be mutually disposed in parallel. Each of the first and second magnets (3321, 3322) may possess the same polarity, each facing an inside. An N pole of the first and second magnets (3321, 3322) may be so disposed as to face an inside. The first and second magnets (3321, 3322) may take a flat plate shape. In this case, the first and second magnets (3321, 3322) may be called "flat plate magnets".

The third magnet unit (3410) may be disposed on a lateral surface of the first housing (3310) facing the second housing (4310). The third magnet unit (3410) may be disposed on a second side surface (3302) of the first housing (3310). The third magnet unit (3410) may be interposed between the first magnet (3321) and the second magnet (3322). The third magnet unit (3410) may be smaller than the first magnet (3321). The third magnet unit (3410) may have a width smaller than that of the first magnet (3321). The third magnet unit (3410) may have a thickness smaller than that of the first magnet (3321). The third magnet unit (3410) may have a height lower than that of the first magnet (3321). Alternatively, the third magnet unit (3410) may have a height same as that of the first magnet (3321). The third magnet unit (3410) may be smaller than the second magnet (3322). The third magnet unit (3410) may be disposed on a virtual line connecting an optical axis of first camera module and an optical axis of second camera module. The third magnet unit (3410) may be so disposed as to allow same polarity as that of the first and second magnets (3321, 3322) to face an inside. The third magnet unit (3410) may be so disposed as to allow an N pole to face an inside. Alternatively, the third magnet unit (3410) may be so disposed as to allow an S pole to face an inside.

In the third exemplary embodiment of the present invention, a third magnet unit (3410) is disposed on an AF camera module formed with a flat plate magnet whereby a magnetic force affected on a corner magnet of the OIS camera module by a magnet of AF camera module can be minimized. If the third magnet unit (3410) is removed under a condition where a current is not corrected according to the third exemplary embodiment of the present invention, an optical axis of the second camera module may be moved more than 5 µm.

The fourth magnet unit (3420) may be disposed on the first housing (3310). The fourth magnet unit (3420) may be disposed on a fourth side surface (3304) of the first housing (3310). The fourth magnet unit (3420) may be symmetrical with the third magnet unit (3410) about an optical axis of the first camera module. The fourth magnet unit (3420) may be disposed at a position corresponding to that of the third magnet unit (3410) about an optical axis of the first camera module. The fourth magnet unit (3420) may have a size and shape corresponding to those of the third magnet unit (3410) about an optical axis of the first camera module. The fourth magnet unit (3420) may be interposed between the first magnet (3321) and the second magnet (3322). The fourth magnet unit (3420) may be smaller than the first magnet (3321). The fourth magnet unit (3420) may have a width narrower than that of the first magnet (3321). The fourth magnet unit (3420) may have a thickness thinner than that of the first magnet (3321). The fourth magnet unit (3420) may have a height lower than that of the first magnet (3321). Alternatively, the fourth magnet unit (3420) may have the same height as that of the first magnet (3321). The fourth magnet unit (3420) may be smaller than the second magnet (3322). The fourth magnet unit (3420) may be disposed on a virtual line connecting an optical axis of first camera module and an optical axis of second camera module. The fourth magnet unit (3420) may be so disposed as to allow same polarity as that of the first and second magnets (3321, 3322) to face an inside. The fourth magnet unit (3420) may be so disposed as to allow same polarity as that of the third magnet unit (3410) to face an inside. The fourth magnet unit (3420) may be so disposed as to allow an N pole to face an inside. Alternatively, the fourth magnet unit (3420) may be so disposed as to allow an S pole to face an inside.

In the third exemplary embodiment of the present invention, the fourth magnet unit (3420) corresponding to the third magnet unit (3410) is disposed to allow offsetting an influence by the third magnet unit (3410) on the AF driving of the first camera module. Alternatively, the fourth magnet unit (3420) may affect a symmetrical influence on an influence affected on the AF driving by the third magnet unit (3410).

The first base (3500) may be disposed at a lower side of the first housing (3310). The first base (3500) may be disposed on an upper surface of a first substrate (100). The first base (3500) may be coupled by a first IR filter.

The first base (3500) may include an opening (3510), a support part (3520), a terminal reception groove (3530) and a staircase part (3540). However, any one or more of the opening (3510), the support part (3520), the terminal reception groove (3530) and the staircase part (3540) may be omitted or changed from the first base (3500).

The opening (3510) may be formed at a center area of the first base (3500). The opening (3510) may be so formed as to vertically pass through the first base (3500). The opening (3510) may be overlapped with the first lens module to an optical axis direction. The opening (3510) may pass through a light having passed the first lens module.

The support part (3520) may be upwardly protruded from an upper surface of the first base (3500). The support part (3520) may be respectively formed on four (4) corners. The support part (3520) may be fitted the first housing (3310). Through the said shape, the support part (3520) may fix the first housing (3310) to an inside.

A terminal reception groove (3530) may be formed at a lateral surface of the first base (3500). The terminal reception groove (3530) may be formed by allowing a portion of an external lateral surface of the first base (3500) to be inwardly recessed. The terminal reception groove (3530) may accommodate at least a portion of the terminal part (3624) of the first lower elastic member (3620). The terminal reception groove (3530) may be formed with a width corresponding to that of the terminal part (3624).

The terminal part (3540) may be formed at an external lower end of the first base (3500). The terminal part (3540) may be externally protruded from an outside of the first base (3500). The terminal part (3540) may support a lower end of the side plate (3102) of the first cover member (3100).

The elastic member (3600) may be coupled to the first bobbin (3210) and the first housing (3310). The elastic member (3600) may elastically support the first bobbin (3210). The elastic member (3600) may movably support the first bobbin (3210) relative to the first housing (3310). The elastic member (3600) may possess the elasticity on at least a portion thereof.

The elastic member (3600) may include a first upper elastic member (3610) and a first lower elastic member (3620). However, any one or more of the first upper elastic member (3610) and the first lower elastic member (3620) may be omitted or changed from the elastic member (3600).

The first upper elastic member (3610) may be coupled to an upper surface of the first bobbin (3210) and to an upper surface of first housing (3310). The first upper elastic member (3610) may be integrally formed.

The first upper elastic member (3610) may include an outer part (3611), an inner part (3612) and a connection part (3613). However, any one or more of the outer part (3611), the inner part (3612) and the connection part (3613) may be omitted or changed from the first upper elastic member (3610).

The outer part (3611) may be coupled to the first housing (3310). The outer part (3611) may be coupled to an upper surface of the first housing (3310). The inner part (3612) may be coupled to the first bobbin (3210). The inner part (3612) may be coupled to an upper surface of first bobbin (3210). The connection part (3613) may connect the outer part (3611) and the inner part (3612). The connection part (3613) may elastically connect the outer part (3611) and the inner part (3612). The connection part (3613) may possess the elasticity.

The first lower elastic member (3620) may be coupled to a lower surface of first bobbin (3210) and to a lower surface of first housing (3310). The first upper elastic member (3610) may be electrically connected to the first coil (3220). The first lower elastic member (3620) may include first and second support units (3620a, 3620b). The first and second support units (3620a, 3620b) may be respectively coupled to a pair of lead cables of the first coil (3220).

The first lower elastic member (3620) may include an outer part (3621), an inner part (3622), a connection part (3623) and a terminal part (3624). However, any one or more of the outer part (3621), the inner part (3622), the connection part (3623) and the terminal part (3624) may be omitted or changed from the first lower elastic member (3620).

The outer part (3621) may be coupled to the first housing (3310). The outer part (3621) may be coupled to a lower surface of the first housing (3310). The inner part (3622) may be coupled to the first bobbin (3210). The inner part (3622) may be coupled to a lower surface of first bobbin (3210). The connection part (3623) may connect the outer part (3621) and the inner part (3622). The connection part (3623) may elastically connect the outer part (3621) and the inner part (3622). The connection part (3623) may possess the elasticity.

The terminal part (3624) may be extended from the outer part (3621). The terminal part (3624) may be formed by being bent from the outer part (3621). The terminal part (3624) may be formed by being downwardly bent from the outer part (3621). Alternatively, in a modification, the terminal part (3624) may be formed as a member separate from the outer part (3621). The separately-formed terminal part (3624) and the outer part (3621) may be coupled by an electrically conductible member. The terminal part (3624) may be coupled with a first substrate (100). The terminal part (3624) may be coupled to the first substrate (100) by soldering. The terminal part (3624) may be accommodated into a terminal reception groove (3530) of the first base (3500).

Hereinafter, the configuration of a second lens drive device according to the third exemplary embodiment of the present invention will be described in detail with reference to the accompanying drawings.

FIG. 35 is an exploded perspective view of a second lens drive device according to a third exemplary embodiment of the present invention, FIG. 36 is an exploded perspective view of an AF mover of a second lens drive device according to a third exemplary embodiment of the present invention, FIG. 37 is an exploded perspective view of an OIS mover of a second lens drive device according to a third exemplary embodiment of the present invention, FIG. 38 is an exploded perspective view of a stator of a second lens drive device according to a third exemplary embodiment of the present invention, and FIG. 39 is an exploded perspective view of an AF support member of a second lens drive device according to a third exemplary embodiment of the present invention.

The second lens drive device (4000) may comprise a second cover member (4100), an AF mover (4200), an OIS mover (4300), a stator (4400), a second base (4500), an AF support member (4600), an OIS support member (4700) and a Hall sensor (4800). However, any one or more of the second cover member (4100), the AF mover (4200), the OIS mover (4300), the stator (4400), the second base (4500), the AF support member (4600), the OIS support member (4700) and the Hall sensor (4800) may be omitted or changed from the second lens drive device (4000).

The second cover member (4100) may accommodate a second housing (4310). The second cover member (4100) may be spaced apart from the first cover member (3100). At this time, a discrete distance between the second cover member (4100) and the first cover member (3100) may be within 4 mm. Alternatively, a discrete distance between the second cover member (4100) and the first cover member (3100) may be within 3 mm. Alternatively, a discrete distance between the second cover member (4100) and the first cover member (3100) may be within 2 mm. Alternatively, a discrete distance between the second cover member (4100) and the first cover member (3100) may be within 1 mm.

The second cover member (4100) may form an external shape of the second lens drive device (4000). The second cover member (4100) may take a bottom-opened cubic shape. However, the present invention is not limited thereto. The second cover member (4100) may be made of a non-magnetic substance. If the second cover member (4100) is formed with a magnetic substance, the magnetic force of the second cover member (4100) may affect a second magnet unit (4320) of the second lens drive device (4000). The second cover member (4100) may be formed with a metal material. To be more specific, the second cover member (4100) may be formed with a metal plate. In this case, the second cover member (4100) may shield an EMI (Electro Magnetic Interference). Because of the said characteristic of the second cover member (4100), the second cover member (4100) may be called an "EMI shield can". The second cover member (4100) can shield radio waves generated from outside of the second lens drive device from being introduced into the second cover member (4100). Furthermore, the second cover member (4100) may shield radio waves generated from inside of the second cover member (4100) from being discharged to outside of the second cover member (4100). However, the material of the second cover member (4100) is not limited thereto.

The second cover member (4100) may include an upper plate (4101) and a side plate (4102). The second cover member (4100) may include an upper plate (4101) and a side plate (4102) downwardly extended from an outside of the upper plate (4101). A lower end of the side plate (4102) of the second cover member (4100) may be mounted on a second base (4500). An inner lateral surface of the second cover member (4100) may tightly contact a portion or all the lateral surface of the second base (4500) to be mounted on the second base (4500). An inner space formed by the second cover member (4100) and the second base (4500) may be disposed with an AF mover (4200), an OIS mover (4300), a stator (4300), an AF support member (4600) and an OIS support member (4700). Through the said structure, the second cover member (4100) can protect inner elements from an outside shock and simultaneously inhibit an outside foreign object from being inwardly introduced. However, the said structure is not limited thereto, and a lower end of the side plate (4102) of the second cover member (4100) may directly contact a second substrate (200) disposed at a lower side of the second base (4500). A portion of the plurality of side plates (4102) may face the first cover member (3100).

A length of the side plate (4102) of the second cover member (4100) to a lengthwise direction (See L2 in FIG. 36) may not exceed by 1.5 times a length of the side plate (3102) of the first cover member (3100) to a lengthwise direction (See L1 in FIG. 36) The second cover member (4100) may include an opening (4110) and a marking part (4120). However, the marking part (4120) may be omitted or changed from the second cover member (4100).

The opening (4110) may be formed on the upper plate (4101). The opening (4110) may expose the second lens module. The opening (4110) may be formed with a shape corresponding to that of the second lens module. The size of the opening (4110) may be formed to be greater than a diameter of the second lens module to allow the second lens module to be assembled through the opening (4110). Meantime, a light having been introduced into and through the opening (4110) may pass through the second lens module. At this time, the light having passed the second lens module may be obtained as an image by a second image sensor.

The marking part (4120) may be formed on the upper plate (4102) of the second cover member (4100). The marking part (4120) may be so formed as to allow a worker to see or learn the directivity of the second cover member (4100) at a glance. In case of an OIS lens driving device, the directivity is important during the soldering process on a PCB, the marking part (4120) may be formed to allow a worker to easily discern the directivity of the OIS lens drive device. The marking part (4120) may be formed on a corner portion of one side of the upper plate (4102).

The AF mover (4200) may be coupled with the second lens module. The AF mover (4200) may be accommodated into an inside of the second lens module. An inner periphery surface of the AF mover (4200) may be coupled by an outer periphery surface of the second lens module. The AF mover (4200) may be integrally moved with the second lens module through interaction with the OIS mover (4300) and/or the stator (4300).

The AF mover (4200) may include a second bobbin (4210) and a second coil (4220). However, any one or more of the second bobbin (4210) and the second coil (4220) may be omitted or changed from the AF mover (4200).

The second bobbin (4210) may be disposed at an inside of a second housing (4310). The second bobbin (4210) may be accommodated into a through hole (4311) of the second housing (4310). The second bobbin (4210) may be coupled with the second lens module. To be more specific, an inner periphery surface of the second bobbin (4210) may be coupled by an outer periphery surface of the second lens module. The second bobbin (4210) may be coupled by the second coil (4220). A lower surface of the second bobbin (4210) may be coupled with a second lower support member (4620). An upper surface of the second bobbin (4210) may be coupled with a second upper support member (4610). The second bobbin (4210) may be moved to an optical axis relative to the second housing (4310).

The second bobbin (4210) may include a through hole (4211) and a coil reception part (4212). However, any one or more of the through hole (4211) and the coil reception part (4212) may be omitted or changed from the second bobbin (4210).

The through hole (4211) may be disposed at an inside of the second bobbin (4210). The through hole (4211) may be so formed as to be opened at an upper side and a bottom side. The through hole (4211) may be coupled by the second lens module. An inner periphery surface of the through hole (4211) may be formed with a screw thread corresponding to that formed on an outer periphery surface of the second lens module. That is, the through hole (4211) may be screw-connected with the second lens module. An adhesive may be interposed between the second lens module and the second bobbin (4210). At this time, the adhesive may be an epoxy hardened by any one or more of UV, heat and laser. That is, the second lens module and the second bobbin (4210) may be adhered by the UV-curing epoxy and/or heat-curing epoxy.

The coil reception part (4212) may accommodate at least a portion of the second coil (4220). The coil reception part (4212) may be integrally formed with an outside of the second bobbin (4210). Furthermore, the coil reception part (4212) may be continuously formed along the outside of the second bobbin (4210) or formed by being spaced apart from the second bobbin (4210) at a predetermined distance. For example, the coil reception part (4212) may be formed by allowing a portion of the outside of the second bobbin (4210) to be recessed in a corresponding shape with that of the second coil (4220). At this time, the second coil (4220) may be directly wound on the coil reception part (4212). In a modification, the coil reception part (4212) may be formed with an upper or lower side-opened shape. At this time, the second coil (4220) may be inserted into and coupled to the coil reception part (4212) through a pre-wound opened portion.

The second coil (4220) may be disposed on the second bobbin (4210). The second coil (4220) may be disposed on an outer periphery surface of the second bobbin (4210). The second coil (4220) may be directly wound on an outer periphery surface of the second bobbin (4210). The second coil (4220) may electromagnetically interact with the second magnet unit (4320). The second coil (4220) may face the second magnet unit (4320). In this case, when a current is supplied to the second coil (4220) to form a magnetic field about the second coil (4220), the second coil (4220) may move relative to the second magnet unit (4320) in response to the electromagnetic interaction between the second coil (4220) and the second magnet unit (4320). The second coil (4220) may move for the AF driving. In this case, the second coil (4220) may be called an "AF coil".

The first coil (4220) may include a pair of lead cables (not shown) for power supply. The pair of lead cables of the second coil (4220) may be electrically connected to a second upper support member (4610). Each of the pair of lead cables on the second coil (4220) may be electrically connected to third and fourth support units (4610a, 4610b). In this case, the second coil (4220) may receive a power through a second upper support member (4610) electrically connected to the second substrate through a substrate (4410), a substrate part (4421) and an OIS support member (4700).

The OIS mover (4300) may move for OIS function. The OIS mover (4300) may be disposed at an outside of the AF mover (4200) to face the AF mover (4200). The OIS mover (4300) may move the AF mover (4200) or may move along with the AF mover (4200). The OIS mover (4300) may be movably supported by the lower side-disposed stator (4400) and/or the second base (4500). The OIS mover (4300) may be disposed at an inner space of the second cover member (4100).

The OIS mover (4300) may include a second housing (4310) and a second magnet unit (4320). However, any one or more of the second housing (4310) and the second magnet unit (4320) may be omitted or changed from the OIS mover (4300).

The second housing (4310) may be spaced apart from the first housing (3310) of the first camera module (3000). The second housing (4310) may be disposed at outside of the second bobbin (4210). The second housing (4310) may be spaced apart from the second bobbin (4210). At least a portion of the second housing (4310) may be formed with a shape corresponding to that of an inner surface of the second cover member (4100). In particular, an outside of the second housing (4310) may be formed with a shape corresponding to that of an inside of the side plate (4102) of second cover member (4100). The second housing (4310) may take a cubic shape including four (4) lateral surfaces, for example. However, the second housing (4310) may take any shape capable of being disposed at an inside of the second cover member (4100). The second housing (4310) may be formed with an insulation material. The second housing (4310) may be formed with an injection object in consideration of productivity. The second housing (4310) is a moving element for OIS driving, and may be spaced apart from the second cover member (4100) at a predetermined distance. An upper surface of second housing (4310) may be coupled by the second upper support member (4610). A lower surface of second housing (4310) may be coupled by the second lower support member (4620).

The second housing (4310) may include fifth to eighth side surfaces (4301, 4302, 4303, 4304). The second housing (4310) may include continuously-disposed fifth to eighth side surfaces (4301, 4302, 4303, 4304). The eighth side surfaces (4304) may face the second side surface (3302).

The second housing (4310) may include a through hole (4311) and a magnet reception part (4312). However, any one or more of the through hole (4311) and the magnet reception part (4312) may be omitted or changed from the first housing (4310).

The through hole (4311) may be disposed at an inside of the second housing (4310). The through hole (4311) may be formed with an upper/lower surface-opened shape. The through hole (4311) may be accommodated by the second bobbin (4210). The through hole (4311) may be movably disposed with the second bobbin (4210). The through hole (4311) may be formed with a shape corresponding to that of the second bobbin (4210).

The magnet reception part (4312) may be formed at a lateral surface of the second housing (4310). The magnet reception part (4312) may accommodate at least a portion of the second magnet unit (4320). An adhesive (not shown) may be interposed between the magnet reception part (4312) and the second magnet unit (4320). That is, the magnet reception part (4312) and the second magnet unit (4320) may be coupled by an adhesive. The magnet reception part (4312) may be disposed at an inner surface of the second housing (4310). The magnet reception part (4312) may be formed by a groove by allowing a portion of an inside of the second housing (4310) to be outwardly recessed. In this case, the electromagnetic interaction with the second coil (4220) disposed at an inside of the second magnet unit (3320) may be advantageously implemented. The magnet reception part (4312) may take a bottom-opened shape. In this case, the electromagnetic interaction with the third coil (4322) disposed at a lower side of the second magnet unit (4320) may be advantageously implemented.

The second magnet unit (4320) may be disposed at the second housing (4310). The second magnet unit (4320) may be accommodated into the magnet reception part (4312) of the second housing (4310). The second magnet unit (43210) may electromagnetically interact with the second coil (4220). The second magnet unit (4320) may face the second coil (4220). The second magnet unit (4320) may move the second bobbin (4210) fixed by the second coil (4220). The second magnet unit (4320) may move the second coil (4220) for AF driving. In this case, the second magnet unit (4320) may be called an "AF driving magnet". Thus, the second magnet unit (4320) may be called an "AF/OIS common driving magnet".

The second magnet unit (4320) may include four (4) corner magnets. The said four corner magnets may be so disposed as to allow an N pole to face an inside. Each of the said four corner magnets may take a large cylindrical shape having an inner side surface greater than an outer side surface.

The stator (4400) may be disposed at a lower side of the AF mover (4200). The stator (4400) may be disposed at a lower side of the OIS mover (4300). The stator (4400) may move the OIS mover (4300). At this time, the AF mover (4200) may also move along with the OIS mover (4300). That is, the stator (440) may move the AF mover (4200) and the OIS mover (4300).

The stator (4400) may include a substrate (4410) and a third coil part (4420). However, any one or more of the substrate (4410) and a third coil part (4420) may be omitted or changed from the stator (4400). The substrate (4410) may be a flexible PCB (FPCB). The substrate (4410) may be disposed at an upper surface of the second bobbin (4500). The substrate (4410) may be interposed between the second base (4500) and the third coil part (4420). The substrate (4410) may be electrically connected to the third coil (4422). The substrate (4410) may be electrically connected to the second coil (4220). The substrate (4410) may be electrically connected to the second coil (4220) through the OIS support member (4700) and the second upper support member (4610).

The substrate (4410) may include a through hole (4411) and a terminal part (4412). However, any one or more of the through hole (4411) and the terminal part (4412) may be omitted or changed from the substrate (4410). The through hole (4411) may be formed at a center area of the substrate (4410). The through hole (4411) may be so formed as to vertically pass through the substrate (4410). The through hole (4411) may be overlapped with the second lens module to an optical axis direction. The through hole (4411) may pass through a light having passed the second lens module.

The terminal part (4412) may be formed by allowing a portion of the substrate (4412) to be bent. The terminal part (4412) may be formed by allowing a portion of the substrate (4410) to be downwardly bent. The terminal part (4412) may be formed by allowing at least a portion to be outwardly exposed. A lower end of the terminal part (4412) may be coupled to the second substrate (200). The terminal part (4412) may be soldered to the second substrate (200). The substrate (4410) may be electrically connected to the second substrate (200) through the terminal part (4412).

The third coil part (4420) may be disposed at an upper surface of the substrate (4410). The third coil part (4420) may be disposed on the second base (4500). The third coil part (4420) may face the second magnet unit (4320). The third coil part (4420) may electromagnetically interact with the second magnet unit (4320). The third coil part (4420) may move the second magnet (4320) for OIS driving.

The third coil part (4420) may include a substrate part (4421) and a third coil (4422). However, any one or more of the substrate part (4421) and a third coil (4422) may be omitted or changed from the third coil part (4420). The substrate part (4421) may an FPCB. The substrate part (4421) may be formed with a third coil (4422) as an FPC (Fine Pattern Coil). The substrate part (4421) may be disposed at an upper surface of substrate (4410). The substrate part (4421) may be electrically connected to the substrate (4410). The substrate part (4421) may be electrically connected with the third coil (4422).

The third coil (4422) may be formed on the substrate part (4421) as an FPC. The third coil (4422) may be disposed on the base (4500). The third coil (4422) may electromagnetically interact with the second magnet unit (4320). The third coil (4422) may face the second magnet unit (4320). In this case, when a current is supplied to the third coil (4422) to form a magnetic field about the third coil (4422), the second magnet unit (4320) may move to the third coil (4422) in response to the electromagnetic interaction between the third coil (4422) and the second magnet unit (4320). The third coil (4422) may move the second magnet unit (4320) for OIS driving. In this case, the third coil (4422) may be called an "OIS coil".

The second base (4500) may be disposed at a lower side of the second housing (4310). The second base (4500) may movably support the second housing (4310). The second base (4500) may be disposed at an upper surface of the second substrate (200). The second base (4500) may be coupled by a second IR filter. The second base (4500) may include an opening (4510), a terminal reception part (4520) and a sensor reception part (4530).

However, any one or more of the opening (4510), the terminal reception part (4520) and a sensor reception part (4530) may be omitted or changed from the second base (4500).

The opening (4510) may be formed at a center area of the second base (4500). The opening (4510) may be so formed as to vertically pass through the second base (4500). The opening (4510) may be overlapped with the second lens module to an optical axis direction. The opening (4510) may pass through a light having passed the second lens module.

The terminal reception part (4520) may be formed at a lateral surface of the second base (4500). The terminal reception part (4520) may be formed by allowing a portion of an external lateral surface of the second base (4500) to be inwardly recessed. The terminal reception part (4530) may accommodate at least a portion of the terminal part (4412) of the substrate (4410). The terminal reception part (4530) may be formed with a width corresponding to that of the terminal part (4412).

The sensor reception part (4530) may be formed at an upper surface of second base (4500). The sensor reception part (4530) may be formed by allowing a portion of the upper surface of the second base (4500) to be downwardly recessed. The sensor reception part (4530) may be formed with a groove. The sensor reception part (4530) may accommodate at least a portion of a Hall sensor (4800). The sensor reception part (4530) may be formed with a shape corresponding to that of the Hall sensor (4800). The sensor reception part (4530) may be formed with a number corresponding to that of the Hall sensor (4800). The sensor reception part (4530) may be formed in the number of 2 pieces.

The AF support member (4600) may be coupled to the second bobbin (4210) and the second housing (4310). The AF support member (4600) may elastically support the second bobbin (4210). The AF support member (4600) may movably support the second bobbin (4210) relative to the second housing (4310). The AF support member (4600) may possess the elasticity at a portion thereof.

The AF support member (4600) may include a second upper elastic member (4610) and a second lower elastic member (4620). However, any one or more of the second upper elastic member (4610) and the second lower elastic member (4620) may be omitted or changed from the AF support member (4600).

The second upper elastic member (4610) may be coupled to an upper surface of the second bobbin (4210) and to an upper surface of second housing (4310). The second upper elastic member (4610) may be electrically connected to the second coil (4220). The second upper elastic member (4610) may third and fourth support units (4610*a*, 4610*b*). Each of the third and fourth support units (4610*a*, 4610*b*) may be coupled to a pair of lead cables of the second coil (4220).

The second upper elastic member (4610) may include an outer part (4611), an inner part (4612), a connection part (4613) and a coupling part (4614). However, any one or more of the outer part (4611), the inner part (4612), the connection part (4613) and the coupling part (4614) may be omitted or changed from the second upper elastic member (4610).

The outer part (4611) may be coupled to the second housing (4310). The outer part (4611) may be coupled to an upper surface of the second housing (4310). The inner part (4612) may be coupled to the second bobbin (4210). The inner part (4612) may be coupled to an upper surface of second bobbin (4210). The connection part (4613) may connect the outer part (4611) and the inner part (4612). The connection part (4613) may elastically connect the outer part (4611) and the inner part (4612). The connection part (4613) may possess the elasticity. The coupling part (4614) may be extended from the outer part (4611). The coupling part (4614) may be extended from an outside of the outer part (4611). The coupling part (4614) may be disposed on four corner portions of the second housing (4310). The coupling part (4614) may be coupled to the OIS support member (4700).

The second lower support member (4620) may be coupled to a lower surface of second bobbin (4210) and to a lower surface of second housing (4310). The second lower support member (4610) may be integrally formed. The second lower support member (4620) may include an outer part (4621), an inner part (4622) and a connection part (4623)). However, any one or more of the outer part (4621), the inner part (4622) and the connection part (4623) may be omitted or changed from the second lower support member (4620).

The outer part (4621) may be coupled to the second housing (4310). The outer part (4621) may be coupled to a lower surface of the second housing (4310). The inner part (4622) may be coupled to the second bobbin (4210). The inner part (4622) may be coupled to a lower surface of second bobbin (4210). The connection part (4623) may connect the outer part (4621) and the inner part (4622). The connection part (4623) may elastically connect the outer part (4621) and the inner part (4622). The connection part (4623) may possess the elasticity.

The OIS support member (4700) may movably support the second housing (4310). The OIS support member (4700) may movably support the OIS mover (4300) relative to the stator (4400). A lower end of the OIS support member (4700) may be coupled to the third coil part (4420). An upper end of the OIS support member (4700) may be coupled to a second upper support member (4610). The OIS support member (4700) may include a plurality of wires. Alternatively, the OIS support member (4700) may include a plurality of leaf springs. The OIS support member (4700) may possess the elasticity on at least a portion thereof. The OIS support member (4700) may be formed with an electrically-conductive member. The second coil part (4420) and the second upper support member (4610) may be electrically conducted by the OIS support member (4700). The OIS support member (4700) may be formed with four (4) pieces in order to be respectively disposed on four corner portions of the second housing (4310).

The OIS support member (4700) and the second housing (4310) may be disposed with a damper (not shown). The OIS support member (4700) and the AF support member (4600) may be disposed with a damper. The damper may inhibit the resonance phenomenon generated from the AF/OIS feedback driving. Alternatively, in a modification, instead of a damper, a cushioning part (not shown) may be disposed that is formed by changing a shape of a portion of the OIS support member (4700) and/or the AF support member (4600). The cushioning part may be formed by being bent or by being curved.

The Hall sensor may be used for OIS feedback function. The Hall sensor (4800) may be a Hall IC. The Hall sensor (4800) may detect a magnetic force off the second magnet unit (4320). The Hall sensor (4800) may detect the movement of the second housing (4310). The Hall sensor (4800) may detect the second magnet unit (4320) fixed to the second housing (4310). The Hall sensor (4800) may be electrically connected to the substrate (4410). The Hall sensor 4800) may be accommodated into the sensor reception part (4530). The Hall sensor (4800) may be formed in two pieces to be mutually disposed at 900 and to detect the movement of second housing (4310) by way of an x axis component and a y axis component.

Hereinafter, configuration of dual camera module according to another exemplary embodiment of the present invention will be described.

FIG. 40 is a perspective view illustrating a state where first and second lens drive devices are omitted from a dual camera module according to another exemplary embodiment of the present invention.

A light shielding member (2050*a*) may be disposed on filters (2031, 2032) in another exemplary embodiment of the present invention. At this time, a light shielding member (2050) disposed at a lower surface of the lowermost lens (2041) according to the third exemplary embodiment of the present invention may be omitted. The light shielding member (2050*a*) may be disposed at an upper surface of the first filter (2031). The light shielding member (2050*a*) may be disposed on the second filter (2032).

Hereinafter, a dual camera module according to still another exemplary embodiment to the third exemplary embodiment of the present invention will be described.

The light shielding member (2050*a*) disposed at an upper surface of the lowermost lens (2041) and a light shielding member (2050) disposed at an upper surface of the filters (2031, 2032) may be all disposed according to the still another exemplary embodiment to the third exemplary embodiment of the present invention. However, in a modification, the light shielding member (2050) may be disposed on the first lens module and the first filter (2031) may not be disposed on the light shielding member (2050). Conversely, the light shielding member (2050) may not be disposed with the first lens module and the first filter (2031) may be disposed with the light shielding member (2050). Furthermore, the second lens module may be disposed with the light shielding member (2050) and the second filter (2032) may not be disposed with the light shielding member (2050*a*). Conversely, the second lens module may not be disposed with the light shielding member (2050) and the second filter (2032) may be disposed with the light shielding member (2050*a*).

Although the present disclosure has been explained with all constituent elements forming the exemplary embodiments of the present disclosure being combined in one embodiment, or being operated in one embodiment, the present disclosure is not limited thereto. That is, all elements may operate by allowing one or more elements to be selectively combined as long as within the scope of object of the invention. Furthermore, terms such as "includes", "including", "have", "having", "comprises" and/or "comprising" as used herein mean that the relevant elements are embedded, unless otherwise described, such that the mentioned elements are not excluded but may be further included.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The foregoing explanations are intended only to be illustrative of the technical ideas of the present invention, and therefore, it should be appreciated by the skilled in the art that various modifications and amendments to the above examples may be made without deviating from the scope of protection of the invention.

The exemplary embodiments disclosed by the present invention are not to limit the technical ideas of the present invention but to explain the present invention, and therefore, the technical ideas of present invention are not to be limited by the exemplary embodiments. The scope of protection of the present invention should be interpreted by the following claims and all technical ideas within the equivalent scope should be interpreted as being included in the scope of right of the present invention.

The invention claimed is:

1. A lens drive device, comprising:
a base;
a housing disposed on the base;
a first bobbin disposed in the housing to move in a first direction;
a second bobbin disposed in the housing to move in the first direction and spaced apart from the first bobbin;
a first coil disposed on the first bobbin;
a second coil disposed on the second bobbin;
a magnet disposed on the housing and facing the first coil and the second coil;
a substrate comprising a circuit member having a third coil disposed to face the magnet between the housing and the base; and
a support member movably supporting the housing with respect to the substrate,
wherein the housing is integrally formed, and
wherein the base comprises a first through hole disposed at a position corresponding to a position of the first bobbin, a second through hole disposed at a position corresponding to a position of the second bobbin, a recessed part formed by allowing a portion of a lower surface of the base to be recessed, and a partition protruding from a recessed surface of the recessed part between the first through hole and the second through hole to a lower surface of base and extending from one lateral surface of the base to another lateral surface of the base.

2. The lens drive device of claim 1, comprising:
a first upper elastic member disposed at an upper side of the first bobbin to be coupled to the first bobbin and the housing; and
a second upper elastic member disposed at an upper side of the second bobbin to be coupled to the second bobbin and the housing,
wherein the support member is connected to first upper elastic member and the substrate, and to the second upper elastic member and the substrate.

3. The lens drive device of claim 1, wherein the support member is formed with first to fourth support parts, each mutually spaced apart.

4. The lens drive device of claim 3, wherein each of the first to fourth support parts is formed with a wire, and
wherein the first to fourth support parts are respectively disposed at four corner portions of the housing.

5. The lens drive device of claim 1, wherein the magnet is formed with a plurality of corner magnets respectively disposed at corner portions of the housing.

6. The lens drive device of claim 5, wherein the plurality of corner magnets comprise first to eighth corner magnets, each mutually spaced apart.

7. The lens drive device of claim 1, comprising a cover member comprising an upper plate and a lateral plate extensively bent from the upper plate,
wherein a lower end part of the lateral plate is coupled to the base, and an inner space formed by the cover member and the base is disposed with the housing, wherein the cover member is integrally formed, and wherein the cover member comprises a first opening formed on the upper plate at a position corresponding to that of the first bobbin, and a second opening formed on the upper plate at a position corresponding to that of the second bobbin.

8. The lens drive device of claim 2, comprising:

a first lower elastic member disposed at a lower side of the first bobbin to be coupled to the first bobbin and the housing; and a second lower elastic member disposed at a lower side of second bobbin to be coupled to the second bobbin and the housing.

9. The lens drive device of claim 8, wherein the first upper elastic member comprises a first outer part coupled to the housing, a first inner part coupled to the first bobbin, and a first connection part connecting the first outer part and the first inner part, wherein the first lower elastic member comprises a second outer part coupled to the housing, a second inner part coupled to the first bobbin, and a second connection part connecting the second outer part and the second inner part, wherein a first coupling hole of the first outer part is coupled to a lug of the housing by being fused to the lug of the housing, wherein the first inner part and the second inner part are coupled to the first bobbin by an adhesive, and wherein the second outer part is coupled to the housing by the adhesive.

10. The lens drive device of claim 9, wherein an upper surface of the first bobbin is formed with a first reception groove corresponding to a second coupling hole of the first inner part to accommodate the adhesive, wherein a lower surface of the first bobbin is formed with a second reception groove corresponding to a third coupling hole of the second inner part to accommodate the adhesive, and wherein a lower surface of the housing is formed with a third reception groove corresponding to a fourth coupling hole of the second outer part to accommodate the adhesive.

11. The lens drive device of claim 1, wherein the partition is formed in two pieces spaced apart from each other, and a space is formed between the two pieces.

12. The lens drive device of claim 1, wherein the base is integrally formed, and wherein the substrate is integrally formed.

13. The lens drive device of claim 1, wherein the magnet comprises a plurality of magnets, and at least one of the plurality of magnets is disposed on a lateral part formed between corner portions of the housing.

14. The lens drive device of claim 1, wherein the housing comprises a first lateral part facing a lateral surface of the first bobbin and a lateral surface of the second bobbin, a second lateral part disposed opposite to the first lateral part, a third lateral part disposed between the first lateral part and the second lateral part to face a lateral surface of the first bobbin, and a fourth lateral part disposed between the first lateral part and the second lateral part to face a lateral surface of the second bobbin, and the driving magnet comprises a first magnet disposed on the first lateral part, a second magnet disposed on the second lateral part, a third magnet disposed on the third lateral part, a fourth magnet disposed on the fourth lateral part, and a fifth magnet disposed between the first bobbin and the second bobbin.

15. The lens drive device of claim 14, wherein an inner surface of the first magnet is formed such that a polarity of an area facing the first coil is different from a polarity of an area facing the second coil, and wherein an inner surface of the second magnet is formed such that a polarity of an area facing the first coil is different from a polarity of an area facing the second coil.

16. The lens drive device of claim 15, wherein a portion of an inner surface of the first magnet facing the first coil, a portion of an inner surface of the second magnet, an inner surface of the third magnet and a lateral surface of the fifth magnet have a first polarity, and wherein another portion of an inner surface of the first magnet facing the second coil, another portion of an inner surface of the second magnet, an inner surface of the fourth magnet and another lateral surface of the fifth magnet have a second polarity different from the first polarity.

17. The lens drive device of claim 1, wherein the housing comprises a magnet reception part accommodating the magnet, and wherein the magnet reception part is opened to a lower side.

18. A camera module, comprising:

a printed circuit board (PCB);

a first image sensor disposed on the PCB;

a second image sensor disposed on the PCB and spaced apart from the first image sensor;

the lens driving device of claim 1 disposed on the PCB;

a first lens coupled to the first bobbin; and a second lens coupled to the second bobbin.

19. An optical device, comprising:

a body;

a camera module of claim 18 disposed on the body to capture an image of a subject; and a display part outputting the image captured by the camera module.

\* \* \* \* \*